(12) United States Patent
Okada et al.

(10) Patent No.: US 11,118,987 B2
(45) Date of Patent: Sep. 14, 2021

(54) TORQUE SENSOR USED FOR ROBOT ARM, HAS AN EXERTION SUPPORT BODY EXERTING THE TORQUE TO AN ANNULAR DEFORMATION BODY

(71) Applicant: TRI-FORCE MANAGEMENT CORPORATION, Saitama-ken (JP)

(72) Inventors: Kazuhiro Okada, Saitama (JP); Miho Okada, Saitama (JP)

(73) Assignee: TRI-FORCE MANAGEMENT CORPORATION, Saitama-ken (JP)

(*) Notice: Subject to any disclaimer, the term of this patent is extended or adjusted under 35 U.S.C. 154(b) by 21 days.

(21) Appl. No.: 16/459,352

(22) Filed: Jul. 1, 2019

(65) Prior Publication Data

US 2020/0003640 A1  Jan. 2, 2020

Related U.S. Application Data

(62) Division of application No. 15/546,605, filed as application No. PCT/JP2015/052783 on Jan. 26, 2015, now Pat. No. 10,557,764.

(51) Int. Cl.
*G01L 3/10* (2006.01)
*G01L 3/14* (2006.01)

(52) U.S. Cl.
CPC .......... *G01L 3/10* (2013.01); *G01L 3/106* (2013.01); *G01L 3/108* (2013.01); *G01L 3/14* (2013.01); *G01L 3/1457* (2013.01)

(58) Field of Classification Search
None
See application file for complete search history.

(56) References Cited

U.S. PATENT DOCUMENTS

| 4,094,192 A | 6/1978 | Watson |
| 7,954,389 B2 | 6/2011 | Machara |

(Continued)

FOREIGN PATENT DOCUMENTS

| CN | 103080716 A | 5/2013 |
| EP | 1 275 948 A2 | 1/2003 |

(Continued)

OTHER PUBLICATIONS

Second Chinese Office with an English translation dated Sep. 4, 2019 for Application No. CN 201580078242.5.

(Continued)

*Primary Examiner* — Brandi N Hopkins
(74) *Attorney, Agent, or Firm* — Ladas & Parry LLP

(57) ABSTRACT

A torque sensor including an annular deformation body disposed so as to surround a circumference of a rotation axis, an exertion support body, a fixing support body, and a detection circuit. The annular deformation body has four coupling parts, and four detection parts positioned between two coupling parts which are adjacent in the circumferential direction of the annular deformation body, the detection parts undergoing elastic deformation by exertion of torque. The detection parts each are formed in a convex shape on one side in a direction along the rotation axis and are formed in a concave shape on the other side in a direction along the rotation axis. The detection circuit outputs electric signals on the basis of elastic deformation undergone to the detection part of the annular deformation body.

7 Claims, 32 Drawing Sheets

(56) References Cited

U.S. PATENT DOCUMENTS

| | | | | |
|---|---|---|---|---|
| 2011/0005338 | A1* | 1/2011 | Okada | G01L 5/0061 |
| | | | | 73/862.043 |
| 2013/0167661 | A1* | 7/2013 | Nishioki | G01L 3/10 |
| | | | | 73/862.337 |
| 2013/0319135 | A1 | 12/2013 | Okada | |
| 2016/0041049 | A1* | 2/2016 | Okada | G01L 1/142 |
| | | | | 73/862.626 |
| 2017/0191882 | A1* | 7/2017 | Okada | G01L 1/04 |
| 2018/0252602 | A1* | 9/2018 | Okada | G01L 3/106 |

FOREIGN PATENT DOCUMENTS

| | | |
|---|---|---|
| FR | 2 909 760 A1 | 6/2008 |
| JP | 55-167138 U | 12/1980 |
| JP | 62-247222 A | 10/1987 |
| JP | 63-75633 A | 4/1988 |
| JP | 5-312659 A | 11/1993 |
| JP | 2000-19035 A | 1/2000 |
| JP | 2006-292423 A | 10/2006 |
| JP | 2007-24641 A | 2/2007 |
| JP | 2009-58388 A | 3/2009 |
| JP | 2009-210441 A | 9/2009 |
| JP | 2009-244134 A | 10/2009 |
| JP | 2012-112800 A | 6/2012 |
| JP | 2013-64706 A | 4/2013 |
| WO | 2012/018031 A1 | 2/2012 |

OTHER PUBLICATIONS

Espacenet English abstract of CN 103080716 A.
International Search Report (ISR) and Written Opinion (WO) dated Mar. 10, 2015 for International Application No. PCT/JP2015/052783.
J-PlatPat English abstract of JP 2009-58388 A.
J-PlatPat English abstract of JP 2007-24641 A.
Espacenet English abstract of JP 2009-244134 A.
J-PlatPat English abstract of JP 2006-292423 A.
J-PlatPat English abstract of JP 2000-19035 A.
J-PlatPat English abstract of JP 63-75633 A.
J-PlatPat English abstract of JP 2009-210441 A.
Espacenet English abstract of JP 2012-112800 A.
Espacenet English abstract of JP 62-247222 A.
J-PlatPat English abstract of JP 5-312659 A.
J-PlatPat English abstract of JP 2013-64706 A.
International Preliminary Report on Patentability (IPRP) dated Aug. 1, 2017 for International Application No. PCT/JP2015/052783.
European Search Report dated Jan. 7, 2019 in connection with corresponding European Patent Application No. 15880023.5.

* cited by examiner

| DETECTION POINT | DETECTION PART | DISPLACEMENT ELECTRODE | FIXED ELECTRODE | CAPACITIVE ELEMENT | STRESS | AMOUNT OF FLUCTUATION |
|---|---|---|---|---|---|---|
| Q1 | D1 | E501 | E201 | C1 | EXTENSION FORCE f2 | − |
| Q2 | D2 | E502 | E202 | C2 | COMPRESSIVE FORCE f1 | + |
| Q3 | D3 | E503 | E203 | C3 | EXTENSION FORCE f2 | − |
| Q4 | D4 | E504 | E204 | C4 | COMPRESSIVE FORCE f1 | + |
| ARITHMETIC EXPRESSION | $Mz = -C1 + C2 - C3 + C4$ | | | | | |

TORQUE +Mz

FIG. 22

A DISPLACEMENT AMOUNT OF
AN ELECTRODE DISTANCE (UNIT : $\mu$m)

|     | C1   | C2   | C3   | C4   |
|-----|------|------|------|------|
| Fx  | −2   | +2   | +2   | −2   |
| Fy  | −2   | −2   | +2   | +2   |
| Fz  | −5   | −5   | −5   | −5   |
| Mx  | −100 | −100 | +100 | +100 |
| My  | +60  | −60  | −60  | +60  |
| Mz  | +10  | −10  | +10  | −10  |

FIG. 25

AN AMOUNT OF FLUCTUATION (AN EXTENT OF
INCREASE OR DECREASE) IN CAPACITANCE VALUE

|     | C1   | C2   | C3   | C4   |
|-----|------|------|------|------|
| Fx  | (+)  | (−)  | (−)  | (+)  |
| Fy  | (+)  | (+)  | (−)  | (−)  |
| Fz  | +    | +    | +    | +    |
| Mx  | ++   | ++   | −−   | −−   |
| My  | −−   | ++   | ++   | −−   |
| Mz  | −    | +    | −    | +    |

FIG. 26

AN AMOUNT OF FLUCTUATION (AN EXTENT OF INCREASE OR DECREASE) IN CAPACITANCE VALUE

|    | C1  | C2  | C3  | C4  |
|----|-----|-----|-----|-----|
| Fx | (+) | (−) | (−) | (+) |
| Fy | (+) | (+) | (−) | (−) |
| Fz | (+) | (+) | (+) | (+) |
| Mx | (+) | (+) | (−) | (−) |
| My | (−) | (+) | (+) | (−) |
| Mz | −   | +   | −   | +   |

AN AMOUNT OF FLUCTUATION (AN EXTENT OF
INCREASE OR DECREASE) IN CAPACITANCE VALUE

|     | C11  | C12  | C13  | C14  | C15  | C16  | C17  | C18  |
|-----|------|------|------|------|------|------|------|------|
| Fx  | (−)  | (+)  | (−)  | (+)  | (+)  | (−)  | (+)  | (−)  |
| Fy  | (+)  | (−)  | (−)  | (+)  | (−)  | (+)  | (+)  | (−)  |
| Fz  | +    | +    | +    | +    | +    | +    | +    | +    |
| Mx  | ++   | ++   | ++   | ++   | −−   | −−   | −−   | −−   |
| My  | −−   | −−   | ++   | ++   | ++   | ++   | −−   | −−   |
| Mz  | +    | −    | +    | −    | +    | −    | +    | −    |

FIG. 38

| | VARIATIONS OF FORMULATE |
|---|---|
| (a) | Mz = +C11−C12+C13−C14+C15−C16+C17−C18 |
| (b) | Mz = +C11−C12+C15−C16 |
| (c) | Mz = +C13−C14+C17−C18 |
| (d) | Mz = −C12+C13−C16+C17 |
| (e) | Mz = +C11−C14+C15−C18 |

FIG. 39

AN AMOUNT OF FLUCTUATION (AN EXTENT OF INCREASE OR DECREASE) IN CAPACITANCE VALUE

|    | C11 | C12 | C13 | C14 | C15 | C16 | C17 | C18 |
|----|-----|-----|-----|-----|-----|-----|-----|-----|
| Fx | (−) | (+) | (−) | (+) | (+) | (−) | (+) | (−) |
| Fy | (+) | (−) | (−) | (+) | (−) | (+) | (+) | (−) |
| Fz | (+) | (+) | (+) | (+) | (+) | (+) | (+) | (+) |
| Mx | (+) | (+) | (+) | (+) | (−) | (−) | (−) | (−) |
| My | (−) | (−) | (+) | (+) | (+) | (+) | (−) | (−) |
| Mz |  +  |  −  |  +  |  −  |  +  |  −  |  +  |  −  |

TORQUE SENSOR USED FOR ROBOT ARM, HAS AN EXERTION SUPPORT BODY EXERTING THE TORQUE TO AN ANNULAR DEFORMATION BODY

RELATED APPLICATION

This application is a divisional of application Ser. No. 15/546,605 filed on Jul. 26, 2017, which is an application under 35 U.S.C. 371 of International Application No. JP/2015/052783 filed on Jan. 26, 2015, the entire contents of each of which are incorporated herein by reference.

FIELD OF THE INVENTION

The present invention relates to a torque sensor and in particular to a sensor having functions to output torque exerted around a predetermined rotation axis as an electric signal.

BACKGROUND ART

Torque sensors for detecting torque exerted around a predetermined rotation axis have been widely used in a variety of transport machines and industrial machines. For example, in Patent Document 1 given below, there is disclosed a torque sensor of a type in which mechanical deformation caused by exertion of torque is detected by a strain gauge. Further, in Patent Document 2, there is disclosed a sensor for detecting torque exerted on a shaft by forming a magnetostrictive film through plating on the shaft surface and measuring a change in magnetic properties of the magnetostrictive film. Still further, in Patent Document 3, there is disclosed a torque sensor of a type in which a magnetism generating part is provided at an end portion of a torsion bar, and a change in magnetic flux density of magnetism generated by the magnetism generating part is detected by use of a magnetic flux collecting ring. In Patent Document 4, there is disclosed a torque sensor of a type in which a large number of magnets are disposed in a cylindrical shape so that the N poles and the S poles are lined up alternately in the circumferential direction and magnetic fields generated by these magnets are detected.

On the other hand, there is also proposed a torque sensor in which the shape of an annular member is deformed by exertion of torque to detect electrically a mode of the deformation. For example, in Patent Document 5, there is disclosed a torque sensor for which a link mechanism for deforming in a radial direction the shape of an annular member by exertion of torque is prepared and in which a force applied in the radial direction is detected by a load sensor on the basis of deformation of the annular member. In Patent Document 6, there is disclosed a torque sensor in which strain gauges are used to detect an expansion-contraction state of each part of an annular member.

Further, for example, in Patent Documents 7 and 8, there is disclosed a method for using a capacitive element as a unit for electrically detecting displacement occurring at each part of a structural body. A capacitive element can be constituted of a pair of opposing electrodes, and a distance between both electrodes can be detected as a capacitance value. Therefore, it is suitable for a displacement detection unit provided on a sensor. Thus, in Patent Document 9, there is proposed a torque sensor in which the shape of an annular member is deformed by exertion of torque to detect displacement at each part resulting from the deformation by using a capacitive element.

PRIOR ART DOCUMENTS

Patent Documents

Patent Document 1: Japanese Unexamined Patent Application Publication No. 2009-058388
Patent Document 2: Japanese Unexamined Patent Application Publication No. 2007-024641
Patent Document 3: Japanese Unexamined Patent Application Publication No. 2009-244134
Patent Document 4: Japanese Unexamined Patent Application Publication No. 2006-292423
Patent Document 5: Japanese Unexamined Patent Application Publication No. 2000-019035
Patent Document 6: Japanese Unexamined Patent Application Publication No. S-63-075633
Patent Document 7: Japanese Unexamined Patent Application Publication No. 2009-210441
Patent Document 8: Japanese Unexamined Patent Application Publication No. H-05-312659
Patent Document 9: WO2012/018031

SUMMARY OF THE INVENTION

Problems to be Solved by the Invention

In industry, there is a demand for a small-sized torque sensor having high rigidity and a simple structure. In particular, in industrial equipment for performing automatic assembly by use of a robot arm, it is essential to monitor a force generated at the leading end of the arm and control the force. For attaining such a torque feedback-type control stably, it is necessary to secure high-speed responsiveness of signal processing from an electrical point of view and also secure high rigidity of a sensor structural body from a mechanical point of view.

From the above-described point of view, the torque sensor disclosed in Patent Document 9 described above (hereinafter, in the present application, referred to as "the torque sensor of the prior application") demonstrates performance as a sensor that is small in size and high in rigidity. In the torque sensor of the prior application, a predetermined point of an annular deformation body which causes elastic deformation is supported by support bodies disposed on both left and right sides. Next, there is adopted a method for detecting deformation caused in the annular deformation body in the radial direction as a change in capacitance value of a capacitive element. Specifically, there is adopted a structure in which one of the electrodes (a displacement electrode) which constitutes the capacitive element is formed on an inner surface or an outer surface of the annular deformation body, and the other of the electrodes (a fixed electrode) which opposes thereto is fixed to the support body.

It is, therefore, possible to provide a torque sensor which is small in size, high in rigidity and simple in structure.

However, in the torque sensor of the prior application, the displacement electrode can be satisfactorily formed on the inner surface or the outer surface of the annular deformation body, whereas the fixed electrode is required to be supported and fixed at a position which opposes the displacement electrode. Therefore, the fixed electrode is inevitably made complicated in structure. In addition, a relative position of the fixed electrode in relation to the displacement electrode is a serious factor which affects detection accuracy. Thus, great work load is needed in adjusting a position of the fixed electrode. In particular, where a plurality of capacitive elements are disposed so as to be kept symmetrical and these are used to perform difference detection, such adjustment is necessary that an opposing electrode is made parallel thereto at each of individual capacitive elements and an electrode interval between the plurality of capacitive elements is also made equal. Therefore, in terms of commercial use, there poses such a problem that production efficiency is decreased to raise costs.

Therefore, an object of the present invention is to provide a torque sensor which is small in size, high in rigidity and capable of realizing high production efficiency.

Means for Solving the Problems (1) According to a first aspect of the present invention, in a torque sensor which detects torque around a predetermined rotation axis, the torque sensor comprising:

an annular deformation body which extends along a basic annular channel when the basic annular channel is defined on a basic plane orthogonal to the rotation axis so as to surround a circumference of the rotation axis;

a left side support body which is disposed at a position adjacent to the left side of the annular deformation body, when viewed from a reference observation direction in which the rotation axis gives a horizontal line extending laterally;

a right side support body which is disposed at a position adjacent to the right side of the annular deformation body, when viewed from the reference observation direction;

left side connection members which connect left side connection points on the left side surface of the annular deformation body with the left side support body;

right side connection members which connect right side connection points on the right side surface of the annular deformation body with the right side support body;

a capacitive element which is constituted of a displacement electrode fixed at a predetermined position of the right side surface of the annular deformation body and a fixed electrode which is fixed at a position of the right side support body which opposes the displacement electrode; and detection circuits which output electric signals indicating torque around the rotation axis exerted on one of the left side support body and of the right side support body in a state that a load is applied to the other on the basis of fluctuation in capacitance value of the capacitive element; wherein the annular deformation body is provided with a detection part positioned at a detection point defined on the basic annular channel and a coupling part connected to both ends of the detection part, the detection part is provided with a first deformation part which undergoes elastic deformation by exertion of torque which is to be detected, a second deformation part which undergoes elastic deformation by exertion of torque to be detected and a displacement part which undergoes displacement resulting from elastic deformation of the first deformation part and the second deformation part, an external end of the first deformation part is connected to a coupling part adjacent thereto, while an internal end of the first deformation part is connected to the displacement part, and an external end of the second deformation part is connected to a coupling part adjacent thereto, while an internal end of the second deformation part is connected to the displacement part, the displacement electrode is fixed at a position of the displacement part which opposes the right side support body, and the left side connection points and the right side connection points are disposed at the coupling part, orthogonal projection images of the left side connection points on the basic plane and orthogonal projection images of the right side connection points on the basic plane are formed at mutually different positions.

(2) According to a second aspect of the present invention, in the torque sensor due to the aforementioned first aspect, n number (n≥2) of a plurality of detection points are defined on the basic annular channel, the detection parts are positioned at the respective detection points, and the annular deformation body is constituted by disposing alternately n number of the detection parts and n number of the coupling parts along the basic annular channel.

(3) According to a third aspect of the present invention, in the torque sensor due to the aforementioned second aspect, n even number (n≥2) of the detection points are defined on the basic annular channel, the detection parts are positioned at the respective detection points, and the annular deformation body is constituted by disposing alternately n number of the detection parts and n number of the coupling parts along the basic annular channel.

(4) According to a fourth aspect of the present invention, in the torque sensor due to the aforementioned third aspect, when n even number of the coupling parts are numbered sequentially along the basic annular channel, the right side connection points are disposed at odd-numbered coupling parts, and the left side connection points are disposed at even-numbered coupling parts.

(5) According to a fifth aspect of the present invention, in the torque sensor due to the aforementioned fourth aspect, n is set to be equal to 2, by which the annular deformation body is constituted by disposing individual parts in the order of a first coupling part, a first detection part, a second coupling part and a second detection part along the basic annular channel, and a right side connection point is disposed at the first coupling part, and a left side connection point is disposed at the second coupling part.

(6) According to a sixth aspect of the present invention, in the torque sensor due to the aforementioned fourth aspect, n is set to be equal to 4, by which the annular deformation body is constituted by disposing individual parts in the order of a first coupling part, a first detection part, a second coupling part, a second detection part, a third coupling part, a third detection part, a fourth coupling part and a fourth detection part along the basic annular channel, a first right side connection point is disposed at the first coupling part, a first left side connection point is disposed at the second coupling part, a second right side connection point is disposed at the third coupling part and a second left side connection point is disposed at the fourth coupling part, left side connection members include a first left side connection member for connecting the first left side connection point with the left side support body and a second left side connection member for connecting the second left side connection point with the left side support body, and right side connection members include a first right side connection member for connecting the first right side connection point with the right side support body and a second right side connection member for connecting the second right side connection point with the right side support body.

(7) According to a seventh aspect of the present invention, in the torque sensor due to the aforementioned sixth aspect, where two straight lines which pass through an intersection with the rotation axis and are orthogonal to each other are drawn on the basic plane, orthogonal projection images of the first left side connection point and the second left side connection point are disposed on a first straight line and orthogonal projection images of the first right side connection point and the second right side connection point are disposed on a second straight line.

(8) According to an eighth aspect of the present invention, in the torque sensor due to the aforementioned sixth aspect, in order to detect torque around the Z axis in an XYZ three-dimensional coordinate system, the annular deformation body is disposed on the XY plane which is a basic plane, with the origin O given as the center, the left side support body is disposed at a negative domain of the Z axis, and the right side support body is disposed at a positive domain of the Z axis, the first left side connection point and the second left side connection point are provided on a side surface of the annular deformation body on the negative side of the Z axis, the first right side connection point and the second right side connection point are provided on a side surface of the annular deformation body on the positive side of the Z axis, where both of the side surfaces of the annular deformation body are projected on the XY plane to obtain orthogonal projection images, a projection image of the first right side connection point is disposed on the positive X axis, a projection image of the second right side connection point is disposed on the negative X axis, a projection image of the first left side connection point is disposed on the positive Y axis, and a projection image of the second left side connection point is disposed on the negative Y axis, and where the V axis is defined as a coordinate axis in which the X axis is rotated counterclockwise by 45 degrees on the XY plane, with the origin O given as the center, and where the W axis is defined as a coordinate axis in which the Y axis is rotated counterclockwise by 45 degrees, with the origin O given as the center, the first detection point is disposed on the positive V axis, the second detection point is disposed on the positive W axis, the third detection point is disposed on the negative V axis, and the fourth detection point is disposed on the negative W axis.

(9) According to a ninth aspect of the present invention, in the torque sensor due to the aforementioned fourth aspect, n is set to be equal to 8, by which the annular deformation body is constituted by disposing individual parts in the order of a first coupling part, a first detection part, a second coupling part, a second detection part, a third coupling part, a third detection part, a fourth coupling part, a fourth detection part, a fifth coupling part, a fifth detection part, a sixth coupling part, a sixth detection part, a seventh coupling part, a seventh detection part, an eighth coupling part and an eighth detection part along the basic annular channel, a first left side connection point is disposed at the first coupling part, a first right side connection point is disposed at the second coupling part, a second left side connection point is disposed at the third coupling part, a second right side connection point is disposed at the fourth coupling part, a third left side connection point is disposed at the fifth coupling part, a third right side connection point is disposed at the sixth coupling part, a fourth left side connection point is disposed at the seventh coupling part, and a fourth right side connection point is disposed at the eighth coupling part, left side connection members include a first left side connection member which connects the first left side connection point with the left side support body, a second left side connection member which connects the second left side connection point with the left side support body, a third left side connection member which connects the third left side connection point with the left side support body and a fourth left side connection member which connects the fourth left side connection point with the left side support body, and right side connection members include a first right side connection member which connects the first right side connection point with the right side support body, a second right side connection member which connects the second right side connection point with the right side support body, a third right side connection member which connects the third right side connection point with the right side support body and a fourth right side connection member which connects the fourth right side connection point with the right side support body.

(10) According to a tenth aspect of the present invention, in the torque sensor due to the aforementioned ninth aspect, where four straight lines which pass through an intersection with the rotation axis and intersect with each other by every 45-degree angle difference are drawn on the basic plane, orthogonal projection images of the first left side connection point and the third left side connection point are disposed on a first straight line, orthogonal projection images of the first right side connection point and the third right side connection point are disposed on a second straight line, orthogonal projection images of the second left side connection point and the fourth left side connection point are disposed on a third straight line, and orthogonal projection images of the second right side connection point and the fourth right side connection point are disposed on a fourth straight line.

(11) According to an eleventh aspect of the present invention, in the torque sensor due to the aforementioned ninth aspect, in order to detect torque around the Z axis in the XYZ three-dimensional coordinate system, the annular deformation body is disposed on the XY plane which is a basic plane, with the origin O given as the center, the left side support body is disposed at a negative domain of the Z axis, and the right side support body is disposed at a positive domain of the Z axis, the first to the fourth left side connection points are provided on a side surface of the annular deformation body on the negative side of the Z axis, and the first to the fourth right side connection points are provided on a side surface of the annular deformation body on the positive side of the Z axis, where the V axis is defined as a coordinate axis in which the X axis is rotated counterclockwise by 45 degrees on the XY plane, with the origin O given as the center, the W axis is defined as a coordinate axis in which the Y axis is rotated counterclockwise by 45 degrees, with the origin O given as the center, and where both side surfaces of the annular deformation body are projected on the XY plane to obtain orthogonal projection images, a projection image of the first left side connection point is disposed on the positive X axis, a projection image of the second left side connection point is disposed on the positive Y axis, a projection image of the third left side connection point is disposed on the negative X axis, a projection image of the fourth left side connection point is disposed on the negative Y axis, a projection image of the first right side connection point is disposed on the positive V axis, a projection image of the second right side connection point is disposed on the positive W axis, a projection image of the third right side connection point is disposed on the negative V axis, and a projection image of the fourth right side connection point is disposed on the negative W axis, and when a directional vector $V_{ec}(\theta)$ which gives an angle $\theta$ counterclockwise in the positive direction of the X axis is defined on the XY plane, with the origin O given as a starting point, an i-th detection point (1≤i≤8) is disposed at a position at which the directional vector $V_{ec}$ (π/8+(I−1)·π/4) intersects with the basic annular channel.

(12) According to a twelfth aspect of the present invention, in the torque sensor due to the aforementioned second to eleventh aspects, of n number of the plurality of detection parts, some of them are first attribute detection parts, and the others are second attribute detection parts, a first attribute displacement part which constitutes the first attribute detection part undergoes displacement in a direction moving away from the right side support body, upon exertion of torque in a first rotating direction and undergoes displacement in a direction moving close to the right side support body upon exertion of torque in a second rotating direction which is reverse to the first rotating direction, a second attribute displacement part which constitutes the second attribute detection part undergoes displacement in a direction moving close to the right side support body upon exertion of torque in the first rotating direction and undergoes displacement in a direction moving away from the right side support body upon exertion of torque in the second rotating direction, a first attribute capacitive element is constituted of a first attribute displacement electrode which is fixed to the first attribute displacement part and a first attribute fixed electrode which is fixed at a position of the right side support body which opposes the first attribute displacement electrode, a second attribute capacitive element is constituted of a second attribute displacement electrode which is fixed at the second attribute displacement part and a second attribute fixed electrode which is fixed at a position of the right side support body which opposes the second attribute displacement electrode, and the detection circuits output an electric signal corresponding to a difference between a capacitance value of the first attribute capacitive element and a capacitance value of the second attribute capacitive element as an electric signal which indicates exerted torque.

(13) According to a thirteenth aspect of the present invention, in the torque sensor due to the aforementioned first to twelfth aspects, the detection part which has a first deformation part, a second deformation part and a displacement part is disposed between one coupling part end portion and the other coupling part end portion, the first deformation part is constituted of a first plate-shaped piece having flexibility, the second deformation part is constituted of a second plate-shaped piece having flexibility, and the displacement part is constituted of a third plate-shaped piece, an external end of the first plate-shaped piece is connected to the one coupling part end portion, while an internal end of the first plate-shaped piece is connected to one end of the third plate-shaped piece, and an external end of the second plate-shaped piece is connected to the other coupling part end portion, while an internal end of the second plate-shaped piece is connected to the other end of the third plate-shaped piece,

(14) According to a fourteenth aspect of the present invention, in the torque sensor due to the aforementioned thirteenth aspect, in a state that no torque is exerted, the third plate-shaped piece and the opposing surface of the right side support body are kept parallel to each other.

(15) According to a fifteenth aspect of the present invention, in the torque sensor due to the aforementioned fourteenth aspect, when a normal line orthogonal to the basic plane is provided at a position of the detection point, the first plate-shaped piece and the second plate-shaped piece which constitute the detection part positioned at the detection point are inclined to the normal line, and also the first plate-shaped piece is inclined so as to be reverse in direction to the second plate-shaped piece.

(16) According to a sixteenth aspect of the present invention, in the torque sensor due to the aforementioned first to fifteenth aspects, when a connection reference line parallel to the rotation axis passes through the left side connection points is defined, auxiliary connection members disposed on the connection reference line or the vicinity thereof are additionally provided between the right side surfaces of the coupling parts of the annular deformation body and the opposing surface of the right side support body.

(17) According to a seventeenth aspect of the present invention, in the torque sensor due to the aforementioned sixteenth aspect, as the auxiliary connection members, there is used a member which is more likely to undergo elastic deformation when force is exerted in a direction orthogonal to the connection reference line in comparison with a case where force is exerted in a direction along the connection reference line.

(18) According to an eighteenth aspect of the present invention, in the torque sensor due to the aforementioned sixteenth or seventeenth aspect, a connecting part of an annular deformation body with an auxiliary connection member or a connecting part of a right side support body with an auxiliary connection member or both of the connecting parts are constituted of diaphragm parts, and the auxiliary connection member is inclined to the connection reference line by deformation of the diaphragm parts on the basis of exertion of torque.

(19) According to a nineteenth aspect of the present invention, in the torque sensor due to the aforementioned eighteenth aspect, the connecting part of the annular deformation body with the auxiliary connection member is constituted of the diaphragm part, and left side connection members are kept away from the diaphragm part of the annular deformation body and connected to a circumferential part thereof.

(20) According to a twentieth aspect of the present invention, in the torque sensor due to the aforementioned first to nineteenth aspects, annular structural bodies which have through-opening parts at the center are used as the left side support body and the right side support body, and there is secured an insertion hole which penetrates through the respective through-opening parts of the left side support body, the annular deformation body (50) and the right side support body along the rotation axis.

(21) According to a twenty-first aspect of the present invention, in the torque sensor due to the aforementioned first to twentieth aspects, the annular deformation body is a member which is obtained by giving partial material-removal processing to a circular annular member obtained by forming a through-opening part in the shape of a concentric disk smaller in diameter at the center of a disk disposed, with the rotation axis given as the central axis, and the detection part is constituted of a part to which the material-removal processing is given.

(22) According to a twenty-second aspect of the present invention, in the torque sensor due to the aforementioned first to twenty-first aspects, the left side support body and the right side support body are composed of circular annular members which are obtained by forming through-opening parts in the shape of a concentric disk smaller in diameter at the center of a disk disposed, with the rotation axis given as the central axis.

(23) According to a twenty-third aspect of the present invention, in the torque sensor due to the aforementioned first to twenty-second aspects, the left side connection members are each constituted of a protruding part which protrudes from the right side surface of the left side support body to rightward, the right side connection members are each constituted of a protruding part which protrudes from the left side surface of the right side support body to leftward, and a top surface of each of the protruding parts is joined to a position of each of the connection points of the annular deformation body.

(24) According to a twenty-fourth aspect of the present invention, in the torque sensor due to the aforementioned first to twenty-third aspects, even where a relative position of the displacement electrode to the fixed electrode is changed as a result of exertion of torque in a predetermined rotating direction, one of the fixed electrode and of the displacement electrode is set to be larger in area than the other so that the pair of electrodes constituting the capacitive element are not changed in effective opposing area.

(25) According to a twenty-fifth aspect of the present invention, in the torque sensor due to the aforementioned first to twenty-fourth aspects, the left side support body, the right side support body and the annular deformation body are each constituted of a conductive material, the displacement electrode is formed on the surface of the displacement part via an insulating layer, and the fixed electrode is formed on the surface of the right side support body via an insulating layer.

(26) According to a twenty-sixth aspect of the present invention, in the torque sensor due to the aforementioned first to twenty-fourth aspects, the left side support body, the right side support body and the annular deformation body are each constituted of a conductive material, the displacement electrode s constituted of a certain domain of the surface of the annular deformation body or the fixed electrode is constituted of a certain domain of the surface of the right side support body.

(27) According to a twenty-seventh aspect of the present invention, in a torque sensor which detects torque around a predetermined rotation axis, the torque sensor comprising:

an annular deformation body which extends along a basic annular channel when the basic annular channel is defined so as to surround a circumference of the rotation axis on a basic plane which is orthogonal to the rotation axis;

an exertion support body which is disposed at a position adjacent to the left side of the annular deformation body when viewed from a reference observation direction in which the rotation axis gives a horizontal line extending laterally;

a fixing support body which is disposed at a position adjacent to the right side of the annular deformation body when viewed from the reference observation direction;

exertion connection members which connect exertion connection points provided at a predetermined site of the annular deformation body with the exertion support body;

fixing connection members which connect fixing connection points provided at a predetermined site of the annular deformation body with the fixing support body;

a capacitive element which is constituted of a displacement electrode fixed at a predetermined position of the right side surface of the annular deformation body and a fixed electrode fixed at a position of the fixing support body which opposes the displacement electrode; and detection circuits which output electric signals indicating torque around the rotation axis exerted on one of the exertion support body and of the fixing support body in a state that a load is applied to the other on the basis of fluctuation in capacitance value of the capacitive element; wherein the annular deformation body is provided with a detection part positioned at a detection point defined on the basic annular channel and a coupling part connected to both ends of the detection part, the detection part is provided with a first deformation part which undergoes elastic deformation by exertion of torque which is to be detected, a second deformation part which undergoes elastic deformation by exertion of torque which is to be detected and a displacement part which undergoes displacement resulting from elastic deformation of the first deformation part and the second deformation part, an external end of the first deformation part is connected to a coupling part adjacent thereto, while an internal end of the first deformation part is connected to the displacement part, and an external end of the second deformation part is connected to a coupling part adjacent thereto, while an internal end of the second deformation part is connected to the displacement part, the displacement electrode is fixed at a position of the displacement part which opposes the fixing support body, and the exertion connection points and the fixing connection points are disposed at the coupling part, orthogonal projection images of the exertion connection points on the basic plane and orthogonal projection images of the fixing connection points on the basic plane are formed at mutually different positions.

(28) According to a twenty-eighth aspect of the present invention, in a torque sensor which detects torque around a predetermined rotation axis, the torque sensor comprising:

an annular deformation body which extends along a basic annular channel when the basic annular channel is defined so as to surround a circumference of the rotation axis on a basic plane which is orthogonal to the rotation axis;

an exertion support body which is disposed at a position adjacent to the outside or the inside of the annular deformation body;

a fixing support body which is disposed at a position adjacent to the right side of the annular deformation body when viewed from a reference observation direction in which the rotation axis gives a horizontal line extending laterally;

exertion connection members which connect exertion connection points provided at a predetermined site of the annular deformation body with the exertion support body;

fixing connection members which connect fixing connection points provided at a predetermined site of the annular deformation body with the fixing support body;

a capacitive element which is constituted of a displacement electrode fixed at a predetermined position of the right side surface of the annular deformation body and a fixed electrode fixed at a position of the fixing support body which opposes the displacement electrode; and detection circuits which output electric signals indicating torque around the rotation axis exerted on one of the exertion support body and of the fixing support body in a state that a load is applied to the other on the basis of fluctuation in capacitance value of the capacitive element; wherein the annular deformation body is provided with a detection part which is positioned at a detection point defined on the basic annular channel and a coupling part which is connected to both ends of the detection part, the detection part is provided with a first deformation part which undergoes elastic deformation by exertion of torque which is to be detected, a second deformation part which undergoes elastic deformation by exertion of torque which is to be detected and a displacement part which undergoes displacement resulting from elastic deformation of the first deformation part and the second deformation part, an external end of the first deformation part is connected to a coupling part adjacent thereto, while an internal end of the first deformation part is connected to the displacement part, and an external end of the second deformation part is connected to a coupling part adjacent thereto, while an internal end of the second deformation part is connected to the displacement part, the displacement electrode is fixed at a position of the displacement part which opposes the fixing support body, and the exertion connection points and the fixing connection points are disposed at the coupling part, orthogonal projection images of the exertion connection points on the basic plane and orthogonal projection images of the fixing connection points on the basic plane are formed at mutually different positions.

(29) According to a twenty-ninth aspect of the present invention, in a torque sensor which detects torque around a predetermined rotation axis, the torque sensor comprising:

an annular deformation body which extends along a basic annular channel when the basic annular channel is defined so as to surround a circumference of the rotation axis on a basic plane which is orthogonal to the rotation axis;

an exertion support body which exerts torque on the annular deformation body;

a fixing support body which fixes the annular deformation body;

exertion connection members which connect exertion connection points provided at a predetermined site of the annular deformation body with the exertion support body;

fixing connection members which connect fixing connection points provided at a predetermined site of the annular deformation body with the fixing support body;

a detection element which detects elastic deformation occurring at the annular deformation body; and detection circuits which detect electric signals indicating torque around the rotation axis exerted on one of the exertion support body and of the fixing support body in a state that a load is applied to the other on the basis of detection results of the detection element; wherein the annular deformation body is provided with a detection part positioned at a detection point defined on the basic annular channel and a coupling part connected to both ends of the detection part, the exertion connection points and the fixing connection points are disposed at the coupling part, and orthogonal projection images of the exertion connection points on the basic plane and orthogonal projection images of the fixing connection points on the basic plane are formed at mutually different positions, and the detection part is provided with an elastic deformation structure part which undergoes elastic deformation, upon exertion of force between the exertion connection point and the fixing connection point, on the basis of the thus exerted force, and the detection element detects elastic deformation occurring at the elastic deformation structure part.

(30) According to a thirtieth aspect of the present invention, in the torque sensor due to the aforementioned twenty-ninth aspect, the detection part is provided with a first deformation part which undergoes elastic deformation by exertion of torque to be detected, a second deformation part which undergoes elastic deformation by exertion of torque to be detected and a displacement part which undergoes displacement resulting from elastic deformation of the first deformation part and the second deformation part, and an external end of the first deformation part is connected to a coupling part adjacent thereto, while an internal end of the first deformation part is connected to the displacement part, and an external end of the second deformation part is connected to a coupling part adjacent thereto, while an internal end of the second deformation part is connected to the displacement part.

(31) According to a thirty-first aspect of the present invention, in the torque sensor due to the aforementioned twenty-ninth or thirtieth aspect, the detection element is constituted of the capacitive element which has a displacement electrode fixed at a predetermined position of the detection part and a fixed electrode fixed at a position of the exertion support body or the fixing support body which opposes the displacement electrode, the displacement electrode is disposed at a position which causes displacement to the fixed electrode on the basis of elastic deformation occurring at the detection part, and the detection circuits output electric signals indicating exerted torque on the basis of fluctuation in capacitance value of the capacitive element.

(32) According to a thirty-second aspect of the present invention, in the torque sensor due to the aforementioned twenty-ninth aspect, the detection part is provided with a plate-shaped deformation part which undergoes elastic deformation by exertion of torque to be detected, and the plate-shaped deformation part is disposed so that a plate surface thereof is inclined to the basic annular channel.

(33) According to a thirty-third aspect of the present invention, in the torque sensor due to the aforementioned thirty-second aspect, the detection element is constituted of strain gauges (r1 to r4) fixed at a position of the detection part which causes elastic deformation, and the detection circuit outputs an electric signal indicating exerted torque on the basis of fluctuation in electrical resistance of the strain gauges.

(34) According to a thirty-fourth aspect of the present invention, in the torque sensor due to the aforementioned thirty-third aspect, the detection element is constituted of strain gauges which are disposed on both surfaces of the plate-shaped deformation part in the vicinity of an end thereof which is connected with a coupling part.

(35) According to a thirty-fifth aspect of the present invention, in the torque sensor due to the aforementioned thirty-fourth aspect, the detection element is provided with a first strain gauge and a second strain gauge which are disposed respectively on a front surface and a rear surface in the vicinity of a first connection end with a coupling part and a third strain gauge and a fourth strain gauge which are disposed respectively on a front surface and a rear surface in the vicinity of a second connection end with a coupling part, and the detection circuit detects a bridge voltage of a bridge circuit in which the first strain gauge and the fourth strain gauge are given as a first opposite side, while the second strain gauge and the third strain gauge are given as a second opposite side.

Effects of the Invention

In the torque sensor according to the present invention, torque detection is performed by using an annular deformation body having a through-opening part through which a rotation axis is inserted. A left side support body and a right side support body are disposed on both left and right sides of the annular deformation body, and these are individually joined to different connection points. Therefore, when torque is applied to one of the support bodies, with a load applied to the other of the support bodies, distortion occurs in the annular deformation body. A detection part is provided at a predetermined site of the annular deformation body, and the detection part is provided with a pair of deformation parts which cause elastic deformation by exertion of torque to be detected and a displacement part which causes displacement resulting from elastic deformation of the pair of deformation parts. Upon exertion of torque, displacement occurs at the displacement part, resulting in change in distance in relation to the right side support body. In the present invention, the change in distance can be detected by referring to a capacitance value of a capacitive element. That is, it is possible to recognize a mode of deformation of the annular deformation body and detect torque which is exerted on the basis of an amount of fluctuation in capacitance value of the capacitive element which is constituted of a displacement electrode fixed at a displacement part and a fixed electrode fixed at the right side support body which is disposed at a position opposing the displacement electrode.

The annular deformation body, the left side support body and the right side support body can be each constituted of a flat structural body which is small in thickness in an axis direction and, therefore, an entire axial length of the sensor can be set shorter. Further, since torque is detected on the basis of distortion at a detection part of the annular deformation body, the detection part is required to be made of a material which will cause elastic deformation and even where a material relatively high in rigidity is used as the annular deformation body, detection can be made at high accuracy. Further, distortion of the shape of the annular deformation body can be detected by a capacitive element which is constituted of a displacement electrode fixed at the displacement part and a fixed electrode fixed to the right side support body which opposes thereto. Therefore, the sensor is made simple in structure and the fixed electrode can be easily adjusted for a position thereof. It is, thus, possible to provide the torque sensor which is small in size, high in rigidity and capable of realizing high production efficiency.

In particular, two upper and lower sites of the annular deformation body are joined to the left side support body, and two left and right sites thereof are joined to the right side support body so that each connection point deviates by every 90 degrees, thus making it possible to deform the annular deformation body efficiently by exertion of torque. It is also true for a case where each of the connection points is allowed to deviate by every 45 degrees so that four sites are joined to the left side support body and four sites are also joined to the right side support body.

Further, upon exertion of the same torque, a capacitive element with an increasing electrode interval and a capacitive element with a decreasing electrode interval are used to detect torque which is exerted as a difference between both capacitance values, thus making it possible to perform stable torque detection in which common-mode noise and zero-point drift are suppressed. This detection can contribute to setting off influences of expansion of individual parts due to temperatures to obtain a highly accurate detection value. It is also possible to obtain an accurate detection value from which interference with the other axis components are removed.

In the torque sensor according to the present invention, it is possible to form a through-opening part through which a rotation axis is inserted not only on the annular deformation body but also on the left side support body and the right side support body. Thereby, it is possible to secure an insertion hole which penetrates through the through-opening part of each of the left side support body, the annular deformation body and the right side support body along the rotation axis, providing a structure, the interior of which is hollow. As a result, where the torque sensor according to the present invention is used integrated into a joint part of a robot arm, a decelerator, etc., can be disposed at the hollow part, thus making it possible to design a generally space-saving robot arm.

Further, an auxiliary connection member is provided between a right side surface of a coupling part of the annular deformation body and an opposing surface of the right side support body, by which it is possible to suppress influences of interference components other than torque to be detected (rotational moment) around a predetermined rotation axis. Therefore, it is possible to reduce an error resulting from interference with the other axis components and perform more accurate detection.

It is noted that in place of the left side support body and the right side support body, an exertion support body and a fixing support body are used, and the fixing support body is disposed on the right-hand side of the annular deformation body, as with the right side support body, and the exertion support body is disposed outside or inside the annular deformation body, by which substantially similar effects can be obtained.

BRIEF DESCRIPTION OF THE DRAWINGS

FIG. 22 is a table which shows behavior of each of the detection parts upon occurrence of the deformation shown in FIG. 21.

FIG. 25 is a table which shows an actual example of a specific displacement amount of an electrode distance of each of capacitive elements when force in the direction of each axis or moment around each axis is exerted on the left side support body 10 at the basic structural part shown in FIG. 16.

FIG. 26 is a table prepared on the basis of the table shown in FIG. 25 which shows an amount of fluctuation (an extent of increase or decrease) in capacitance value of each of capacitive elements.

FIG. 38 is a table which shows an amount of fluctuation (an extent of increase or decrease) in capacitance value of each of capacitive elements when force in the direction of each axis or moment around each axis is exerted on the left side support body 10 of the modification example which uses eight sets of the detection parts shown in FIG. 35.

FIG. 39 is a drawing which shows variations of a formula for calculating moment Mz around the Z axis (torque to be detected) in the modification example which uses the eight sets of detection parts shown in FIG. 35.

BEST MODE FOR CARRYING OUT THE INVENTION

Figure 1:
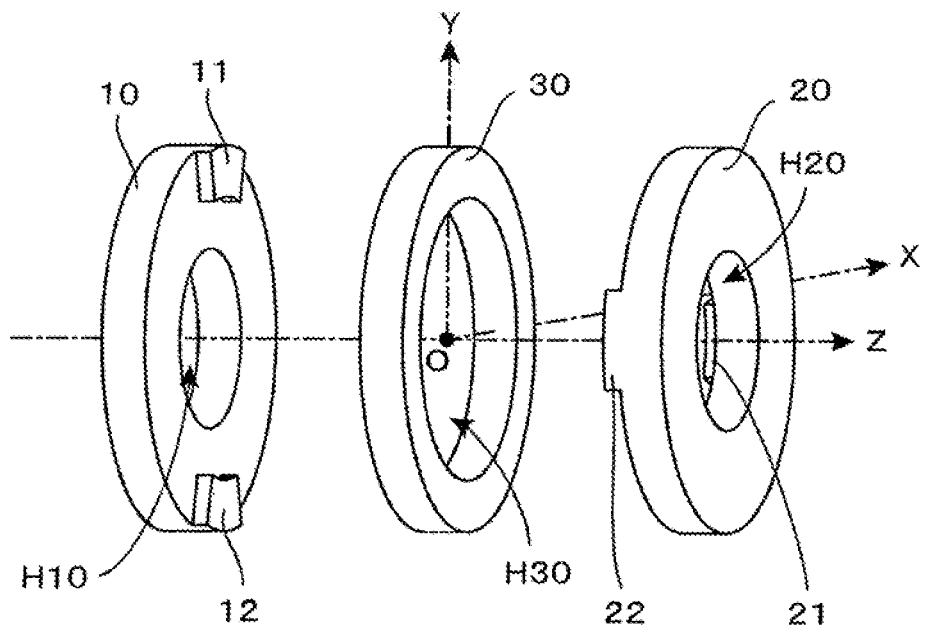
FIG. 1 is an exploded perspective view of a basic structural part of the torque sensor of the prior application.

Hereinafter, a description will be given of the present invention on the basis of the embodiment shown in the drawings. The present invention is an invention obtained by improving the torque sensor of the prior application which is disclosed in Patent Document 9 described above (WO 2012/018031). For the sake of convenience of description, at first, in the following Sections 1 to 3, a description will be given of the torque sensor of the prior application. In Section 4 and subsequent Sections, a description will be given of characteristics of the present invention.

<<<Section 1. Characteristics of the Basic Structural Part in Torque Sensor of the Prior Application>>>

FIG. 1 is an exploded perspective view which shows a basic structural part of the torque sensor of the prior application. As shown in the drawing, the basic structural part is constituted by disposing an annular deformation body 30 between a left side support body 10 and a right side support body 20 and joining these three constituents to each other. Here, for the sake of convenience, as shown in the drawing, an XYZ three-dimensional coordinate system is defined to give the following description. Here, the Z axis drawn horizontally in the drawing corresponds to a rotation axis of torque to be detected, and the torque sensor has functions to detect torque around the rotation axis (around the Z axis).

The annular deformation body 30 disposed at the center of the drawing is made of a material which causes elastic deformation by exertion of torque to be detected, and there is formed in the interior thereof a through-opening part H30 through which the rotation axis (Z axis) is inserted. On the other hand, the left side support body 10 disposed on the left side in the drawing is a member which supports the left side surface of the annular deformation body 30. The right side support body 20 disposed on the right-hand side in the drawing is a member which supports the right side surface of the annular deformation body 30. In the torque sensor of the prior application shown in the drawing, the left side support body 10 is an annular member having a through-opening part H10 through which the rotation axis (Z axis) is inserted, and the right side support body 20 is an annular member having a through-opening part H20 through which the rotation axis (Z axis) is inserted.

In general, the concepts of the right side and the left side concepts that only carry meaning when an observation is made in a specific observation direction. Here, for the sake of convenience of description, as shown in FIG. 1, when an observation is made in a reference observation direction in which the rotation axis (Z axis) gives a horizontal line extending laterally (an observation direction in which the rightward direction is the positive direction of the Z axis), a support body which is disposed at a position adjacent to the left side of the annular deformation body 30 is referred to as the left side support body 10, whereas a support body which is disposed at a position adjacent to the right side of the annular deformation body 30 is referred to as the right side support body 20.

Here, the origin O of the XYZ three-dimensional coordinate system is defined at the center of the annular deformation body 30, and the left side support body 10, the annular deformation body 30 and the right side support body 20 are each constituted of a circular annular member in which the Z axis is given as a central axis. More specifically, the annular deformation body 30 is composed of a circular annular member which is obtained by forming the through-opening part H30 in the shape of a concentric disk smaller in diameter at the center of a disk disposed, with the Z axis (rotation axis) given as the central axis. Similarly, the left side support body 10 and the right side support body 20 are also each composed of a circular annular member which is obtained by forming respectively the through-opening parts H10, H20 in the shape of a concentric disk smaller in diameter at the center of a disk disposed, with the Z axis (rotation axis) given as the central axis.

On the other hand, two fan-shaped protruding parts 11, 12 which protrude to the right are provided on the right side surface of the left side support body 10, and top surfaces of the protruding parts 11, 12 are joined to the left side surface of the annular deformation body 30. As shown in the drawing, the protruding part 11 is joined to an upper part (a part positioned in the positive direction of the Y axis) of the annular deformation body 30, and the protruding part 12 is joined to a lower part (a part positioned in the negative direction of the Y axis) of the annular deformation body 30. Similarly, two fan-shaped protruding parts 21, 22 protruding to the left are provided on the left side surface of the right side support body 20. Top surfaces of the protruding parts 21, 22 are joined to the right side surface of the annular deformation body 30. As shown in the drawing, the protruding part 21 is joined to a far part (a part positioned in the positive direction of the X axis) of the annular deformation body 30, and the protruding part 22 is joined to a near part (a part positioned in the negative direction of the X axis) of the annular deformation body 30.

Figure 2:
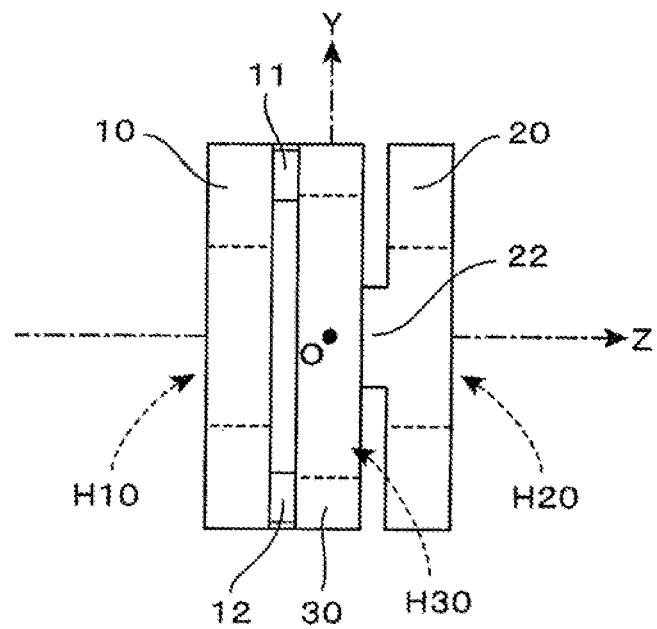
FIG. 2 is a side view of the basic structural part of the torque sensor of the prior application obtained by joining three constituents shown in FIG. 1 to each other.
Figure 3:
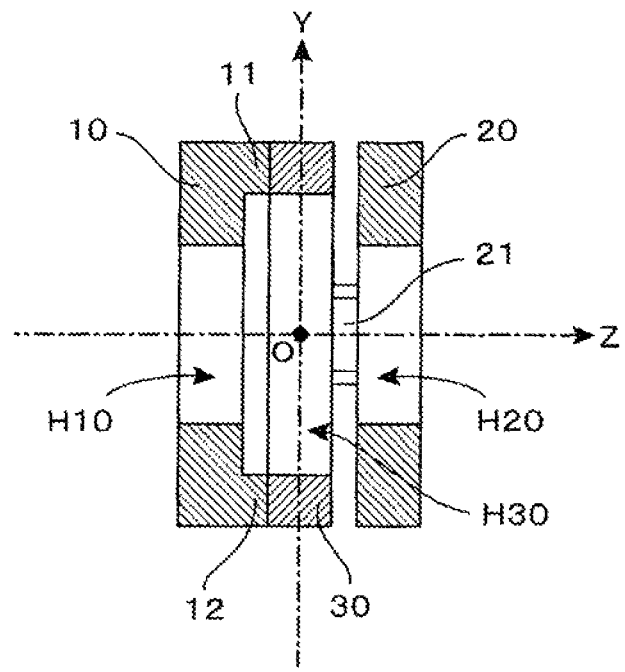
FIG. 3 is a side sectional view in which the basic structural part shown in FIG. 2 is cut along a YZ plane.

FIG. 2 is a side view of a basic structural part of the torque sensor which is obtained by joining the three constituents shown in FIG. 1 to each other. FIG. 3 is a side sectional view in which the basic structural part is cut along the YZ plane. In the case of the example shown here, as shown in FIG. 3, the protruding parts 11, 12 are each a structural body which is formed integrally with the left side support body 10, and the top surfaces thereof are joined to the left side surface of the annular deformation body 30. Similarly, the protruding parts 21, 22 are each a structural body which is formed integrally with the right side support body 20, and the top surfaces thereof are joined to the right side surface of the annular deformation body 30.

Consequently, the protruding parts 11, 12 function as the left-side connection members which connect left side connection points on the left side surface of the annular deformation body 30 which opposes the left side support body 10 with the left side support body 10. The protruding parts 21, 22 function as the right-side connection members which connect right side connection points on the right side surface of the annular deformation body 30 which opposes the right side support body 20 with the right side support body 20.

Figure 4:
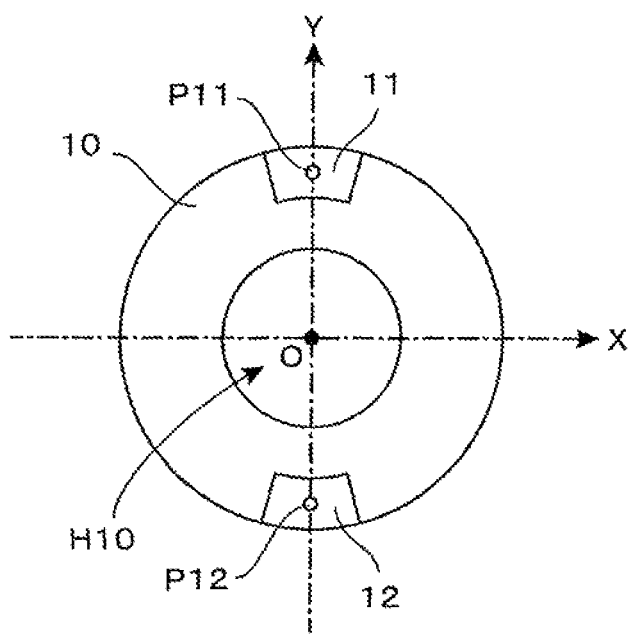
FIG. 4 is a front view of a left side support body 10 and protruding parts 11, 12 shown in FIG. 1, when viewed from the right side in FIG. 1.
Figure 5:
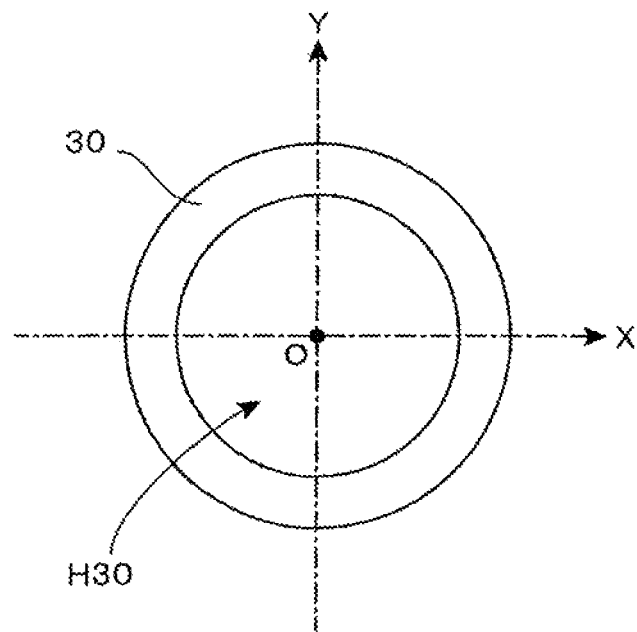
FIG. 5 is a front view of an annular deformation body 30 shown in FIG. 1 when viewed from the right side in FIG. 1.
Figure 6:
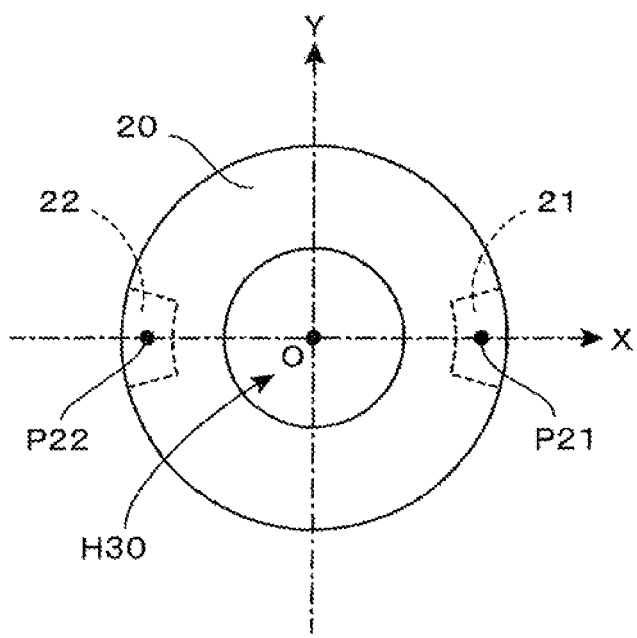
FIG. 6 is a front view of a right side support body 20 and protruding parts 21, 22 shown in FIG. 1, when viewed from the right side in FIG. 1.

FIG. 4 is a front view of the left side support body 10 and the protruding parts 11, 12, when viewed from the right side in FIG. 1. FIG. 5 is a front view of the annular deformation body 30, when viewed from the right side in FIG. 1. FIG. 6 is a front view of the right side support body 20 and the protruding parts 21, 22, when viewed from the right side in FIG. 1. In FIG. 4, points P11, P12 which are indicated by a white dot at the center position of each of the protruding parts 11, 12 are the left side connection points. These are used for describing connection positions with the annular deformation body 30 in Section 2. Similarly, in FIG. 6, points P21, P22 which are indicated by the black dot at the center position of each of the protruding parts 21, 22 are the right side connection points. These are also used for describing connection positions with the annular deformation body 30 in Section 2.

It is preferable that the components (the left side support body 10 and the protruding parts 11, 12) shown in FIG. 4 are in actuality made completely identical to the components (the right side support body 20 and the protruding parts 21, 22) shown in FIG. 6. In this case, the components shown in FIG. 4 are rotated by 180 degrees, with the Y axis given as the rotation axis, and reversed, and these are then rotated by 90 degrees, with the Z axis given as the rotation axis, by which these are exactly in agreement with the components shown in FIG. 6. Therefore, in actuality, the basic structural part shown in FIG. 2 can be constituted by preparing the two sets of components shown in FIG. 4 and one set of the components shown in FIG. 5.

As shown in FIG. 5, the circular through-opening part H30 is provided on the annular deformation body 30. This is to cause elastic deformation which is necessary for detection. As will be described below, where torque to be detected is exerted on the basic structural part, the annular deformation body 30 is required to undergo deformation into an elliptical shape. Ease in such elastic deformation of the annular deformation body 30 serves as a parameter that affects the detection sensitivity of the sensor. Use of an annular deformation body 30 which will easily undergo elastic deformation makes it possible to produce a sensor high in sensitivity capable of detecting even subtle torque. However, a maximum value of detectable torque is suppressed. In contrast, use of an annular deformation body 30 which is less likely to undergo elastic deformation makes it possible to increase a maximum value of torque which can be detected. However, the sensitivity is decreased to result in inability to detect subtle torque.

Ease in elastic deformation of the annular deformation body 30 depends on the thickness in the direction of the Z axis (the thinner, elastic deformation will take more easily) and the diameter of the through-opening part H30 (the larger, elastic deformation will take place more easily). Further, the ease also depends on a material thereof. Therefore, in practice, various parts of the annular deformation body 30 may be appropriately selected for dimensions and materials depending on the application of the torque sensor.

On the other hand, in the principle of detecting torque, the left side support body 10 or the right side support body 20 is not required to be a member which causes elastic deformation. Rather, it is preferable that the left side support body 10 and the right side support body 20 are a perfect rigid body in order that torque which has been exerted contributes completely to deformation of the annular deformation body 30. In the example shown in the drawing, as the left side support body 10 and the right side support body 20, there are used the annular structural bodies respectively having the through-opening parts H10, H20 at the center. A reason thereof is not for causing elastic deformation easily but for securing an insertion hole which penetrates through the respective through-opening parts H10, H30, H20 of the left side support body 10, the annular deformation body 30 and the right side support body 20 along the rotation axis (Z axis).

As apparent from the side sectional view of FIG. 3, the basic structural part is structured so that the interior thereof is hollow. Where a torque sensor having such a hollow part is used by being incorporated into a joint part of a robot arm, a decelerator, etc., can be disposed in the hollow part, thus making it possible to design a space-saving robot arm on the whole. This is one of the advantages which could not be otherwise obtained by use of a conventional torque sensor which utilizes distortion of a torsion bar in the shape of a solid round bar.

As described above, in the torque sensor of the prior application, the annular deformation body 30 is required to be constituted of a material which will cause elastic deformation to such an extent as to be necessary for detecting torque. However, the left side support body 10 or the right side support body 20 is not required to cause elastic deformation but rather preferably constituted of a material high in rigidity. In practice, where an insulating material is used as a material of the left side support body 10, the right side support body 20 or the annular deformation body 30, a synthetic resin such as plastic can be favorably used. Where a conductive material is used (in this case, as will be described below, it is necessary to give insulation to a necessary site for preventing short circuiting of an electrode), a metal such as stainless steel and aluminum can be favorably used. As a matter of course, an insulating material and a conductive material may be used in combination.

Any of the left side support body 10, the right side support body 20 and the annular deformation body 30 can be constituted of a flat structural body which is small in the thickness in an axial direction, thus making it possible to set the axial length of an entire sensor so as to be short. Further, torque is detected only by distortion of the annular deformation body 30 and, therefore, the annular deformation body 30 is required to be made of a material which will cause elastic deformation. Nevertheless, even where it is made of a material relatively high in rigidity, it is possible to perform detection at high accuracy.

<<<Section 2. Principle of Detecting Torque in the Torque Sensor of the Prior Application>>>

Figure 7:
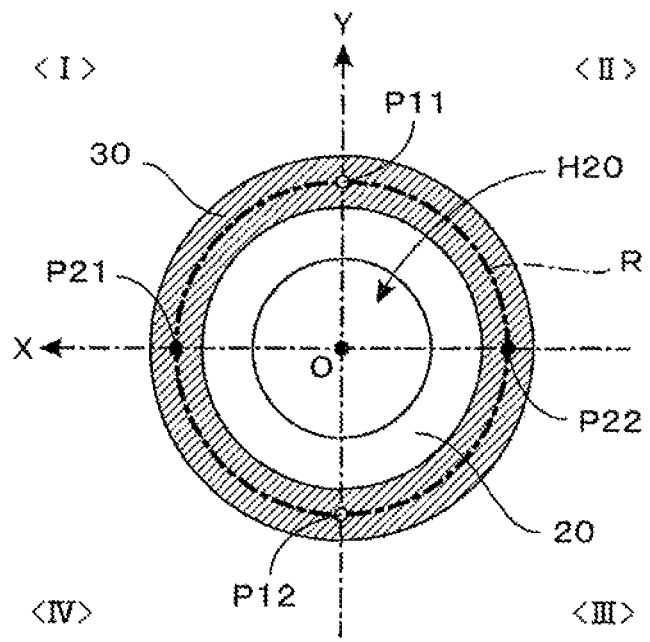
FIG. 7 is a sectional view in which the basic structural part shown in FIG. 2 is cut along an XY plane, when viewed from the left side in FIG. 2.

Next, here, consideration will be given to how various parts of the torque sensor are deformed when torque is exerted on the basic structural part in the torque sensor of the prior application described in Section 1. FIG. 7 is a sectional view in which the basic structural part shown in FIG. 2 is cut along the XY plane, when viewed from the left side in FIG. 2. The XY coordinate system shown in FIG. 7 is such that an ordinary XY coordinate system is viewed from the back (the positive direction of the X axis is the leftward direction in the drawing). Therefore, in the XY coordinate system, the upper left domain serves as a first quadrant, the upper right domain serves as a second quadrant, the lower right domain serves as a third quadrant, and the lower left domain serves as a fourth quadrant. The numbers I to IV shown in the drawing indicate the respective quadrants of the coordinate system. The cross sectional part with hatching in the drawing corresponds to the part of the annular deformation body 30, at the back of which the right side support body 20 can be observed. The points P11 to P22 shown in the drawing are orthogonal projection images of the respective connection points P11 to P22 shown in FIG. 4 and FIG. 6 on the XY plane.

That is, in FIG. 7, the points P11, P12 disposed on the Y axis and indicated by the white dot indicate joined positions (center points of joined surfaces) of the protruding parts 11, 12 on the left side support body 10, and the points P21, P22 disposed on the X axis and indicated by the black dot indicate joined positions (center points of joined surfaces) of the protruding parts 21, 22 on the right side support body 20. As a result, the left side surface of the annular deformation body 30 is joined to the left side support body 10 at the connection points P11, P12 at two sites along the Y axis, and the right side surface of the annular deformation body 30 is joined to the right side support body 20 at the connection points P21, P22 at two sites along the X axis.

In the case of the example shown in the drawing, each of the connection points P11, P12, P21, P22 is positioned on a basic annular channel R indicated by the alternate long and short dashed line in the drawing (a circle positioned between an inner circumference circle and an outer circumference circle of the annular deformation body 30 on the XY plane). As described above, two upper and lower sites of the annular deformation body 30 are joined to the left side support body 10 and two left and right sites thereof are joined to the right side support body 20 so that each of the connection points deviates by every 90 degrees, thus making it possible to deform the annular deformation body 30 efficiently by exertion of torque.

In the case of the example shown in FIG. 7, where both of the side surfaces of the annular deformation body 30 are projected on the XY plane to obtain orthogonal projection images, a projection image of the first right side connection point P21 is disposed on the positive X axis, a projection image of the second right side connection point P22 is disposed on the negative X axis, a projection image of the first left side connection point P11 is disposed on the positive Y axis and a projection image of the second left side connection point P12 is disposed on the negative Y axis. Where these are disposed as described above, the annular deformation body 30 can be deformed into an elliptical shape having axial symmetry, by which it is possible to obtain a detection value with axial symmetry.

The torque sensor of the prior application (as with the torque sensor according to the present invention) is to detect torque (rotational moment) which is applied relatively between the left side support body 10 and the right side support body 20 at the basic structural part shown in FIG. 2. And, a detection value thereof indicates a force which is exerted relatively between both support bodies 10, 20. Therefore, here, for the sake of convenience of description, in a state that a load is applied to the right side support body 20, rotational moment applied to the left side support body 10 is considered as torque to be detected (as a matter of course, it is also equally valid that in a state that a load is applied to the left side support body 10, rotational moment applied to the right side support body 20 is considered as torque to be detected).

For example, as an example in which the torque sensor is used for a joint part of a robot arm, consideration is given to an example in which a drive source such as a motor is mounted on the left side support body 10 and a robot hand is mounted on the right side support body 20. If a rotational drive force is applied to the left side support body 10 from the drive source, with a heavy object grasped by the robot hand, the rotational drive force is transmitted to the robot hand via the basic structural part which constitutes the joint part. In this case, torque which will rotationally drive the right side support body 20 is exerted, and the torque corresponds to rotational moment applied to the left side support body 10 in a state that the right side support body 20 is fixed.

Next, consideration is given to a change in the structural body shown in FIG. 7 by the rotational moment. When the right side support body 20 is fixed, the positions of the connection points P21, P22 (black dots) on the X axis shown in FIG. 7 are in a fixed state. On the other hand, if rotational moment is applied to the left side support body 10, for example, in the clockwise direction in FIG. 7, the connection points P11, P12 (white dots) on the Y axis attempt to move clockwise. Next, it is inevitable that apart of circular arcs P21 to P11 positioned at the first quadrant I undergoes inward contraction, a part of circular arcs P11 to P22 positioned at the second quadrant II undergoes outward expansion, a part of circular arc P22 to P12 positioned at the third quadrant III undergoes inward contraction and a part of circular arc P12 to P21 positioned at the fourth quadrant IV undergoes outward expansion.

Figure 8:
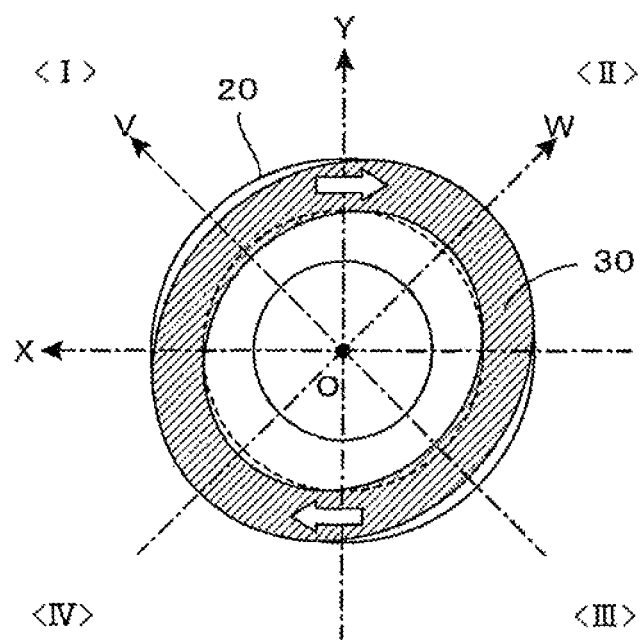
FIG. 8 is a sectional view on the XY plane which shows a deformation state when torque which is positive rotation around the Z axis is exerted on the basic structural part shown in FIG. 2 (this is a sectional view in which the basic structural part shown in FIG. 2 is cut along the XY plane, when viewed from the left side in FIG. 2. The broken line indicates a state before deformation).

FIG. 8 is a sectional view which shows a state that the above-described deformation has occurred in the structural body shown in FIG. 7. That is, this is a sectional view in which upon exertion of torque which is positive rotation around the Z axis on the basic structural part shown in FIG. 2, the basic structural part is cut along the XY plane, when viewed from the left side in FIG. 2. In the present application, with regard to any given coordinate axis, a rotating direction at which a right-hand screw is allowed to advance in the positive direction of the coordinate axis concerned is defined as a positive direction, whereas a rotating direction at which the right-hand screw is allowed to advance in the negative direction of the coordinate axis concerned is defined as a negative direction. Therefore, in FIG. 8, torque which is positive rotation around the Z axis is torque which is exerted in the clockwise direction, as indicated by the outlined arrow in the drawing.

The broken line given in FIG. 8 indicates a state before deformation of the annular deformation body 30 (a state given in FIG. 7). With reference to the broken line, it can be easily understood that torque which is positive rotation around the Z axis is exerted, by which the annular deformation body 30 is deformed into an elliptical shape. Here, for the sake of convenience of description, the V axis and the W axis which pass through the origin O and give 45 degrees with respect to the X axis and the Y axis are defined on the XY plane. The V axis is a coordinate axis in which the first quadrant I is given as the positive direction, and the W axis is a coordinate axis in which the second quadrant II is given as the positive direction. As shown in the drawing, the annular deformation body 30 is deformed into an elliptical shape having a short-axis direction along the V axis and a long-axis direction along the W axis, giving axial symmetry with respect to the V axis and the W axis. This axial symmetry is favorable in obtaining a detection value of torque according to a method which is to be described in Section 3.

In the embodiment shown in the drawing, deformation giving axial symmetry occurs because as shown in FIG. 7, the annular deformation body 30 is formed in a perfect circular shape, with no load applied (when no torque is exerted). And, where both side surfaces of the annular deformation body 30 are projected on the XY plane to obtain orthogonal projection images, a projection image of the first right side connection point P21 is disposed on the positive X axis, a projection image of the second right side connection point P22 is disposed on the negative X axis, a projection image of the first left side connection point P11 is disposed on the positive Y axis, and a projection image of the second left side connection point P12 is disposed on the negative Y axis.

The greater the exerted torque, the more the annular deformation body 30 is deformed into a flatter elliptical shape. Therefore, in FIG. 8, if a distance of a part of the annular deformation body 30 positioned on the V axis from the origin O and a distance of a part of the annular deformation body 30 positioned on the W axis from the origin O can be measured (these distances serve as information indicating displacement amount from the position before deformation indicated by the broken line), it is possible to determine the magnitude of the exerted torque. In other words, it is sufficient to measure displacement of the annular deformation body 30 in the radial direction of the inner circumferential surface or the outer circumferential surface.

On the other hand, where torque is exerted reversely, that is, upon exertion of torque which is negative rotation around the Z axis, contrary to the example shown in FIG. 8, a counterclockwise rotational force is exerted on the annular deformation body 30 (the connection points P11, P12 thereof). Therefore, the annular deformation body 30 is deformed into an elliptical shape having a long-axis direction along the V axis and a short-axis direction along the W axis. Thus, apart of the annular deformation body 30 positioned on the V axis or a part thereof positioned on the W axis undergoes displacement in a direction which is reverse to that of the example shown in FIG. 8.

Consequently, in the torque sensor of the prior application, displacement is measured at the part of the annular deformation body 30 positioned on the V axis or the part thereof positioned on the W axis, thus making it possible to detect both the direction and magnitude of exerted torque. For example, where there is monitored a position at which the inner circumferential surface of the annular deformation body 30 intersects with the V axis, it can be judged that torque which is positive rotation around the Z axis is exerted upon inward displacement from a reference position indicated by the broken line and torque which is negative rotation around the Z axis is exerted upon outward displacement. Alternatively, where there is monitored a position at which the inner circumferential surface of the annular deformation body 30 intersects with the W axis, it is judged that torque which is positive rotation around the Z axis is exerted upon outward displacement from the reference position indicated by the broken line and torque which is negative rotation around the Z axis is exerted upon inward displacement. As a matter of course, an absolute value of displacement amount is to indicate the magnitude of the exerted torque.

In the torque sensor of the prior application, the annular deformation body 30 undergoes relatively great radial displacement depending on the radius of the annular deformation body, despite a small torsion angle occurring at the annular deformation body 30. Accordingly, even if there is used an annular deformation body 30 relatively high in rigidity, it is possible to detect torque at sufficient sensitivity.

There has been described above the principle of detecting torque in the torque sensor of the prior application. In the torque sensor of the prior application, a capacitive element and a detection circuit are also added to the basic structural part described above in order to detect torque on the basis of the above-described principle.

<<<Section 3. Detection Method by Using Capacitive Elements in the Torque Sensor of the Prior Application>>>

In the torque sensor of the prior application, a capacitive element and a detection circuit are also added to the basic structural part shown in FIG. 2, thereby constituting the torque sensor. As shown in FIG. 8, the annular deformation body 30 is deformed into an elliptical shape by exertion of torque. The part which undergoes displacement to the greatest extent resulting from the above deformation is a part positioned on the V axis or a part positioned on the W axis. Therefore, in order to measure an extent of deformation (magnitude of exerted torque) of the annular deformation body 30 on the basis of displacement of a specific part of the annular deformation body 30, it is most efficient to measure displacement of the part positioned on the V axis or the part positioned on the W axis.

Figure 9:
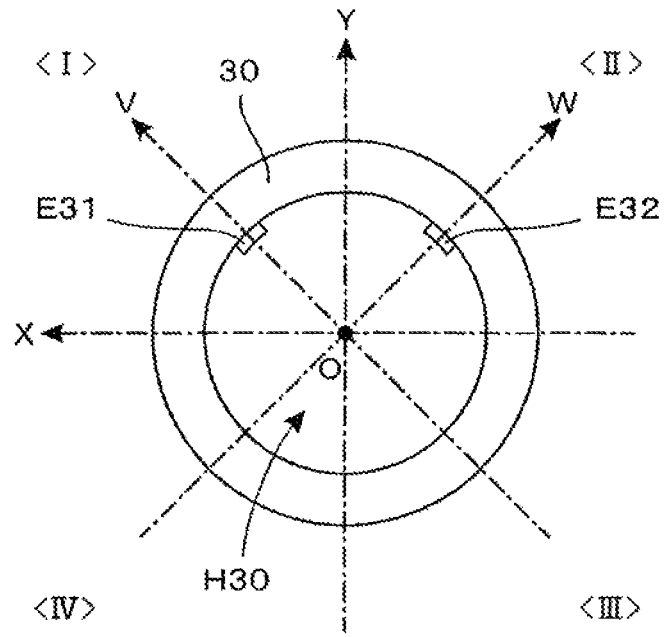
FIG. 9 is a plan view which shows the annular deformation body 30 in a state that displacement electrodes E31, E32 are formed on an inner circumferential surface thereof, when viewed from the left side in FIG. 2.

Thus, in the torque sensor of the prior application, a displacement electrode is formed at the part positioned on the V axis and the part positioned on the W axis on an inner circumferential surface of the annular deformation body 30. FIG. 9 is a plan view which shows the annular deformation body 30 in a state that displacement electrodes E31, E32 are formed on the inner circumferential surface, when viewed from the left side in FIG. 2. For the sake of convenience of description, the X, Y, Z, V, and W axes are drawn in an overlapped manner. The displacement electrode E31 is an electrode which is formed at a position at which a positive domain of the V axis intersects with the inner circumferential surface of the annular deformation body 30, and the displacement electrode E32 is an electrode which is formed at a position at which a positive domain of the W axis intersects with the inner circumferential surface of the annular deformation body 30. The depth dimension of each of the displacement electrodes E31, E32, (the dimension in a direction perpendicular to the sheet surface in FIG. 9) is equal to the depth dimension of the annular deformation body 30. In the case of this example, the displacement electrodes E31, E32 are constituted on the inner circumferential surface of the annular deformation body 30 with a conductive layer such as a metal film formed by a method such as vapor deposition and plating. As a matter of course, where the annular deformation body 30 is made of a metal such as aluminum or stainless steel, the annular deformation body 30 itself has electrical conductivity. Thus, it is necessary to form the displacement electrodes E31, E32 via an insulating layer.

Figure 10:
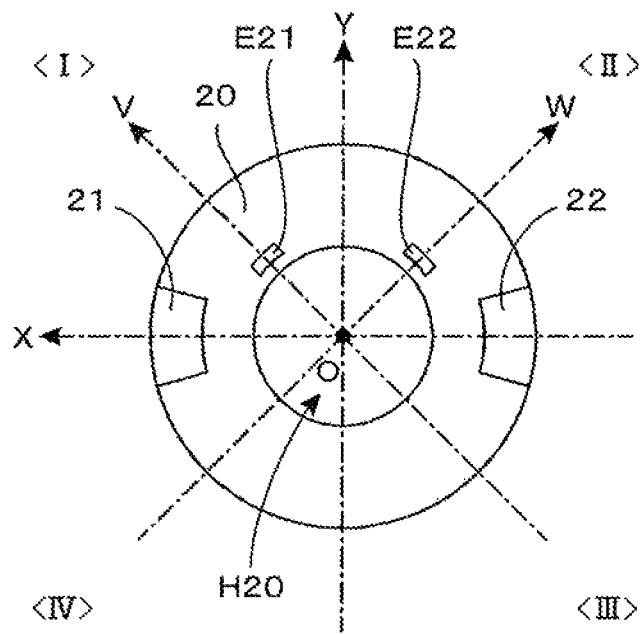
FIG. 10 is a plan view which shows the right side support body 20 in a state that fixed electrodes E21, E22 are attached, when viewed from the left side in FIG. 2.

On the other hand, fixed electrodes E21, E22 are provided at respective positions which oppose the displacement electrodes E31, E32 and fixed to the right side support body 20. FIG. 10 is a plan view which shows the right side support body 20 in a state that the fixed electrodes E21, E22 are mounted, when viewed from the left side in FIG. 2. Also here, for the sake of convenience of description, the X, Y, V, and W axes are drawn in an overlapped manner. The fixed electrode E21 is disposed at the positive domain of the V axis, opposing the displacement electrode E31. The fixed electrode E22 is disposed at the positive domain of the W axis, opposing the displacement electrode E32.

Figure 11:
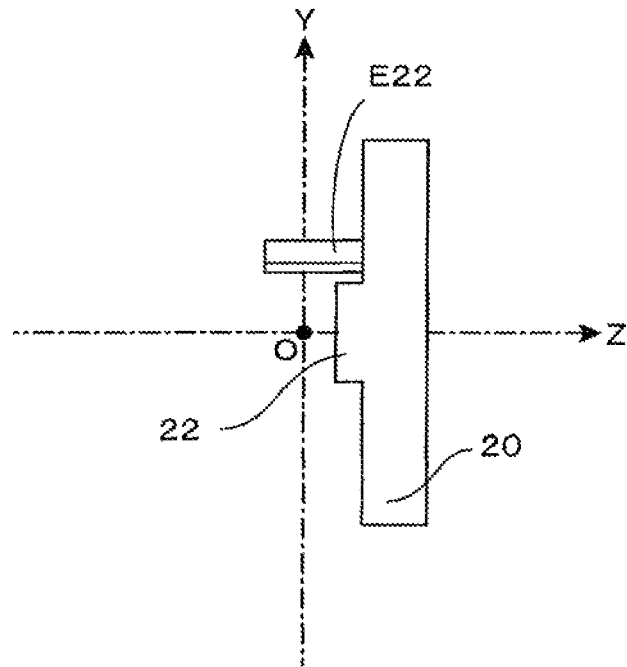
FIG. 11 is a side view which shows the right side support body 20 shown in FIG. 10.

FIG. 11 is a side view of the right side support body 20 shown in FIG. 10. As shown in the drawing, the fixed electrode E22 is constituted of a conductive plate protruding from the left side surface of the right side support body 20 in a direction along the rotation axis (the negative direction of the Z axis). The fixed electrode E21 is hidden behind the fixed electrode E22 and therefore does not appear in FIG. 11.

Figure 12:
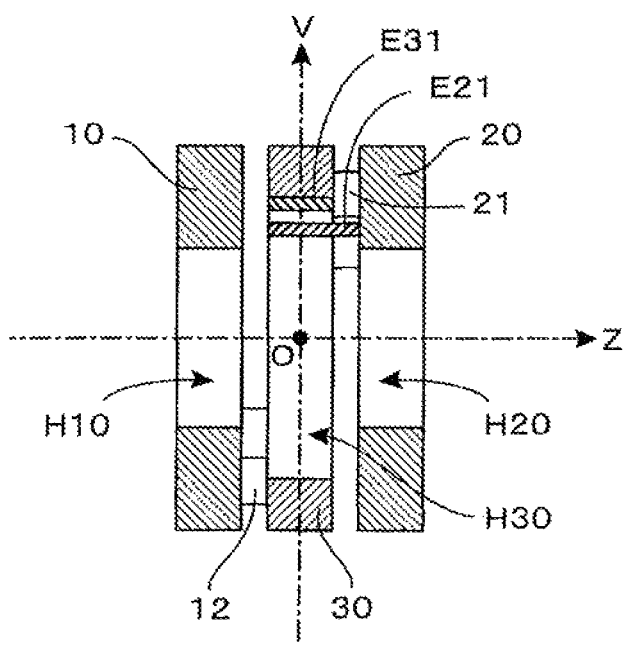
FIG. 12 is a side sectional view in which a structural body obtained by adding a displacement electrode and a fixed electrode to the basic structural part shown in FIG. 3 is cut along a VZ plane (the upside of FIG. 12 is the direction of the V axis shown in FIG. 9 and FIG. 10).

FIG. 12 is a side sectional view in which a structural body having a displacement electrode and a fixed electrode added to the basic structural part shown in FIG. 3 is cut along the VZ plane. FIG. 3 is a side sectional view in which the structure body is cut along the YZ plane, whereas FIG. 12 is a side sectional view in which it is cut along the VZ plane. Therefore, the upside of FIG. 12 is not the direction of the Y axis but the direction of the V axis shown in FIG. 9 and FIG. 10. In the side sectional view of FIG. 12, it is clearly shown that the displacement electrode E31 and the fixed electrode E21 disposed on the V axis are in a state opposing each other. The displacement electrode E31 is an electrode which is firmly fixed to the inner circumferential surface of the annular deformation body 30 and, therefore, causes displacement depending on deformation of the annular deformation body 30. On the other hand, the fixed electrode E21 is fixed at its right end to the right side support body 20 and always keeps a constant position, despite deformation of the annular deformation body 30.

Consequently, a relative position of the displacement electrode E31 in relation to the fixed electrode E21 is changed depending on deformation of the annular deformation body 30. In other words, a distance between the displacement electrode E31 and the fixed electrode E21 is changed depending on deformation of the annular deformation body 30. Although not shown in FIG. 12, a relationship between the displacement electrode E32 and the fixed electrode E22 disposed on the W axis is also exactly the same as the above-described relationship.

Figure 13:
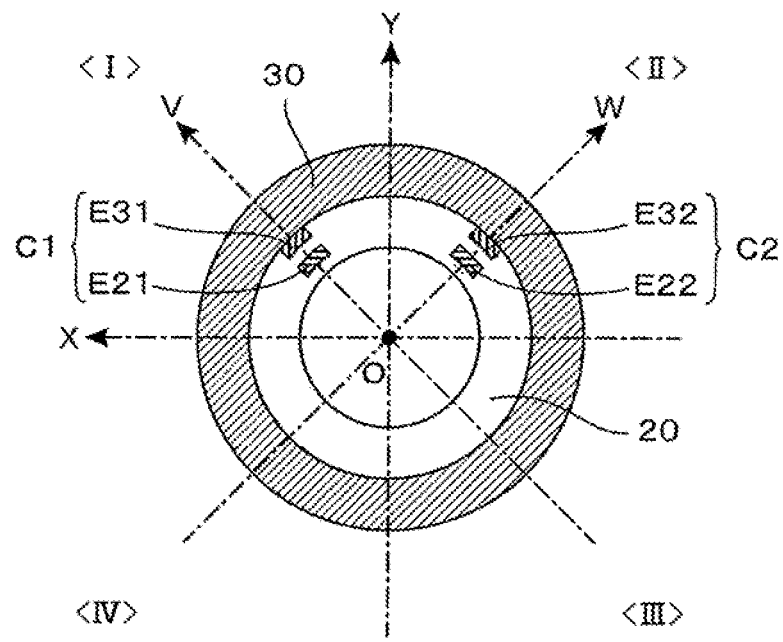
FIG. 13 is a sectional view in which a structural body obtained by adding the displacement electrode and the fixed electrode to the basic structural part shown in FIG. 2 is cut along the XY plane, when viewed from the left side in FIG. 2.

FIG. 13 is a sectional view in which the structural body having the above-described displacement electrodes and the fixed electrodes added to the basic structural part shown in FIG. 2 is cut along the XY plane, when viewed from the left side in FIG. 2. In this sectional view, there is clearly shown a state in which the displacement electrode E31 and fixed electrode E21 disposed on the V axis oppose each other and the displacement electrode E32 and the fixed electrode E22 disposed on the W axis oppose each other.

In the case of the example shown here, the displacement electrodes E31, E32 are each constituted of a conductive layer formed on the inner circumferential surface of the annular deformation body 30 and, therefore, the surface thereof is formed as a curved surface along the inner circumference of the annular deformation body 30. Thus, the fixed electrodes E21, E22 which oppose thereto are also provided as electrodes, the surfaces of which are curved. In other words, the surface of each of the displacement electrodes E31, E32 and the fixed electrodes E21, E22 is constituted of a concentric cylindrical surface, with the Z axis given as the central axis. Of course, each of the electrodes may be formed in any surface shape, as long as it can play a role of constituting a capacitive element. Therefore, there may be used a flat plate-shaped electrode, the surface of which is planar.

In the drawings of the present application, for the sake of convenience of illustration, each of the displacement electrodes and each of the fixed electrodes are depicted, with actual thickness dimensions disregarded. For example, where the displacement electrodes E31, E32 are constituted of a conductive layer (vapor deposition layer or plating layer) on the inner circumferential surface of the annular deformation body 30, their thickness can be set to the order of a few micrometers. In contrast, where the fixed electrodes E21, E22 are constituted of a conductive plate (metal plate) protruding from the left side surface of the right side support body 20, it is preferable that their thickness is set to the order of a few millimeters in order to secure the strength in practical use. Therefore, in FIG. 13, etc., for the sake of convenience, the displacement electrodes and the fixed electrodes are depicted so as to be equal in thickness. However, actual thickness dimensions of these electrodes should be each set to an appropriate value, with consideration given to a production process and strength in practical use.

Figure 14:
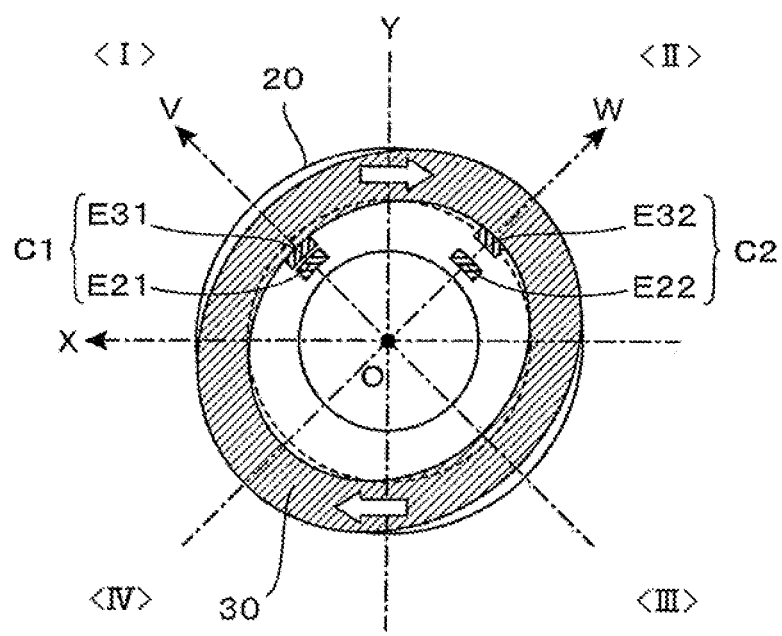
FIG. 14 is a sectional view which shows a state when torque which is positive rotation around the Z axis is exerted on the basic structural part shown in FIG. 13 (the broken line indicates a state before deformation).

FIG. 14 is a sectional view on the XY plane which shows a state when torque which is positive rotation around the Z axis is exerted on the basic structural part shown in FIG. 13. As described in Section 2, upon exertion of the torque, the annular deformation body 30 is deformed into an elliptical shape, and the V axis is in a short-axis direction of the ellipse, while the W axis is in a long-axis direction of the ellipse. As a result, the electrode interval between the pair of electrodes E21, E31 disposed on the V axis is decreased, and the electrode interval between the pair of electrodes E22, E32 disposed on the W axis is increased. Thus, a capacitive element C1 is constituted of the pair of electrodes E21, E31 and a capacitive element C2 is constituted of the pair of electrodes E22, E32, thus making it possible to detect the direction and magnitude of the exerted torque as the amount of fluctuation in capacitance value of the capacitive elements C1, C2.

For example, when focus is given to the fluctuation in capacitance value of the capacitive element C1 constituted of the electrodes E21, E31 with reference to an unloaded state (a state where no torque is exerted) shown in FIG. 13, upon exertion of torque which is positive rotation around the Z axis as shown in FIG. 14, the electrode interval is decreased to result in an increase in capacitance value. In contrast, upon exertion of torque which is negative rotation around the Z axis, the electrode interval is increased to result in a decrease in capacitance value. Therefore, the increased fluctuation in capacitance value indicates exertion of torque which is positive rotation around the Z axis, and the decreased fluctuation in capacitance value indicates exertion of torque which is negative rotation around the Z axis. As a matter of course, an absolute value of the amount of fluctuation indicates the magnitude of the exerted torque.

Similarly, when focus is given to the fluctuation in capacitance value of the capacitive element C2 constituted of the electrodes E22, E32, upon exertion of torque which is positive rotation around the Z axis as shown in FIG. 14, the electrode interval is increased to result in a decrease in capacitance value. In contrast, upon exertion of torque which is negative rotation around the Z axis, the electrode interval is decreased to result in an increase in capacitance value. Therefore, the decreased fluctuation in capacitance value indicates exertion of torque which is positive rotation around the Z axis. The increased fluctuation in capacitance value indicates exertion of torque which is negative rotation around the Z axis. As a matter of course, an absolute value of the amount of fluctuation indicates the magnitude of the exerted torque.

Consequently, torque around the Z axis can be detected by using the capacitive element C1 and also by using the capacitive element C2. Theoretically, such detection can be made by using only one of the capacitive elements. However, in practice, it is preferable that detection is made by using both of the capacitive elements C1, C2. That is, if the capacitive elements C1, C2 are provided respectively at the short-axis position (on the V axis) and the long-axis position (on W axis) upon deformation of the annular deformation part 30 into an elliptical shape, the electrode interval is decreased upon exertion of the same torque to result in an increase in capacitance value at the short-axis position (on the V axis), whereas the electrode interval is increased to result in a decrease in capacitance value at the long-axis position (on the W axis). Therefore, it is possible to detect the exerted torque as a difference in both capacitance values C1, C2. The difference detection is effective in performing stable torque detection in which common-mode noise and zero-point drift are suppressed. This also sets off the influences of dilation at various parts due to temperatures, thereby contributing to obtaining a detection value high in accuracy.

In order to perform the above-described difference detection, in short, it will be sufficient that, of individual parts of the annular deformation body 30, there are provided a first displacement electrode E31 fixed to a first part (in this example, an intersecting part with the V axis) which undergoes displacement in a direction moving close to the rotation axis, a second displacement electrode E32 fixed to a second part (in this example, an intersecting part with the W axis) which undergoes displacement in a direction moving away from the rotation axis upon exertion of torque in a predetermined rotating direction, a first fixed electrode E21 disposed at a position which opposes the first displacement electrode E31, and a second fixed electrode E22 disposed at a position which opposes the second displacement electrode E32.

Next, as a detection circuit for performing the difference detection, it will be sufficient that there is provided a circuit which outputs an electric signal corresponding to a difference between a capacitance value of the first capacitive element C1 constituted of the first displacement electrode E31 and the first fixed electrode E21 and a capacitance value of the second capacitive element C2 constituted of the second displacement electrode E32 and the second fixed electrode E22 as an electric signal indicating the exerted torque.

As described above, the torque sensor of the prior application can be constituted by adding displacement electrodes and fixed electrodes to the simple basic structural part shown in FIG. 1, thus making it possible to provide a sensor which is small in size and high in rigidity. However, in terms of commercial mass-production, a great workload is needed for mounting the fixed electrodes and adjusting their positions, thereby posing such problems as reduction in production efficiency and increase in costs.

In the case of the example shown in FIG. 10, for example, the fixed electrodes E21, E22 are mounted on the right side support body 20 and required to be disposed at positions corresponding to the displacement electrodes E31, E32 mounted on the inner circumferential surface of the annular deformation body 30. That is, in actuality, as shown in FIG. 11, the fixed electrode E22 is required to be mounted so as to protrude to the left side in the perpendicular direction from the left side surface of the right side support body 20 and to be adjusted so that the opposing electrodes are both parallel to each other (in the case of the example shown in the drawing, it is required to be mounted so as to give exactly 90 degrees to the left side surface of the right side support body 20). Therefore, in order to fix the base end of the fixed electrode E22 exactly to the right side support body 20, there is needed a time-consuming step in its own way.

Further, as apparent from the side sectional view of FIG. 12, an electrode interval between the displacement electrode E31 and the fixed electrode E21 changes depending on a fixed state of the base end of the fixed electrode E21, and a detection value (a capacitance value of the capacitive element) will be influenced by the change. Therefore, in terms of commercial mass-production, it is necessary to adjust exactly the position of the fixed electrode E21 for each product, resulting in a great workload. Further, in order to perform the above-described difference detection, a plurality of capacitive elements are required to be disposed symmetrically and adjusted so that these are individually equal in electrode interval, which also results in an additional increase in workload.

The present invention is to provide a new device capable of further enhancing the production efficiency in order to solve the above-described problems found in the torque sensor of the prior application. Hereinafter, a detailed description will be given of the present invention on the basis of specific embodiments.

<<<Section 4. Basic Structural Part of Torque Sensor According to the Basic Embodiment of the Present Invention>>>

<4-1. Overall Constitution of Basic Structural Part>

Figure 15:
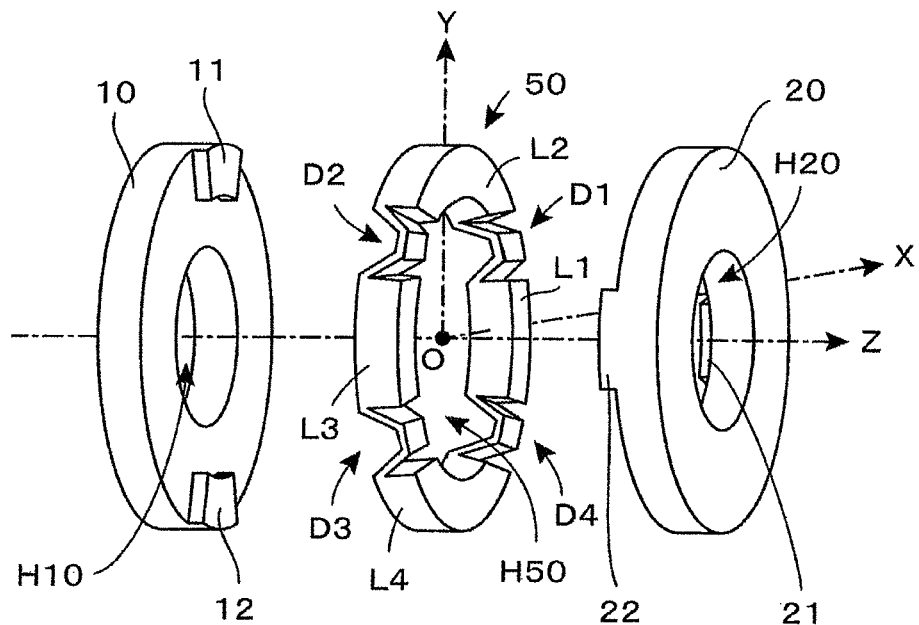
FIG. 15 is an exploded perspective view which shows a basic structural part of a torque sensor according to a basic embodiment of the present invention.

FIG. 15 is an exploded perspective view which shows a basic structural part of a torque sensor according to a basic embodiment of the present invention. As shown in the drawing, the basic structural part is constituted by disposing an annular deformation body 50 between a left side support body 10 and a right side support body 20 and joining these three constituents to each other. Also here, for the sake of convenience, as shown in the drawing, an XYZ three-dimensional coordinate system is defined to give the following description. The Z axis drawn in the horizontal direction of the drawing corresponds to a rotation axis of torque to be detected, and the torque sensor has functions to detect torque around the rotation axis (around the Z axis).

The basic structural part of the torque sensor of the prior application shown in FIG. 1 is different from the basic structural part of the torque sensor according to the present invention shown in FIG. 15 in that the annular deformation body 30 of the former is replaced by an annular deformation body 50 of the latter. The annular deformation body 30 shown in FIG. 1 is a circular annular member which is obtained by forming the through-opening part H30 smaller in diameter in the shape of a concentric disk at the center of the disk disposed, with the Z axis (rotation axis) given as the central axis. In contrast, the annular deformation body 50 shown in FIG. 15 is a member obtained by imparting partial material-removal processing to the circular annular deformation body 30, and the rotation axis (Z axis) is inserted through a through-opening part H60 formed in the interior thereof. Therefore, the annular deformation body 50 is basically a circular annular member in which the concentric disk-shaped through-opening part H50 is formed. Detection parts D1 to D4 shown in the drawing are formed by parts to which the material-removal processing is imparted.

It is noted that here, in order to describe the shape of the annular deformation body 50, the term "material-removal processing" is used. In actually preparing the annular deformation body 50, cutting, etc., is not necessarily imparted to the circular annular member. For example, where the annular deformation body 50 is constituted of a metal, it can be manufactured by molding with a casting mold. Where the annular deformation body 50 is constituted of a resin such as plastic, it can be manufactured by injection molding or pressing by use of a predetermined mold.

Here, of the annular deformation body 50, parts other than the detection parts D1 to D4 are referred to as coupling parts L1 to L4. As shown in the drawing, the annular deformation body 50 is structured so that the four sets of detection parts D1 to D4 and the four sets of coupling parts L1 to L4 are alternately disposed. The four sets of coupling parts L1 to L4 are each constituted of a circular arc-shaped part of the circular annular member, and the four sets of detection parts D1 to D4 are, as will be described below, structured so as to cause elastic deformation by exertion of torque. In the case of the example shown in the drawing, the parts of the detection parts D1 to D4 of the annular deformation body 50 are each constituted of a plate-shaped piece thin in thickness and the plate-shaped piece functions as a leaf spring, thereby causing elastic deformation by exertion of torque to be detected.

The left side support body 10 and the right side support body 20 shown in FIG. 15 are constituents which are identical to the left side support body 10 and the right side support body 20 shown in FIG. 1. These are circular annular members obtained by forming the through-opening parts H10, H20, each of which is smaller in diameter and formed in the shape of a concentric disk, at the center of the disk disposed, with the Z axis (rotation axis) given as the central axis. Consequently, in the case of the basic structural part shown in FIG. 15 as well, the left side support body 10 and the right side support body 20 are annular structural bodies which are respectively provided with through-opening parts H10, H20 at the center. And, there is secured an insertion hole which penetrates through the respective through-opening parts H10, H50, H20 of the left side support body 10, the annular deformation body 50 and the right side support body 20 along the Z axis (rotation axis). In carrying out the present invention, it is not essentially necessary that the through-opening parts H10, H20 are formed respectively on the support bodies 10, 20. Therefore, it is not always necessary to provide the through-opening parts H10, H20.

In the basic structural part shown in FIG. 15 as well, the left side support body 10 is a member which supports the left side surface of the annular deformation body 50, and the right side support body 20 is a member which supports the right side surface of the annular deformation body 50. Also here, the origin O of the XYZ three-dimensional coordinate system is defined at the center position of the annular deformation body 50. Any of the left side support body 10, the annular deformation body 50 and the right side support body 20 is disposed so that the Z axis is given as the central axis.

Further, two fan-shaped protruding parts 11, 12 protruding to the right side (left side connection members) are provided on the right side surface of the left side support body 10, and top surfaces of the protruding parts 11, 12 are joined to the left side surface of the annular deformation body 50. Similarly, two fan-shaped protruding parts 21, 22 protruding to the left side (right side connection members) are provided on the left side surface of the right side support body 20, and top surfaces of the protruding parts 21, 22 are joined to the right side surface of the annular deformation body 50.

As shown in the drawing, the protruding part 11 is joined to an upper side of the annular deformation body 50 (the coupling part L2 positioned in the positive direction of the Y axis), whereas the protruding part 12 is joined to a lower side of the annular deformation body 50 (the coupling part L4 positioned in the negative direction of the Y axis). Similarly, the protruding part 21 is joined to a far part of the annular deformation body 50 (the coupling part L1 positioned in the positive direction of the X axis), whereas the protruding part 22 is joined to a near part of the annular deformation body 50 (the coupling part L3 positioned in the negative direction of the X axis). As will be described below, the connection positions of these protruding parts respectively correspond to the positions of connection points Q1 to Q4 of the annular deformation body 50.

Figure 16:
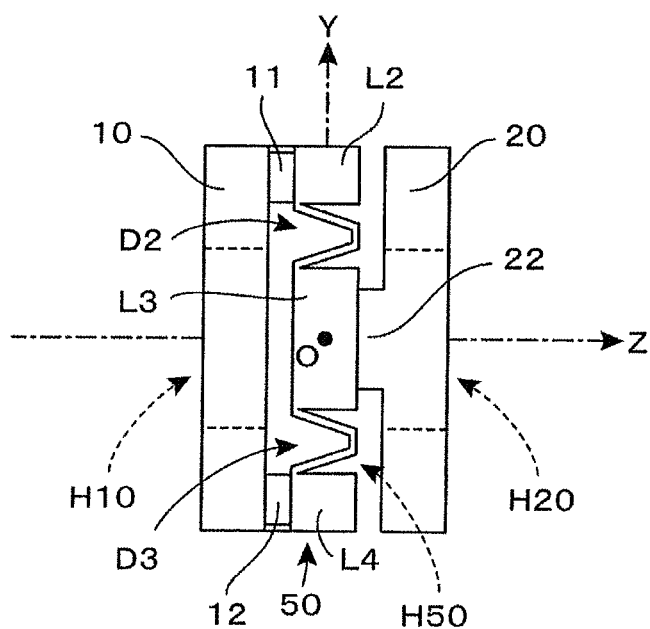
FIG. 16 is a side view which shows the basic structural part of the torque sensor according to the basic embodiment of the present invention which is obtained by joining three constituents shown in FIG. 15 to each other.

FIG. 16 is a side view which shows the basic structural part of the torque sensor obtained by joining the three constituents shown in FIG. 15 to each other (to avoid making the drawing complicated, as for the detection parts, there are indicated only the outer circumferential surfaces of the detection parts D2, D3 positioned forward). In the case of the example shown here, as shown in FIG. 15, the protruding parts 11, 12 are structural bodies formed integrally with the left side support body 10, and the top surfaces thereof are joined to the left side surfaces of the coupling parts L2, L4 of the annular deformation body 50. Similarly, the protruding parts 21, 22 are structural bodies formed integrally with the right side support body 20, and the top surfaces thereof are joined to the right side surfaces of the coupling parts L1, L3 of the annular deformation body 50.

Consequently, the protruding parts 11, 12 function as the left-side connection members which connect left side connection points on the left side surface of the annular deformation body 50 which opposes the left side support body 10 with the left side support body 10. The protruding parts 21, 22 function as the right-side connection members which connect right side connection points on the right side surface of the annular deformation body 50 which opposes the right side support body 20 with the right side support body 20.

Figure 17:
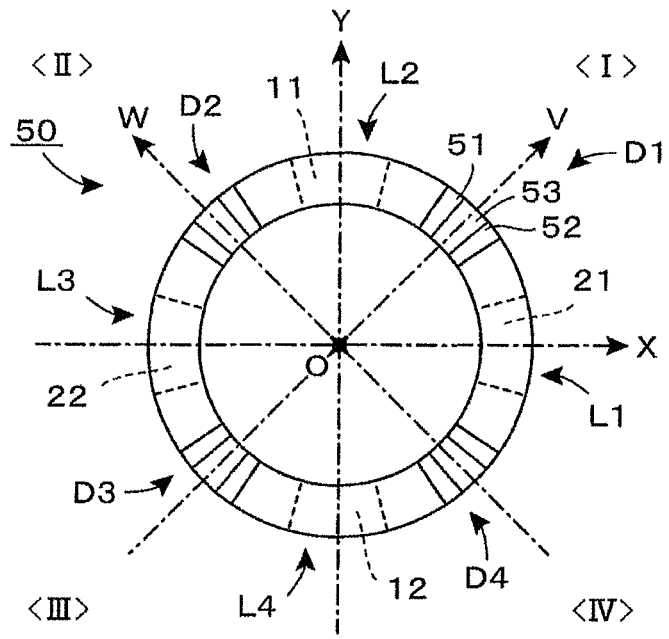
FIG. 17 is a front view of an annular deformation body 50 shown in FIG. 15, when viewed from the right side in FIG. 15.

FIG. 17 is a front view which shows the annular deformation body 50 shown in FIG. 15, when viewed from the right side in FIG. 15. In this drawing as well, for the sake of convenience of description, the V axis and the W axis which pass through the origin O and give 45 degrees with respect to the X axis and the Y axis are defined on the XY plane. The V axis is a coordinate axis in which the X axis is rotated counterclockwise by 45 degrees on the XY plane, with the origin O given as the center. The W axis is a coordinate axis in which the Y axis is rotated counterclockwise by 45 degrees on the XY plane, with the origin O given as the center. As shown in the drawing, the first detection part D1 is disposed on the positive V axis (first quadrant I), the second detection part D2 is disposed on the positive W axis (second quadrant II), the third detection part D3 is disposed on the negative V axis (third quadrant III) and the fourth detection part D4 is disposed on the negative W axis (fourth quadrant IV).

Here, each of the detection parts D1 to D4 is constituted of three components composed of a first deformation part 51, a second deformation part 52 and a displacement part 53. In the drawing, reference symbols are given only to components which constitute the detection part D1. The detection parts D2 to D4 are also constituted in the same manner. A three dimensional configuration of the four sets of detection parts D1 to D4 is as shown in the exploded perspective view of FIG. 15. Four sets of coupling parts L1 to L4 have functions of coupling the four sets of detection parts D1 to D4. And, the coupling parts L1 to L4 are respectively placed between each of the detection parts D1 to D4.

In FIG. 17, joined positions of the protruding parts 11, 12 (left side connection members) and joined positions of the protruding parts 21, 22 (right side connection members) are indicated by the broken lines.

Figure 18:
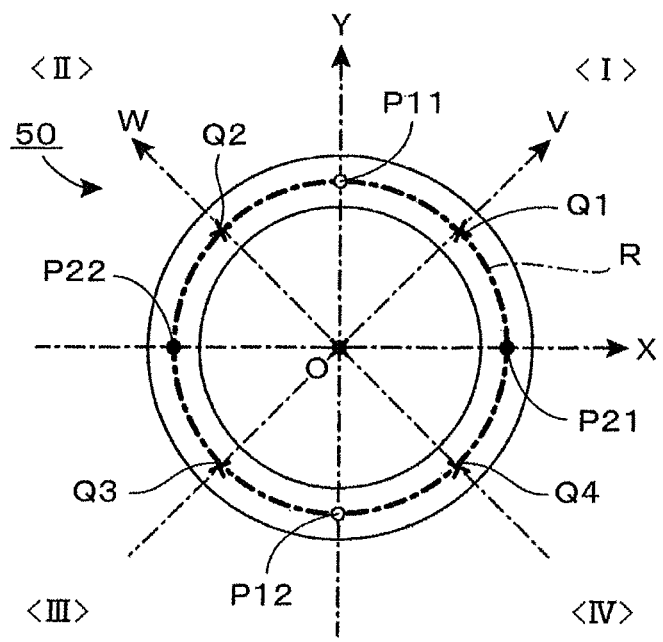
FIG. 18 is a projection view on the XY plane which indicates a disposition of individual detection points and individual connection points on the annular deformation body 50 shown in FIG. 15 (this is a view from the side of the right side support body 20: the annular deformation body 50 is shown only by a contour thereof).

FIG. 18 is a projection view on the XY plane which indicates a disposition of the individual detection points Q1 to Q4 and the individual connection points P11 to P22 on the annular deformation body 50 shown in FIG. 15 (a drawing viewed from the right side support body 20). The annular deformation body 50 is indicated only for a projection image formed by internal and external contour circles. Further, a thick circle depicted by the alternate long and short dashed line in the drawing is a basic annular channel R defined on the XY plane. In the case of the example shown in the drawing, the basic annular channel R is a circle on the XY plane which passes through an intermediate position between an internal contour circle of the annular deformation body 50 and an external contour circle thereof, and this is the center line of an annular thick part of the annular deformation body 50.

As shown in the drawing, four sets of the detection points Q1 to Q4 are defined as points on the basic annular channel R. Specifically, a first detection point Q1 is defined at a position at which the positive V axis intersects with the basic annular channel R, a second detection point Q2 is defined at a position at which the positive W axis intersects with the basic annular channel R, a third detection point Q3 is defined at a position at which the negative V axis intersects with the basic annular channel R, and a fourth detection point Q4 is defined at a position at which the negative W axis intersects with the basic annular channel R. The detection points Q1 to Q4 indicate the respective dispositions of the detection parts D1 to D4. That is, FIG. 17 is compared with FIG. 18 to understand that the first detection part D1 is disposed at a position of the first detection point Q1, the second detection part D2 is disposed at a position of the second detection point Q2, the third detection part D3 is disposed at a position of the third detection point Q3, and the fourth detection part D4 is disposed at a position of the fourth detection point Q4.

On the other hand, points P11, P12 indicated by the white dot in FIG. 18 are projection images of the left side connection points, and points P21, P22 indicated by the black dot in FIG. 18 are projection images of the right side connection points. As described above, the left side connection points P11, P12 are in actuality points on the left side surface of the annular deformation body 50, indicating the connection positions of the protruding parts 11, 12 (left side connection members). The right side connection points P21, P22 are in actuality points on the right side surface of the annular deformation body 50, indicating the connection positions of the protruding parts 21, 22 (right side connection members). In the case of the example shown in the drawing, projection images of these connection points P11 to P22 are also positioned on the basic annular channel R. That is, the projection images of the left side connection points P11, P12 are each defined at a position at which the Y axis intersects with the basic annular channel R, and the projection images of the right side connection points P21, P22 are each defined at a position at which the X axis intersects with the basic annular channel R.

Consequently, in the case of the example shown in FIG. 18, the left side connection points P11, P12 (white dots) indicating the connection positions of the left side connection members 11, 12 and the right side connection points P21, P22 (black dots) indicating the connection positions of the right side connection members 21, 22 are alternately disposed along the basic annular channel R. This alternate disposition is, as will be described below, important in causing effective deformation in the annular deformation body 50 upon exertion of torque to be detected. Further, four sets of the detection points Q1 to Q4 are disposed individually between the connection points P11 to P22. This disposition is also important in causing effective displacement at the respective detection parts D1 to D4 upon exertion of torque to be detected.

<4-2. Structure and Function of Detection Part>

Figure 19:
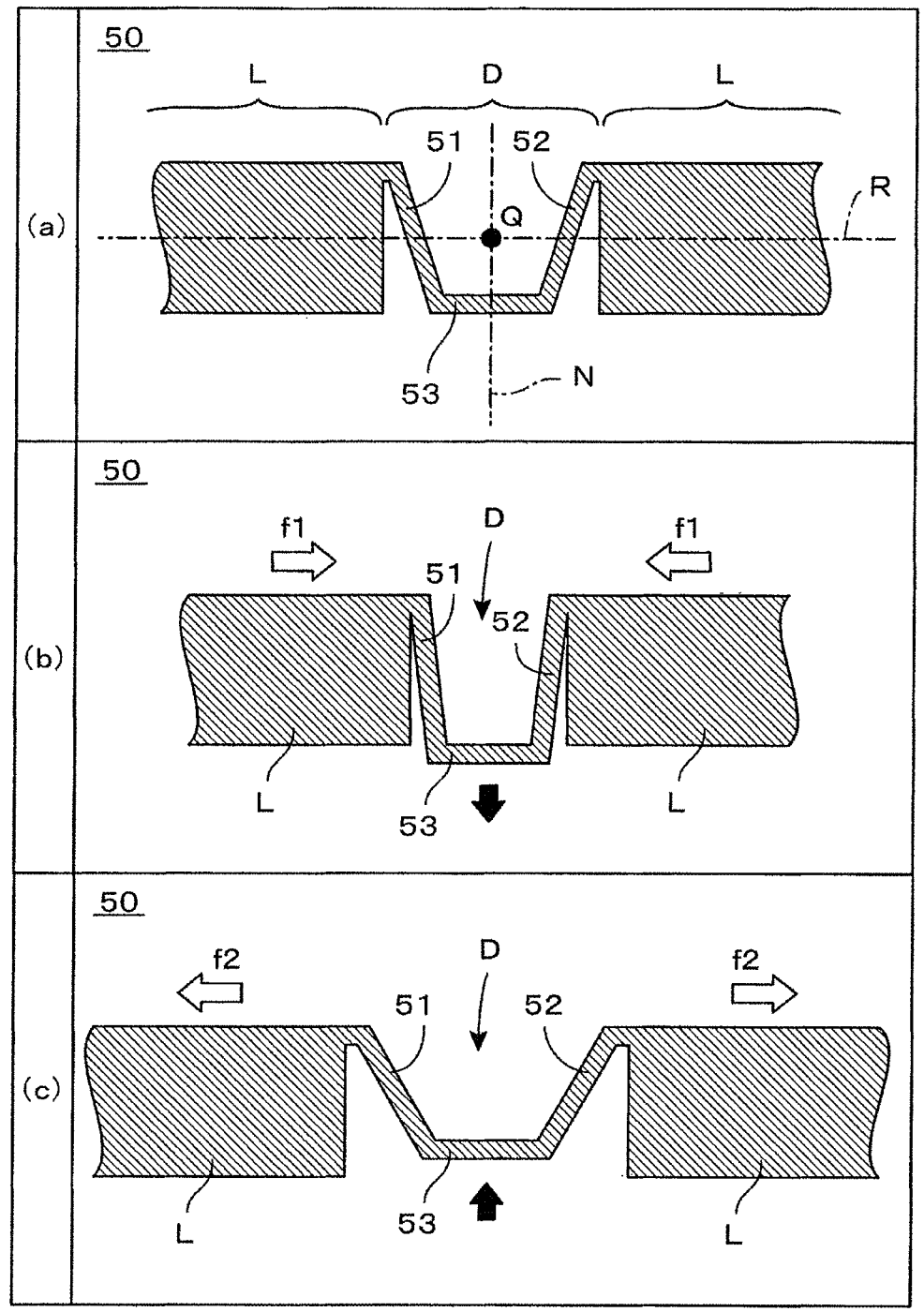
FIG. 19 covers partial sectional views, each of which shows a detailed structure of detection parts D1 to D4 of the annular deformation body 50 shown in FIG. 15 (representatively indicated by the symbol D).

Next, a description will be given of a structure and function of each of the detection parts D1 to D4. FIG. 19 is a partial sectional view which shows a detailed structure of the detection parts D1 to D4 of the annular deformation body 50 shown in FIG. 15. The four sets of detection parts D1 to D4 are identical in structure to each other. The detection part D shown in FIG. 19 represents the four sets of detection parts D1 to D4, showing a cross sectional part in which the annular deformation body 50 is cut along a cylindrical surface including the basic annular channel R. FIG. 19(a) indicates a state that no torque is exerted. FIG. 19(b) indicates a state that a compressive force f1 is exerted on the detection part D by exertion of torque. FIG. 19(c) indicates a state that an extension force f2 is exerted on the detection part D by exertion of torque.

As shown in FIG. 19(a), a coupling part L is positioned both on the left and right sides of the detection part D. The coupling part L corresponds to any one of the four sets of coupling parts L1 to L4. For example, where the detection part D shown in FIG. 19(a) is the second detection part D2 shown in FIG. 15, the coupling part L disposed on the right-hand side corresponds to the coupling part L2 shown in FIG. 15. The coupling part L disposed on the left-hand side corresponds to the coupling part L3 shown in FIG. 15.

As shown in the drawing, the detection part D is provided with a first deformation part 51 which causes elastic deformation by exertion of torque to be detected, a second deformation part 52 which causes elastic deformation by exertion of torque to be detected, and a displacement part 53 which causes displacement resulting from elastic deformation of the first deformation part 51 and the second deformation part 52. And, it is disposed between an end portion of the coupling part L disposed on the left-hand side and an end portion of the coupling part L disposed on the right-hand side.

In the example shown here, the first deformation part 51 is constituted of a first plate-shaped piece which has flexibility, the second deformation part 52 is constituted of a second plate-shaped piece which has flexibility, and the displacement part 53 is constituted of a third plate-shaped piece. In actuality, the annular deformation body 50 is constituted of a structural body made of the same material such as a metal (stainless steel or aluminum) and a synthetic resin (such as plastic). The first plate-shaped piece 51, the second plate-shaped piece 52 and the displacement part 53 are each a plate-shaped member thinner in thickness than the coupling part L and, therefore, have flexibility.

In the case of the example shown here, the displacement part 53 is also a plate-shaped member thinner in thickness and, therefore, has flexibility. However, the displacement part 53 is not necessarily a member which has flexibility (as a matter of course, it may have flexibility). The displacement part 53 plays a role of causing displacement to the opposing right side support body 20 upon exertion of torque. And in order to cause the displacement, it will be sufficient that the first deformation part 51 and the second deformation part 52 have flexibility. Therefore, the displacement part 53 is not necessarily constituted of a plate-shaped member thinner in thickness but may be a member thicker in thickness. On the other hand, the coupling part L may have certain flexibility. However, in order to cause effective deformation to the first deformation part 51 and the second deformation part 52 by exertion of torque, it is preferable that the coupling part L does not undergo deformation to the minimum extent possible.

An external end of the first deformation part 51 is connected to a coupling part L adjacent thereto and an internal end of the first deformation part 51 is connected to the displacement part 53. Further, an external end of the second deformation part 52 is connected to a coupling part L adjacent thereto and an internal end of the second deformation part 52 is connected to the displacement part 53. In the case of the example shown in FIG. 19 (a), the first deformation part, the second deformation part and the displacement part are constituted respectively with the first plate-shaped piece 51, the second plate-shaped piece 52 and the third plate-shaped piece 53. The external end (left end) of the first plate-shaped piece 51 is connected to a right end portion of the coupling part L disposed on the left-hand side, the internal end (right end) of the first plate-shaped piece 51 is connected to a left end of the third plate-shaped piece 53. The external end (right end) of the second plate-shaped piece 52 is connected to a left end portion of the coupling part L disposed on the right-hand side, and the internal end of the second plate-shaped piece 52 is connected to a right end of the third plate-shaped piece 53.

As described above, the detection part D is disposed at a position of the detection point Q defined on the basic annular channel R. The normal line N shown in FIG. 19(a) is a normal line orthogonal to the basic plane (XY plane) including the basic annular channel R provided at a position of the detection point Q, and the detection part D is disposed so that the normal line N comes to the center. Further, in the sectional view of FIG. 19 (a), the first plate-shaped piece 51 and the second plate-shaped piece 52 are inclined to the normal line N and also the first plate-shaped piece 51 is inclined (to descend in the rightward direction) and the second plate-shaped piece 52 is inclined (to ascend in the rightward direction) so as to be reverse in direction. In particular, in the case of the example shown in the drawing, the cross sectional shape of the detection part D gives line symmetry in relation to the normal line N, and both upper and lower surfaces of the third plate-shaped piece 53 constitute surfaces parallel to the XY plane.

As described above, with regard to the cross section including the basic annular channel R, the first plate-shaped piece 51 and the second plate-shaped piece 52 are inclined so as to be reverse in direction in relation to the normal line N. Therefore, the third plate-shaped piece 53 (displacement part) is reverse in the displacement direction depending on where a compressive force f1 is exerted or where an extension force f2 is exerted in a direction along the basic annular channel R. As will be described below, this is favorable in performing difference detection by using a plurality of capacitive elements.

That is, as shown in FIG. 19(b), where a compressive force f1 (indicated by the outlined arrow in the drawing) is exerted on the detection part D in a direction along the basic annular channel R, stress is applied to the detection part D in a direction at which the breadth is decreased. Therefore, postures of the first plate-shaped piece 51 and the second plate-shaped piece 52 are changed into a state that is erected perpendicularly to a greater extent. As a result, the third plate-shaped piece 53 (displacement part) undergoes downward displacement as indicated by the black arrow in the drawing. On the other hand, as shown in FIG. 19(c), where an extension force f2 (indicated by the outlined arrow in the drawing) is exerted on the detection part D in a direction along the basic annular channel R, stress is applied to the detection part D in a direction at which the breadth is increased. Therefore, postures of the first plate-shaped piece 51 and the second plate-shaped piece 52 are changed into a state that these are flattened in the horizontal direction to a greater extent. Consequently, the third plate-shaped piece 53 (the displacement part) undergoes upward displacement as shown by the black arrow in the drawing.

A basic principle of the present invention is to detect the direction and magnitude of exerted torque by using the above-described displacement. That is, the direction of exerted torque can be detected by the displacement direction of the displacement part 53 (whether downward or upward displacement in FIG. 19) and the magnitude of exerted torque can be detected by the displacement amount thereof.

<4-3. Constitution of Capacitive Element>

Figure 20:
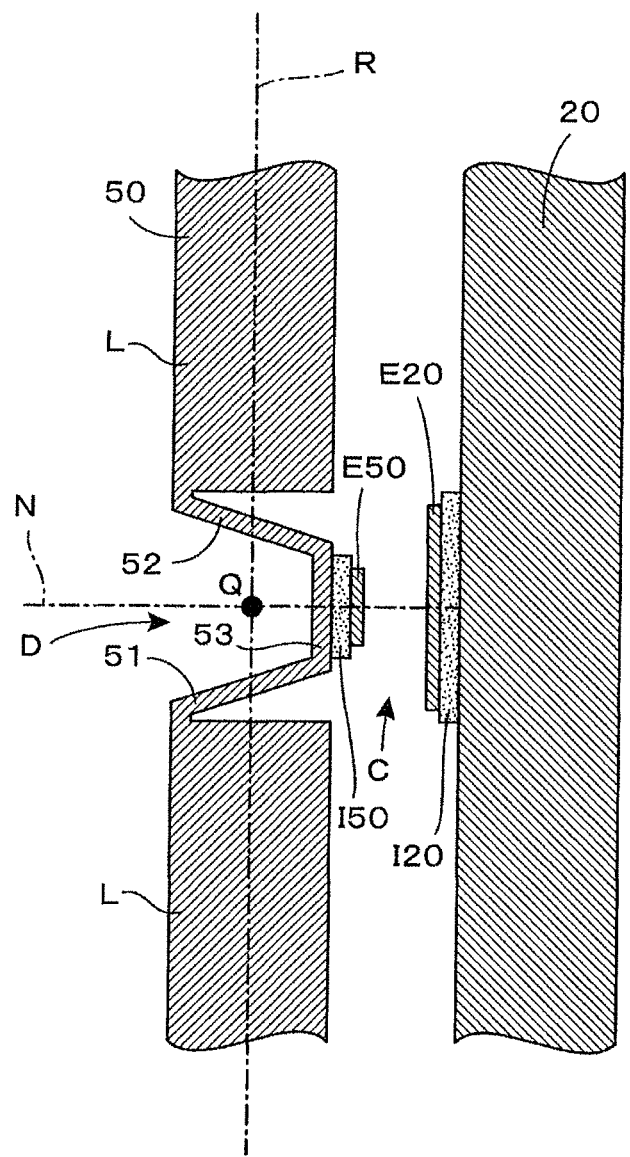
FIG. 20 is a partial sectional view which shows a detailed structure in which an electrode is provided at the detection parts D1 to D4 (representatively indicated by the symbol D) on the annular deformation body 50 shown in FIG. 15 and at predetermined parts of the right side support body 20 which oppose thereto.

In the present invention, a capacitive element is used to detect displacement of the displacement part 53. FIG. 20 is a partial sectional view which shows a detailed structure in which electrodes are provided at the detection parts D1 to D4 of the annular deformation body 50 and predetermined parts of the right side support body 20 opposing thereto shown in FIG. 15, thereby showing apart of the annular deformation body 50 and that of the right side support body 20 shown in FIG. 15. In FIG. 20 as well, the four sets of detection parts D1 to D4 are represented by the detection part D. This figure shows a cross sectional part in which the annular deformation body 50 is cut along a cylindrical surface including the basic annular channel R. That is, a part of the annular deformation body 50 shown on the left side in FIG. 20 corresponds to a part of the annular deformation body 50 shown in FIG. 19($a$).

As described above, in a state that no torque is exerted, both surfaces of the third plate-shaped piece 53 constitute surfaces parallel to the XY plane including the basic annular channel R. Therefore, as shown in the drawing, the third plate-shaped piece 53 (displacement part) is parallel to an opposing surface of the right side support body 20. In addition, in the case of the example shown here, the cross sectional shape of the detection part D gives line symmetry in relation to the normal line N, by which the third plate-shaped piece 53 (displacement part) causes displacement so as to move in parallel along the normal line N, as shown in FIG. 19($b$) and FIG. 19($c$). As a result, the third plate-shaped piece 53 (displacement part) is always kept parallel to the opposing surface of the right side support body 20.

In order to detect displacement of the displacement part, a displacement electrode E50 is fixed via an insulating layer I50 to a position of the third plate-shaped piece 53 (displacement part) which opposes the right side support body 20. Further, a fixed electrode E20 is fixed via an insulating layer I20 to a position of the right side support body 20 which opposes the displacement electrode E50. Then, the displacement direction and displacement amount of the third plate-shaped piece 53 (displacement part) on the basis of a capacitance value of a capacitive element C which is constituted of the displacement electrode E50 and the fixed electrode E20 can be detected.

Specifically, as shown in FIG. 19($b$), when a compressive force f1 is exerted on the detection part D, a distance between both electrodes is decreased to increase a capacitance value of the capacitive element C. As shown in FIG. 19($c$), when an extension force f2 is exerted on the detection part D, the distance between both electrodes is increased to decrease a capacitance value of the capacitive element C. FIG. 20 shows an example in which the capacitive element C is formed at the detection part D. As a matter of course, in actuality, the displacement electrode E50 and the fixed electrode E20 are provided at each of the four sets of detection parts D1 to D4 shown in FIG. 15, thereby forming four sets of capacitive elements C1 to C4. A principle for performing specific torque detection by using the four sets of capacitive elements C1 to C4 will be described in detail below at Section 5.

It is noted that in the example shown in FIG. 20, the displacement electrode E50 is fixed via the insulating layer I50 to the third plate-shaped piece 53 (displacement part). This is because the annular deformation body 50 is constituted of a conductive material such as a metal. Similarly, the fixed electrode E20 is fixed via the insulating layer I20 to the right side support body 20. This is because the right side support body 20 is constituted of a conductive material such as a metal. That is, in the case of the example shown here, the left side support body 10, the right side support body 20 and the annular deformation body 50 are constituted of a conductive material such as a metal. Therefore, the displacement electrode E50 is formed on the surface of the displacement part 53 via the insulating layer I50, and the fixed electrode E20 is formed on the surface of the right side support body 20 via the insulating layer I20.

Thus, where the annular deformation body 50 (of which at least a surface of forming the displacement electrode E50) is constituted of an insulating material such as a resin, it is not necessary to provide the insulating layer I50. Similarly, where the right side support body 20 (of which at least a surface of forming the fixed electrode E20) is constituted of an insulating material such as a resin, it is not necessary to provide the insulating layer I20.

Further, where the annular deformation body 50 is constituted of a conductive material such as a metal, a certain domain of the surface of the right side surface of the annular deformation body 50 can be used as the displacement electrode E50. For example, in the example shown in FIG. 20, the annular deformation body 50 is constituted of a conductive material, by which the third plate-shaped piece 53 (displacement part) is made into an electrically conductive plate. Then, the plate itself can function as the displacement electrode E50, thereby eliminating the necessity for separately providing the displacement electrode E50. In this case, in terms of electricity, an entire surface of the annular deformation body 50 is made equal in potential. However, a part which actually functions as the displacement electrode E50 of each of the four sets of capacitive elements C1 to C4 is only a domain which opposes each of the four sets of fixed electrode E20 provided individually. Therefore, each of the four sets of capacitive elements C1 to C4 behaves as a discrete capacitive element, which poses no difficulties in principle.

In contrast, where the right side support body 20 is constituted of a conductive material such as a metal, a certain domain of the surface of the left side surface of the right side support body 20 can be used as the fixed electrode E20. For example, in the example shown in FIG. 20, the right side support body 20 is constituted of a conductive material, by which a part of the surface of the left side surface thereof can function as the fixed electrode E20. Therefore, there is eliminated the necessity for separately providing the fixed electrode E20. In this case, in terms of electricity, an entire surface of the right side support body 20 is made equal in potential. However, the part which functions as the fixed electrode E20 of each of the four sets of capacitive elements C1 to C4 is actually only a domain which opposes each of four sets of displacement electrodes E50 separately provided. Therefore, each of the four sets of capacitive elements C1 to C4 behaves as a discrete capacitive element, which poses no difficulties in principle.

As described above, where the annular deformation body 50 is constituted of a conductive material such as a metal or where the right side support body 20 is constituted of a conductive material such as a metal, there is removed a step for providing a discrete displacement electrode E50 or a discrete fixed electrode E20, thus making it possible to further enhance the production efficiency.

Of course, the above simplified structure gives the annular deformation body 50 in its entirety or the right side support body 20 in its entirety as a common electrode, thus resulting stray capacitance generation at various parts which are not intended. As a result, a detection value of electrostatic capacitance may be easily mixed with noise components to decrease the detection accuracy. Thus, in a torque sensor which is required to perform high accuracy detection, even where the annular deformation body 50 and the right side support body 20 are constituted of a conductive material, as with the example shown in FIG. 20, it is preferable to provide a discrete displacement electrode E50 and a discrete fixed electrode E20 via the respective insulating layers.

It is noted that ease in elastic deformation of the detection part D serves as a parameter which influences the detection sensitivity of a sensor. Use of the detection part D which is more likely to undergo elastic deformation can provide a sensor high in sensitivity and capable of detecting subtle torque, with a maximum value of detectable torque suppressed. In contrast, use of the detection part D which is less likely to undergo elastic deformation is able to increase a maximum value of detectable torque but unable to detect subtle torque due to decreased sensitivity.

Ease in elastic deformation of the detection part D is determined depending on dimensions such as thickness (the thinner, the more easily elastic deformation will occur) of the first deformation part 51 (the first plate-shaped piece) and the second deformation part 52 (the second plate-shaped piece), the width thereof (the narrower, the more easily elastic deformation will occur) and the length thereof (the longer, the more easily elastic deformation will occur) and also depending on materials thereof. Further, the detection part D can be designed by such a structure that causes the displacement part 53 (the third plate-shaped piece) to undergo elastic deformation. Therefore, in practice, it will be sufficient that dimensions and materials of various parts of the detection part D may be appropriately selected depending on individual applications of a torque sensor.

As described above, for the sake of convenience of illustration, the drawings of the present application are depicted, with actual dimensions of various parts disregarded. For example, in FIG. 20, the displacement electrode E50 and the fixed electrode E20 as well as the insulating layer I50 and the insulating layer I20 are depicted so as to be substantially equal in thickness to each of the plate-shaped pieces 51, 52, 53. However, these electrodes and the insulating layers can be constituted by vapor deposition or plating, and the thickness thereof can be set to the order of a few micrometers. In contrast, it is preferable that the plate-shaped pieces 51, 52, 53 are designed to be greater in thickness, with practical strength taken into account. It is preferable that these are set to the order of one mm or so, for example, where these are constituted of a metal.

On the other hand, the left side support body 10 and the right side support body 20 are not required to be a member which causes elastic deformation according to the principle for detecting torque. Rather, in order that exerted torque contributes completely to deformation of the annular deformation body 50, the left side support body 10 and the right side support body 20 are preferably a perfect rigid body. In the example shown in the drawing, the reason why the annular structural bodies having the through-opening parts H10, H20 at the center are used as the left side support body 10 and the right side support body 20 is not for causing easy elastic deformation but for securing an insertion hole which penetrates through the respective through-opening parts H10, H50, H20 of the left side support body 10, the annular deformation body 50 and the right side support body 20 along the rotation axis (Z axis). As with the torque sensor of the prior application described in Section 1 to Section 3, such a structure is adopted that the interior is hollow, by which various components can be disposed in the hollow part to enhance practical usage.

As shown in FIG. 15, any of the left side support body 10, the right side support body 20 and the annular deformation body 50 can be constituted of a flat structural body which is thinner in thickness in the direction of the Z axis, thus making it possible to set an entire axial length of the sensor so as to be short. Further, electrodes for constituting the capacitive element C can be made simple in structure, by which an effect of enhancing the production efficiency can be expected. The effect can be easily understood by comparing the capacitive element of the torque sensor of the prior application illustrated in FIG. 12 with the capacitive element of the torque sensor according to the present invention illustrated in FIG. 20.

That is, in the torque sensor of the prior application illustrated FIG. 12, the capacitive element is constituted of the displacement electrode E31 formed on the inner circumferential surface of the annular deformation body 30 and the fixed electrode E21 fixed on the left side surface of the right side support body 20. Therefore, in order to fix a base end of the fixed electrode E21 exactly to the right side support body 20, there is a need for a time-consuming step. Further, a great amount of workload is needed for adjusting the position thereof, inevitably resulting in a decrease in production efficiency. In actuality, only a slight positional deviation of the fixed electrode E21 at the leading end could cause a fluctuation in distance between the displacement electrode E31 and the fixed electrode E21, by which the capacitive element will fluctuate in capacitance value. This problem is derived from such a disposition of the fixed electrode E21 so as to protrude from the left side surface of the right side support body 20 to the left in the perpendicular direction.

On the other hand, in the torque sensor according to the present invention illustrated in FIG. 20, the electrodes are all disposed along a forming surface thereof, by which the above-described problem is not posed. That is, the displacement electrode E50 is a layered electrode which is formed along the surface of the displacement part 53, and the fixed electrode E20 is a layered electrode formed along the left side surface of the right side support body 20. Since both of them are layered electrodes disposed along the forming surface, these can be formed by using a generally-accepted film forming step, thereby relatively reducing a workload in the film forming step.

Further, a clearance between the annular deformation body 50 and the right side support body 20 is regulated by the thickness of the protruding parts 21, 22 (right side connection members) shown in FIG. 15. Therefore, a clearance between the displacement electrode E50 and the fixed electrode E20 (electrode interval of the capacitive element C) can be accurately adjusted by controlling the thickness of each of the insulating layer I50, the displacement electrode E50, the fixed electrode E20 and the insulating layer I20. Use of a generally accepted film forming step makes it possible to control the thickness accurately. Even with commercial production, such adjustment can be easily made that an electrode opposing thereto is kept parallel to each of the capacitive elements and also that the plurality of capacitive elements are kept equal in electrode interval to each other. Due to the above-described reasons, according to the present invention, it is possible to provide a torque sensor which is small in size, high in rigidity and capable of realizing high production efficiency.

<<<Section 5. Principle of Detecting Torque by Torque Sensor According to the Basic Embodiment>>>

Next, a description will be given of the principle of detecting torque by the torque sensor described in Section 4.

<5-1. Detection of Torque by Use of Capacitive Element>

Figure 21:
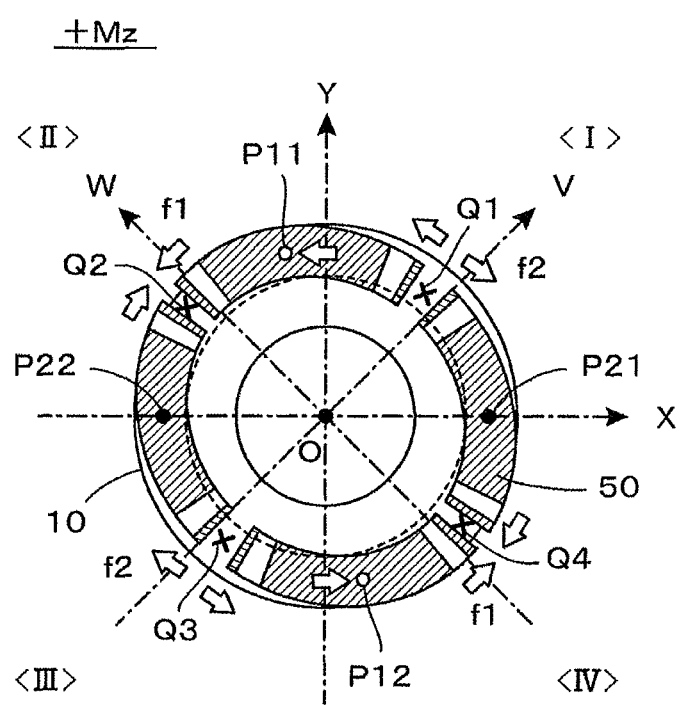
FIG. 21 is a sectional view on the XY plane which shows a deformation state when torque +Mz which is positive rotation around the Z axis is exerted on the left side support body 10 of the basic structural part shown in FIG. 15 (a sectional view in which the basic structural part shown in FIG. 15 is cut along the XY plane and viewed from the right side in FIG. 15. The broken line indicates a state before deformation).

FIG. 21 is a sectional view on the XY plane which shows a deformation state when torque +Mz which is positive rotation around the Z axis is exerted on the left side support body 10 in a state that load is applied to the right side support body 20 of the basic structural part shown in FIG. 15. In other words, this is a sectional view in which the basic structural part shown in FIG. 15 is cut along the XY plane and viewed from the right side in FIG. 15. Also here, for the sake of convenience of description, the V axis and the W axis are defined as coordinate axes in which the X axis and the Y axis are respectively rotated counterclockwise by 45 degrees.

A cross sectional part to which hatching is given in the drawing corresponds to the annular deformation body 50, and the left side support body 10 is seen therebehind. The points P11 to P22 in the drawing are orthogonal projection images of the respective connection points P11 to P22 on the XY plane. When torque +Mz which is positive rotation around the Z axis is exerted on the left side support body 10, counterclockwise stress indicated by the outlined arrow is exerted on the points P11, P12 (left side connection points) indicated by the white dot in the drawing. On the other hand, since load is applied to the right side support body 20, the points P21, P22 (right side connection points) indicated by the black dot in the drawing tend to remain at these fixed positions.

Consequently, the extension force f2 as indicated by the outlined arrow in the drawing is exerted at the vicinities of positions of a first detection point Q1 and a third detection point Q3, and the compressive force f1 indicated by the outlined arrow in the drawing is exerted at the vicinities of positions of a second detection point Q2 and a fourth detection point Q4. Consequently, the annular deformation body 50 is, as shown in the drawing, deformed into an elliptical shape in which the W axis is given as a long axis and the V axis is given as a short axis (the broken line in the drawing indicates a state before deformation).

As described above, the detection parts D1 to D4 are disposed respectively at the detection points Q1 to Q4 to form capacitive elements C1 to C4. As shown in FIG. 19(b), the displacement part 53 of the detection part D on which a compressive force f1 is exerted undergoes displacement so as to move close to the right side support body 20, by which the capacitive element C is increased in capacitance value. As shown in FIG. 19(c), the displacement part 53 of the detection part D on which an extension force f2 is exerted undergoes displacement so as to move away from the right side support body 20, by which the capacitive element C is decreased in capacitance value. Therefore, when torque +Mx which is positive rotation around the Z axis is exerted, each of the detection parts D1 to D4 shows the behavior given in FIG. 22.

That is, when displacement electrodes disposed at the detection parts D1 to D4 are respectively given as E501 to E504 and fixed electrodes opposing thereto are respectively given as E201 to E204, an extension force f2 is exerted on the detection points Q1, Q3 by exertion of torque +Mz which is positive rotation around the Z axis. Thereby, the displacement electrodes E501, E503 undergo displacement so as to move away from the fixed electrodes E201, E203, by which the capacitive elements C1, C3 are decreased in capacitance value (indicated by [−] in the table). On the other hand, a compressive force f1 is exerted on the detection points Q2, Q4 and the displacement electrodes E502, E504 undergo displacement so as to move close to the fixed electrodes E202, E204, by which the capacitive elements C2, C4 are increased in capacitance value (indicated by [+] in the table).

Therefore, if a capacitance value of each of the capacitive elements C1 to C4 is expressed by the same reference symbols C1 to C4, as shown at the bottom line in the table, computation on the basis of an arithmetic expression "Mz=−C1+C2−C3+C4" is carried out, thus the exerted torque +Mz which is positive rotation around the Z axis can be detected. In this case, the thus obtained computation value Mz is a positive value and an absolute value thereof indicates the magnitude of the exerted torque.

On the other hand, when reversely rotating torque, that is, torque −Mz which is negative rotation around the Z axis is exerted, each of the detection parts D1 to D4 shows behavior which is reverse to that shown in FIG. 22. The compressive force f1 is exerted on the detection points Q1, Q3 and the extension force f2 is exerted on the detection points Q2, Q4. Therefore, the capacitive elements C1, C3 are increased in capacitance value, while the capacitive elements C2, C4 are decreased in capacitance value. As a result, the computation value Mz obtained on the basis of the arithmetic expression "Mz=−C1+C2−C3+C4" is a negative value and an absolute value thereof indicates the magnitude of the exerted torque. Consequently, the reference symbol of the computation value Mz obtained by the arithmetic expression indicates the direction of the exerted torque and the absolute value indicates the magnitude thereof.

Also here, for the sake of convenience of description, rotational moment applied to the left side support body 10 in a state that load is applied to the right side support body 20 is considered as torque to be detected. As a matter of course, the principle of detecting torque is exactly applicable also even to a case where rotational moment applied to the right side support body 20 in a state that a load is applied to the left side support body 10 is considered as torque to be detected.

Figure 23:
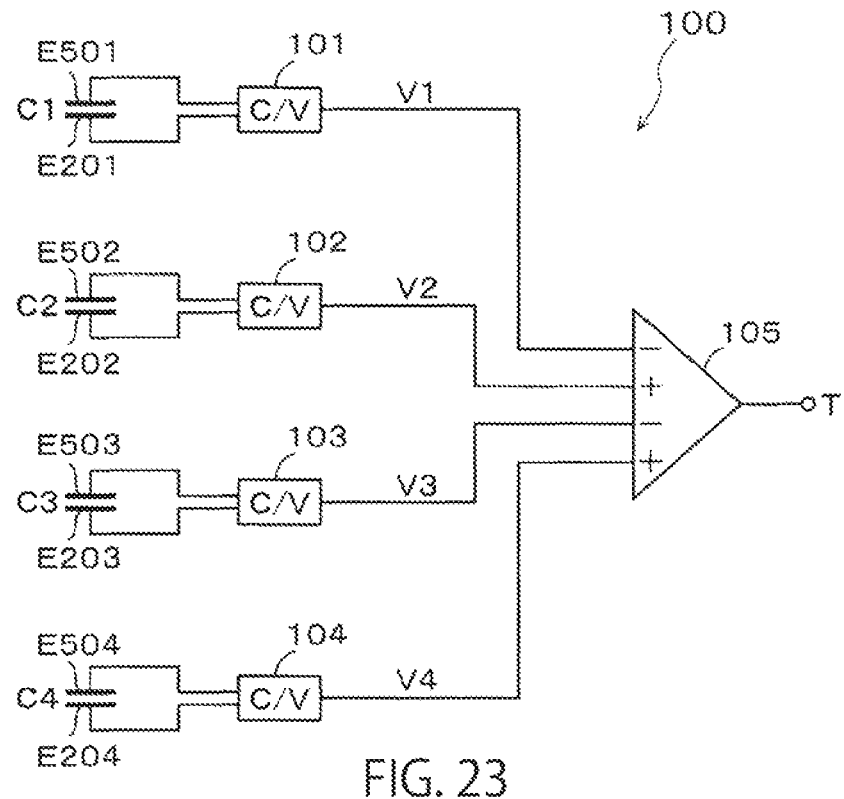
FIG. 23 is a circuit diagram which shows one example of a detection circuit used in the torque sensor according to the basic embodiment shown in FIG. 15.

Therefore, in the case of the basic embodiment, use of the detection circuit shown in the circuit diagram in FIG. 23 enables the torque around the Z axis to be detected. The E501 to E504 indicated in the circuit diagram are displacement electrodes provided at the respective detection parts D1 to D4, the E201 to E204 are fixed electrodes which oppose the displacement electrode E501 to E504, and C1 to C4 are capacitive elements which are constituted of these electrodes. Further, C/V conversion circuits 101 to 104 are circuits for converting respectively capacitance values C1 to C4 of the capacitive elements C1 to C4 to voltage values V1 to V4. The voltage values V1 to V4 after conversion are respectively given as values corresponding to the capacitance values C1 to C4. A difference computing unit 105 functions to perform computation based on the above-described arithmetic expression of "Mz=−C1+C2−C3+C4," thereby outputting the result to an output terminal T.

As shown in FIG. 21, when torque around the Z axis is exerted, a position of each of the detection points Q1 to Q4 undergoes slight displacement in a direction along a circumference of the annular deformation body 50, in response to deformation of the annular deformation body 50. Specifically, in the case of the example shown in the drawing, the position of each of the detection points Q1 to Q4 move to a position deviating slightly from the V axis or the W axis in the counterclockwise direction. Therefore, upon exertion of torque, the detection point Q shown in FIG. 20 also moves vertically in the drawing, by which the displacement part 53 (displacement electrode E50) not only undergoes lateral displacement in the drawing but also undergoes vertical displacement in the drawing.

However, in the case of the example shown in FIG. 20, the size of the fixed electrode E20 (planner size, that is, occupied area) is set to be larger than the size of the displacement electrode E50 (planner size, that is, occupied area). As a result, even when the displacement electrode E50 undergoes displacement in the vertical direction in the drawing or in a direction perpendicular to the sheet surface in the drawing, no change is found in an opposing area of the displacement electrode E50 in relation to the fixed electrode E20. Therefore, the capacitive element C is always kept constant in effective area.

Figure 24A:
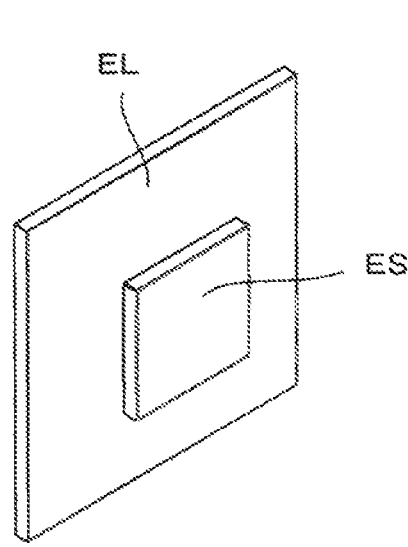
FIG. 24A and FIG. 24B are drawings which show the principle of keeping constant the effective area of a capacitive element even upon change in relative position of a displacement electrode in relation to a fixed electrode.

FIG. 24 is a drawing which shows the principle that, as described above, the capacitive element C is kept constant in effective area, even upon change in relative position of the displacement electrode E50 in relation to the fixed electrode E20. Now, consideration is given to a case where a pair of electrodes EL, ES is disposed so as to oppose each other, as shown in FIG. 24(a). Both the electrodes EL, ES are disposed so that these are parallel to each other, with a predetermined clearance kept, thereby constituting a capacitive element. However, the electrode EL is larger in area than the electrode ES. Where a contour of the electrode ES is projected on the surface of the electrode EL to form an orthogonal projection image, the projection image of the electrode ES is completely included in the surface of the electrode EL. In this case, an area of the electrode ES is as an effective area as the capacitive element.

Figure 24B:
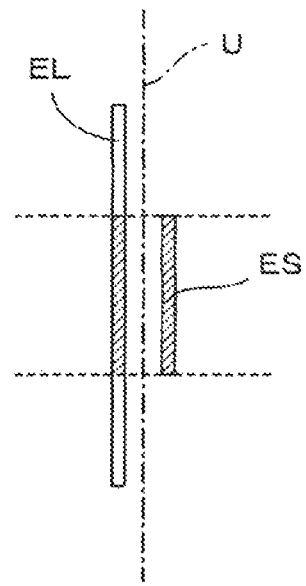

FIG. 24(b) is a side view which shows the pair of electrodes ES, EL given in FIG. 24(a). The domain to which hatching is given in the drawing is a part which substantially functions as a capacitive element and the effective area as the capacitive element is an area of the electrode to which hatching is given (that is, an area of the electrode ES).

Now, consideration is given to a perpendicular surface U indicated by the alternate long and short dashed line in the drawing. The electrodes ES, EL are both disposed so as to be parallel to the perpendicular surface U. Here, on the assumption that the electrode ES is allowed to move along the perpendicular surface U perpendicularly upward, an opposing part of the electrode EL moves upward but the opposing part concerned remains unchanged in area. Even if the electrode ES is allowed to move downward or move backward or forward on the sheet surface, the opposing part of the electrode EL side also remains unchanged in area.

In short words, where the contour of the electrode ES smaller in area is projected on the surface of the electrode EL larger in area to form an orthogonal projection image, as long as the projection image of the electrode ES is kept included completely within the surface of the electrode EL, the effective area of the capacitive element constituted of both the electrodes is equal to an area of the electrode ES and always kept constant.

Therefore, if a relationship between the displacement electrode E50 and the fixed electrode E20 shown in FIG. 20 is similar to a relationship between the electrode ES and the electrode EL shown in FIG. 24, irrespective of a direction at which the displacement electrode E50 undergoes displacement by exertion of torque, as long as the displacement electrode E50 and the fixed electrode E20 are kept parallel to each other, the pair of electrodes which constitute the capacitive element are constant in effective opposing area. This means that the capacitive element C is changed in capacitance value exclusively depending on a distance between the displacement electrode E50 and the fixed electrode E20. In other words, this means that a change in capacitance value of the capacitive element C occurs only depending on displacement of the displacement part 53 in a direction along the normal line N and not depending on the displacement in a direction orthogonal to the normal line N. This is important in accurately detecting exerted torque on the basis of the above-described principle.

Consequently, in carrying out the present invention, it is preferable that one of the fixed electrode E20 and the displacement electrode E50 is set to be larger in area than the other so that the pair of electrodes which constitute the capacitive element C will not change in effective opposing area, even where torque in a predetermined rotating direction is exerted to cause a change in relative position of the displacement electrode E50 in relation to the fixed electrode E20.

In FIG. 24, there is shown the example in which rectangular electrodes are used as two electrodes EL, ES. However, the displacement electrode E50 and the fixed electrode E20 used in the torque sensor according to the present invention are given in any shape and, for example, these may be formed into circular electrodes. Further, as described in Section 4-3, it is acceptable that the annular deformation body 50 is constituted of a conductive material such as a metal and a certain domain of the surface thereof is used as the displacement electrode E50 or the right side support body 20 is constituted of a conductive material such as a metal and a certain domain of the surface thereof is used as the fixed electrode E20.

<5-2. Removal of Errors Resulting from Interference with the Other Axis Components>

In the above-described Section 5-1, the behavior of each of the detection parts D1 to D4 is described on the assumption that moment Mz around the Z axis is exerted on the torque sensor according to the basic embodiment of the present invention, thereby showing that computation is performed on the basis of the arithmetic expression of "Mz=−C1+C2−C3+C4" shown at the bottom line in FIG. 22, thus making it possible to detect exerted moment Mz around the Z axis as torque to be detected.

However, an external force exerted on the torque sensor is not necessarily limited only to moment Mz around the Z axis. For example, in the torque sensor shown in FIG. 16, an external force exerted on the left side support body 10 in a state that the right side support body 20 is fixed includes six axis components such as force Fx in the direction of the X axis, force Fy in the direction of the Y axis, force Fz in the direction of the Z axis, moment Mx around the X axis, moment My around the Y axis and moment Mz around the Z axis. The sensor according to the present invention is a sensor which is to detect moment Mz around the Z axis, among these six axis components, as torque. And, the principle of detecting the torque has been already described in Section 5-1.

As a matter of course, depending on use environments of the torque sensor, there is a case where the sensor is used in a state that only moment Mz around the Z axis is exerted. For example, where the torque sensor shown in FIG. 16 is used by being housed in a cylindrical tube, with the Z axis given as the central axis, and an external diameter of the torque sensor is in agreement with an inner diameter of the cylindrical tube, the left side support body 10 is extremely restricted in its degree of freedom of movement. In the above-described use environment, there is found no problem even when only moment Mz around the Z axis is exerted on the left side support body 10. However, where the torque sensor shown in FIG. 16 is incorporated into a joint part of a robot arm and used as a part of the joint, the above-described six axis (force) components are all exerted on the left side support body 10.

The torque sensor according to the basic embodiment which has been described above is characterized by being able to detect accurate torque from which there is removed interference with the other axis components (among the six axis components, five axis components except for moment Mz around the Z axis). Here, a description will be given of a point that the interference with the other axis components can be removed according to the detection method described in Section 5-1.

FIG. 25 is a table which shows an example covering a specific displacement amount of electrode distance of each of the capacitive elements C1 to C4 when force Fx, Fy, Fz in the direction of each axis or moment Mx, My, Mz around each axis are exerted on the left side support body 10 in a state that the right side support body 20 is fixed at the basic structural part shown in FIG. 16. FIG. 26 is a table which shows an amount of fluctuation (an extent of increase or decrease) in capacitance value of each of the capacitive elements shown in FIG. 25. In both of the tables, the fields of Mz are enclosed by the thick lined frame, which indicates that a force component which is to be primarily detected by the torque sensor is moment Mz (torque around the Z axis).

When the row of Mz in the table in FIG. 25 is viewed, "+10" is filled in a field of each of the capacitive elements C1, C3, and "−10" is filled in a field of each of the capacitive elements C2, C4. This indicates that when moment +Mz which is positive rotation around the Z axis is exerted on the left side support body 10 in a state that the right side support body 20 is fixed, an electrode distance of each of the capacitive elements C1, C3 is increased by 10 μm, while an electrode distance of each of the capacitive elements C2, C4 is decreased by 10 μm ("+" in the table of FIG. 25 indicates an increase in electrode distance and "−" indicates a decrease in electrode distance). A reason for having the above phenomenon is as already described by referring to FIG. 21.

Numerical values indicated in individual fields of the table in FIG. 25 are results in which a displacement amount (unit: μm) of electrode distance of each of the capacitive elements C1 to C4 is actually measured in a specific sample prepared by using a basic structural part designed with specific dimensions and constituted of a specific material, when force in the direction of each axis and moment around each axis which have a predetermined reference value are exerted on the left side support body 10 in a state that the right side support body 20 is fixed (in the case of moment, when the force having the reference value is exerted on an exertion point away from the origin O by a predetermined reference distance). Therefore, the numerical value of each field is a characteristic value obtained from the sample and an absolute value of each numerical value has no universal meaning. However, the reference symbol thereof indicates an increase or a decrease in electrode distance and has universality, irrespective of dimensions or materials of the sample to be detected.

When the row of Fx in table of FIG. 25 is viewed, "−2" is filled in the field of each of the capacitive elements C1, C4, and "+2" is filled in the field of each of the capacitive elements C2, C3. This indicates that where force +Fx in the positive direction of the X axis is exerted on the left side support body 10 in a state that the right side support body 20 is fixed, the capacitive elements C1, C4 are decreased in electrode distance by 2 μm, while the capacitive elements C2, C3 are increased in electrode distance by 2 μm. A reason for developing the above phenomenon can be easily understood by referring to the deformation mode in FIG. 27.

Figure 27:
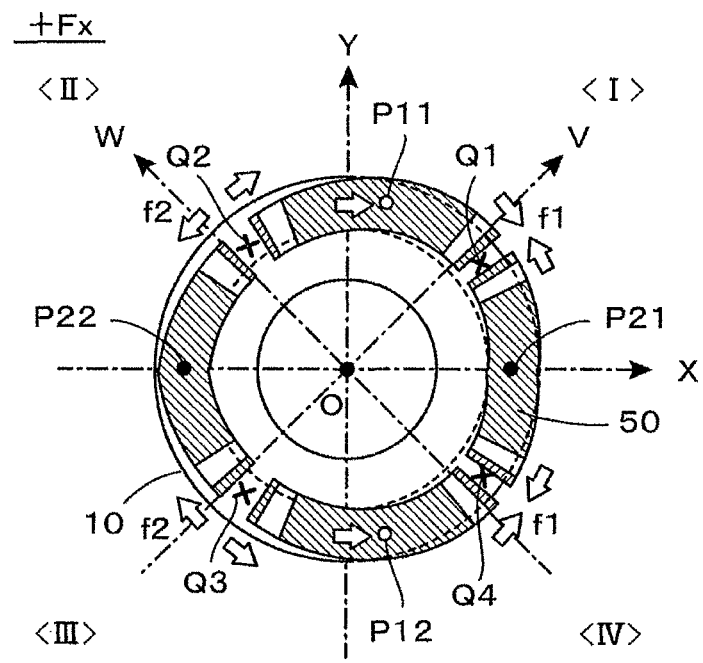
FIG. 27 is a sectional view on the XY plane which shows a deformation state when +Fx in the positive direction of the X axis is exerted on the left side support body 10 at the basic structural part shown in FIG. 15 (a sectional view in which the basic structural part shown in FIG. 15 is cut along the XY plane, when viewed from the right side in FIG. 15. The broken line indicates a state before deformation).

FIG. 27 is a sectional view on the XY plane which shows a deformation state when force +Fx in the positive direction of the X axis is exerted, corresponding to a sectional view in which the basic structural part shown in FIG. 15 is cut along the XY plane and viewed from the right side in FIG. 15. When force +Fx in the positive direction of the X axis is exerted on the left side connection points P11, P12 indicated by the white dot in a state that the right side connection points P21, P22 indicated by the black dot are fixed, as shown by the outlined arrow in the drawing, the left side connection points P11, P12 indicated by the white dot move in the rightward direction in the drawing. As a result, the compressive force f1 indicated by the outlined arrow in the drawing is exerted in the vicinities of positions of the first detection point Q1 and the fourth detection point Q4, and the extension force f2 indicated by the outlined arrow in the drawing is exerted in the vicinities of positions of the second detection point Q2 and the third detection point Q3.

Consequently, as shown in FIG. 27, the annular deformation body 50 is deformed into an irregular shape (the broken line in the drawing indicates a state before deformation). Thus, the capacitive elements C1, C4 are decreased in electrode distance by 2 μm, while the capacitive elements C2, C3 are increased in electrode distance by 2 μm, and there is obtained the result shown in the row of Fx in the table of FIG. 25. Due to the same reason, when force +Fy in the positive direction of the Y axis is exerted, there is obtained the result shown in the row of Fy in the table of FIG. 25. And, the capacitive elements C1, C2 are decreased in electrode distance by 2 μm, while the capacitive elements C3, C4 are increased in electrode distance by 2 μm. Further, when force +Fz in the positive direction of the Z axis is exerted, the annular deformation body 50 undergoes displacement as a whole in the positive direction of the Z axis, and there is obtained the result shown in the row of Fz in the table of FIG. 25. That is, the capacitive elements C1 to C4 are both decreased in electrode distance by 5 μm.

Figure 28:
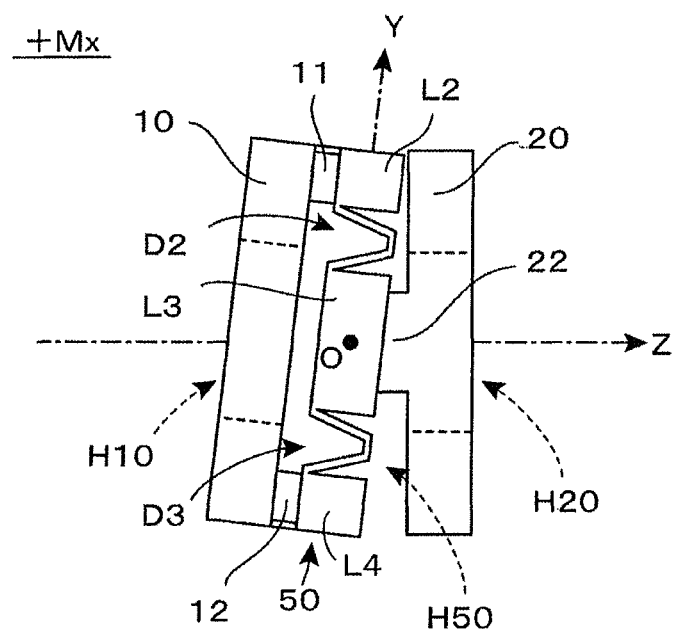
FIG. 28 is a side view which shows a deformation state when moment +Mx which is positive rotation around the X axis is exerted on the left side support body 10 at the basic structural part shown in FIG. 15.

On the other hand, FIG. 28 is a side view which shows a deformation state when moment +Mx which is positive rotation around the X axis is exerted. In the drawing, the X axis is an axis which passes through the origin O and is orthogonal to the sheet surface, and moment +Mx which is positive rotation around the X axis is force which rotates clockwise the left side support body 10 in the drawing. As a result, the first detection part D1 (not visible in the drawing) and the second detection part D2 which are disposed above from the XZ plane undergo displacement so as to move close to the right side support body 20. The third detection part D3 and the fourth detection part D4 (not visible in the drawing) which are disposed below from the XZ plane undergo displacement so as to move away from the right side support body 20.

Thus, there is obtained the result shown in the row of Mx in the table of FIG. 25. The capacitive elements C1, C2 are decreased in electrode distance by 100 μm, while the capacitive elements C3, C4 are increased in electrode distance by 100 μm. Due to the same reason, when moment +My which is positive rotation around the Y axis is exerted, there is obtained the result shown in the row of My in the table of FIG. 25. The capacitive elements C1, C4 are increased in electrode distance by 60 μm, while the capacitive elements C2, C3 are decreased in electrode distance by 60 μm. An absolute value of increase/decrease in electrode distance upon exertion of moment +Mx is 100 μm, while an absolute value of increase/decrease in electrode distance upon exertion of moment +My is 60 μm. This is because, as shown in FIG. 15, the protruding parts 21, 22 (right side connection members) are disposed at positions along the X axis, by which displacement around the X axis occurs more easily than displacement around the Y axis.

As described above, FIG. 26 is a table which shows an amount of fluctuation (an extent of increase or decrease) in capacitance value of each of the capacitive elements prepared on the basis of the table shown in FIG. 25. And, "+" of each field indicates an increase in capacitance value, while "−" indicates a decrease in capacitance value. Since an increase/decrease in electrode distance is reversed to that in capacitance value, reference symbols of individual fields in the table of FIG. 26 are reverse in relationship to reference symbols of corresponding fields in the table of FIG. 25.

Further, in the table of FIG. 26, in order to indicate not only a reference symbol but also an approximate absolute value, three different reference symbols such as "(+)," "+" and "++" are used in the case of an increase in capacitance value, and three different reference symbols such as "(−)," "−" and "−−" are used in the case of a decrease in capacitance value. Here, "(+)" and "(−)" indicate that an absolute value of the numerical value shown in the table of FIG. 25 is less than 5, "+" and "−" indicate that an absolute value thereof is 5 or more but less than 50, and "++" and "−−" indicate that an absolute value thereof is 50 or more. As apparent from the table of FIG. 25, an absolute value of numerical value of each field belonging to the same row is equal to each other. Where the row is different, an absolute value of numerical value is also different (however, as for the rows Fx, Fy, absolute values of numerical values are all the same "2").

As already described in Section 5-1, in the torque sensor according to the basic embodiment described here, a computation value of Mz obtained on the basis of the arithmetic expression "Mz=−C1+C2−C3+C4" is output as a value of torque to be detected. Therefore, in actuality, the detection circuit shown in FIG. 23 is used to output a detection value at the output terminal T. With reference to the row of Mz in the table of FIG. 26, it will be understood that the computation value Mz obtained on the basis of the arithmetic expression "Mz=−C1+C2−C3+C4" is a value which indicates correct torque (moment Mz around the Z axis).

For example, for the sake of convenience, when an absolute value of an amount of fluctuation indicated by "−" or "+" is assumed to be "a" and C1=−a, C2=+a, C3=−a and C4=+a are given depending on the row of Mz, by which a computation result of the above arithmetic expression is to be Mz=+4a. This indicates that there is exerted torque which is positive rotation around the Z axis and corresponds to an absolute value of 4a. As a matter of course, where there is exerted torque which is reverse rotation, reference symbols in the row of Mz are reversed, and a computation result of the above arithmetic expression is Mz=−4a. This indicates that there is exerted torque which is negative rotation around the Z axis and corresponds to an absolute value of 4a. As described above, upon exertion of moment Mz around the Z axis, it is possible to detect without any difficulty the direction (reference symbol) and magnitude (absolute value) of moment Mz as a computation value by the above-described arithmetic expression.

Next, consideration is given to a case where forces of other axis components except for moment Mz are exerted on the left side support body 10. At first, where force Fx in the direction of the X axis is exerted, an amount of fluctuation in each of the capacitance values C1 to C4 is given in the row of Fx in FIG. 26. Also here, for the sake of convenience, when an absolute value of an amount of fluctuation indicated by "(+)" or "(−)" is assumed to be "a" and C1=+a, C2=−a, C3=−a and C4=+a are given depending on the row of Fx, by which a computation result of the above-described arithmetic expression is to be Mz=0. This indicates that the computation result of the arithmetic expression will not include a component of force Fx.

Similarly, where force Fy in the direction of the Y axis is exerted, an amount of fluctuation in each of the capacitance values C1 to C4 is given by the row of Fy in FIG. 26. Also here, for the sake of convenience, when an absolute value of an amount of fluctuation indicated by "(+)" or "(−)" is assumed to be "a" and C1=+a, C2=+a, C3=−a and C4=−a are given depending on the row of Fy, by which a computation result of the above arithmetic expression is to be Mz=0. This indicates that the computation result of the arithmetic expression will not include a component of force Fy.

Further, where force Fz in the direction of the Z axis is exerted, an amount of fluctuation in each of the capacitance values C1 to C4 is given by the row of Fz in FIG. 26. Also here, for the sake of convenience, an absolute value of an amount of fluctuation indicated by "+" is assumed to be "a" and C1=+a, C2=+a, C3=+a and C4=+a are given depending on the row of Fz, by which a computation result of the above-described arithmetic expression is to be Mz=0. This indicates that the computation result of the arithmetic expression will not include a component of force Fz.

Further, where moment Mx around the X axis is exerted, an amount of fluctuation in each of the capacitance values C1 to C4 is given in the row of Mx in FIG. 26. Also here, for the sake of convenience, an absolute value of an amount of fluctuation indicated by "++" and "−−" is assumed to be "a" and C1=+a, C2=+a, C3=−a and C4=−a are given depending on the row of Mx, by which a computation result of the above-described arithmetic expression is to be Mz=0. This means that the computation result of the arithmetic expression will not include a component of moment Mx.

Lastly, where moment My around the Y axis is exerted, an amount of fluctuation in each of the capacitance values C1 to C4 is given in the row of My in FIG. 26. Also here, for the sake of convenience, an absolute value of the amount of fluctuation indicated by "++" or "−−" is assumed to be "a" and C1=−a, C2=+a, C3=+a, and C4=−a are given depending on the row of My, by which a computation result of the above-described arithmetic expression is to be Mz=0. This indicates that the computation result of the arithmetic expression will not include a component of moment My.

Consequently, the computation value Mz obtained by the arithmetic expression of "Mz=−C1+C2−C3+C4" will not include at all other axis components Fx, Fy, Fz, Mx, My, and the computation value concerned is a value which indicates only a component of moment Mz around the Z axis. As described above, the torque sensor shown in FIG. 16 removes interference with the other axis components Fx, Fy, Fz, Mx, My even where it is used as a part of a joint of a robot arm, etc., and able to detect correct torque which indicates only a component of moment Mz.

<<Section 6. Characteristics of Basic Embodiment of the Present Invention>>

In Section 4 and Section 5, a description has been given of the constitution and motions of the torque sensor according to the basic embodiment of the present invention which uses the basic structural part shown in FIG. 15. Here, characteristics of the torque sensor according to the basic embodiment will be summarized.

The torque sensor according to the present invention is a sensor which detects torque around a predetermined rotation axis, and the basic structural part is provided with the left side support body 10, the annular deformation body 50 and the right side support body 20 as shown in FIG. 15. Here, as shown in FIG. 15, when an XYZ three-dimensional coordinate system is defined, and the Z axis is given as a rotation axis, the XY plane orthogonal to the rotation axis is given as a basic plane, a basic annular channel R is defined on the basic plane XY so as to surround a circumference of the rotation axis Z, the annular deformation body 50 has an annular structure extending along the basic annular channel R (refer to FIG. 18).

Here, when the basic structural part is viewed, as shown in FIG. 15, in the reference observation direction in which the rotation axis Z gives a horizontal line extending laterally, the left side support body 10 is disposed at a position adjacent to the left side of the annular deformation body 50 and the right side support body 20 is disposed at a position adjacent to the right side of the annular deformation body 50. Then, when the left side connection points P11, P12 are defined at the positions indicated by the white dot in FIG. 18 on the left side surface of the annular deformation body 50 and the right side connection points P21, P22 indicated by the black dot in FIG. 18 are defined on the right side surface of the annular deformation body 50, the left side surface of the annular deformation body 50 is connected to the left side support body 10 at positions of the left side connection points P11, P12 by the left side connection members 11, 12. And, the right side surface of the annular deformation body 50 is connected to the right side support body 20 at positions of the right side connection points P21, P22 by the right side connection members 21, 22.

The torque sensor according to the basic embodiment described in Section 4 and Section 5 is constituted by adding a capacitive element C and a detection circuit to the basic structural part. Here, as shown in FIG. 20, the capacitive element C is constituted of a displacement electrode E50 fixed at a predetermined position on the right side surface of the annular deformation body 50 and a fixed electrode E20 fixed at a position of the right side support body 20 which opposes the displacement electrode E50. Next, on the basis of fluctuation in capacitance value of each of the capacitive elements, the detection circuit has functions to output, in a state that a load is applied to one of the left side support body 10 and of the right side support body 20, an electric signal indicating torque around the rotation axis Z which is exerted on the other.

As shown in FIG. 18, the detection points Q1 to Q4 are defined on the basic annular channel R on the annular deformation body 50, and the detection parts D1 to D4 are disposed at the positions of the detection points Q1 to Q4. Next, as shown in FIG. 15, the annular deformation body 50 is structured so that the detection parts D1 to D4 and the coupling parts L1 to L4 are alternately disposed. To both ends of each of the detection parts D, the coupling part L adjacent to each of them is connected. Further, as shown in FIG. 18, the left side connection points P11, P12 and the right side connection points P21, P22 are individually disposed on the coupling parts L. And, orthogonal projection images (white dots) of the left side connection points P11, P12 and orthogonal projection images (black dots) of the right side connection points P21, P22 on the basic plane XY are formed at mutually different positions. Therefore, a compressive force f1 or an extension force f2 is exerted on each of the detection parts D1 to D4, depending on exertion of torque.

As shown in FIG. 20, each of the detection parts D is provided with a first deformation part 51 and a second deformation part 52 for causing elastic deformation by exertion of torque to be detected and a displacement part 53 for undergoing displacement resulting from elastic deformation of these deformation parts 51, 52. Next, an external end of the first deformation part 51 is connected to a coupling part L adjacent thereto and an internal end thereof is connected to the displacement part 53. Similarly, an external end of the second deformation part 52 is connected to a coupling part L adjacent thereto and an internal end thereof is connected to the displacement part 53. Next, the displacement electrode E50 is fixed at a position of the displacement part 53 which opposes the right side support body 20.

As shown in FIG. 18, in the case of the torque sensor according to the basic embodiment of the present invention, the left side connection points P11, P12 are provided at two sites and the right side connection points P21, P22 are also provided at two sites. In other words, the annular deformation body 50 is connected to the left side support body 10 at the two sites and also connected to the right side support body 20 at the two sites. Of course, according to the principle of the present invention, it will be sufficient that the annular deformation body 50 is connected to the left side support body 10 at least at one site and the annular deformation body 50 is also connected to the right side support body 20 at least at one site. Therefore, the left side connection point and the right side connection point are not necessarily provided at two sites each. However, in practice, it is preferable that the left side connection point and the right side connection point are provided at least at two sites each in order to stably transmit exerted torque to the annular deformation body 50.

Further, in the case of the torque sensor according to the basic embodiment of the present invention, the detection points Q1 to Q4 are defined at four sites on the annular deformation body 50 and the four sets of detection parts D1 to D4 are provided in total. However, according to the principle of the present invention, only one set of the detection part D is able to detect torque. For example, in the case of the detection part D shown in FIG. 20, when a compressive force f1 (force which allows the detection part D to contract vertically in the drawing) is exerted in the vicinity of the detection point Q, the capacitive element C is increased in capacitance value. When an extension force f2 (force which allows the detection part D to expand vertically in the drawing) is exerted, the capacitive element C is decreased in capacitance value. Therefore, an increase or a decrease thereof depends on the magnitude of exerted force. As a result, in principle, one set of the detection part D is provided at a part of the annular deformation body 50, thus making it possible to detect the direction and magnitude of exerted torque on the basis of a change in capacitance value of the capacitive element C.

However, in practice, it is preferable that n number (n≥2) of a plurality of detection points are defined on the basic annular channel R and the detection parts D are disposed at the individual detection points. In other words, it is preferable that the annular deformation body 50 is constituted by alternately disposing n-number of the plurality of detection parts D and n-number of the plurality of coupling parts L along the basic annular channel R. This is because n-number of the plurality of detection parts D are disposed, by which detection can be performed by using capacitance values of n-number of the plurality of capacitive elements C to further enhance the detection accuracy.

Furthermore, on the basis of a displacement mode of the displacement part 53 (upon exertion of torque in a specific direction, it moves close to or moves away from the right side support body 20), n-number of the plurality of detection parts are divided into two types of attribute groups, by which detection can be made on the basis of a difference in capacitance value to provide such an effect that further enhances the detection accuracy.

In practice, it is preferable that n is set to be an even number, n-even number (n≥2) of detection points are defined on the basic annular channel R and the detection parts D are disposed at the individual detection points. In other words, it is preferable that the annular deformation body 50 is constituted by alternately disposing n even number of the detection parts D and n even number of the coupling parts L along the basic annular channel R. Thereby, when n number of the detection parts are divided into two types of attribute groups, these can be divided into a group each composed of the same number of groups to perform stable detection which is free of bias.

Further, when n is set to be an even number and n even number of coupling parts L are numbered sequentially along the basic annular channel R, the right side connection point can be disposed at an odd-numbered coupling part and the left side connection point can be disposed at an even-numbered coupling part. Therefore, torque exerted on the left side support body 10 can be efficiently transmitted to the annular deformation body 50 to make stable deformation of the annular deformation body 50. The torque sensor according to the basic embodiment described in Section 4 and Section 5 is an example in which n is set to be equal to 4.

As a matter of course, n is set to be equal to 2 and the two sets of detection parts D are provided on the annular deformation body 50, thus making it possible to obtain the above-described effect of enhancing the detection accuracy. That is, where n is set to be equal to 2, it will be sufficient that the annular deformation body is constituted by disposing individual parts in the order of the first coupling part, the first detection part, the second coupling part and the second detection part along the basic annular channel R, and the right side connection point is disposed at the first coupling part and the left side connection point is disposed at the second coupling part.

However, in practice, it is preferable that n is set to be 4 or more of an even number, and the basic embodiment described in Section 4 and Section 5 is one of the most preferable embodiments. Where n is set to be equal to 4, as shown in FIG. 17, the annular deformation body 50 is constituted by disposing individual parts in the order of a first coupling part L1, a first detection part D1, a second coupling part L2, a second detection part D2, a third coupling part L3, a third detection part D3, a fourth coupling part L4 and a fourth detection part D4 along the basic annular channel R.

In addition, as apparent with reference to FIG. 17 and FIG. 18, the first right side connection point P21 is disposed at the first coupling part L1, the first left side connection point P11 is disposed at the second coupling part L2, the second right side connection point P22 is disposed at the third coupling part L3, and the second left side connection point P12 is disposed at the fourth coupling part L4. Therefore, as shown in FIG. 15, the left side connection member is constituted of a first left side connection member 11 which connects the first left side connection point P11 with the left side support body 10 and a second left side connection member 12 which connects the second left side connection point P12 with the left side support body 10. And, the right side connection member is constituted of a first right side connection member 21 which connects the first right side connection point P21 with the right side support body 20 and a second right side connection member 22 which connects the second right side connection point P22 with the right side support body 20.

Therefore, when torque around the Z axis is exerted on the left side support body 10 in a state that the right side support body 20 is fixed, the torque is reliably transmitted by the first left side connection member 11 and the second left side connection member 12 to the second coupling part L2 and the fourth coupling part L4. On the other hand, the first coupling part L1 and the third coupling part L3 are firmly kept fixed to the right side support body 20 by the first right side connection member 21 and the second right side connection member 22. Thus, stable deformation occurs on the annular deformation body 50 on the basis of exerted torque.

Further, in the torque sensor according to the basic embodiment, each of the connection points is disposed so as to give symmetry to the central axis. Specifically, as shown in FIG. 18, where two straight lines (X axis and Y axis) are drawn so as to pass through an intersection O between the basic plane (XY plane) and the rotation axis Z and are orthogonal to each other, orthogonal projection images (white dots) of the first left side connection point P11 and the second left side connection point P12 are disposed on a first straight line (on the Y axis). And, orthogonal projection images (black dots) of the first right side connection point P21 and the second right side connection point P22 are disposed on a second straight line (on the X axis).

That is, where the XYZ three-dimensional coordinate system shown in the drawing is defined, the annular deformation body 50 is disposed on the XY plane which is a basic plane, with the origin O given as the center, the left side support body 10 is disposed at a negative domain of the Z axis (a position behind the sheet surface), and the right side support body 20 is disposed at a positive domain of the Z axis (a position forward from the sheet surface). Next, the first left side connection point P11 and the second left side connection point P12 are provided on the side surface of the annular deformation body 50 on the negative side of the Z axis. The first right side connection point P21 and the second right side connection point P22 are provided on the side surface of the annular deformation body 50 on the positive side of the Z axis.

Here, where both of the side surfaces of the annular deformation body 50 are projected on the XY plane to obtain orthogonal projection images, a projection image (black dot) of the first right side connection point P21 is disposed on the positive X axis, a projection image (black dot) of the second right side connection point P22 is disposed on the negative X axis, a projection image (white dot) of the first left side connection point P11 is disposed on the positive Y axis, and a projection image (white dot) of the second left side connection point P12 is disposed on the negative Y axis. As described above, two upper and lower sites of the annular deformation body 50 are joined to the left side support body 10, and two left and right sites thereof are joined to the right side support body 20, by which each of the connection points deviates by every 90 degrees. Thereby, the annular deformation body 50 can be deformed efficiently by exertion of torque and also deformed into an elliptical shape having axial symmetry. The axial symmetry is favorable in performing the difference detection on the basis of capacitance values.

On the other hand, as shown in FIG. 18, where the V axis is defined as a coordinate axis in which the X axis is rotated counterclockwise by 45 degrees on the XY plane, with the origin O given as the center, and the W axis is defined as a coordinate axis in which the Y axis is rotated counterclockwise by 45 degrees, with the origin O given as the center, the first detection point Q1 is disposed on the positive V axis, the second detection point Q2 is disposed on the positive W axis, the third detection point Q3 is disposed on the negative V axis, and the fourth detection point Q4 is disposed on the negative W axis. Next, four sets of the detection parts D1 to D4 are disposed so that each of the detection points Q1 to Q4 is given as the center, giving symmetry with respect to the V axis and the W axis.

If the above-described constitution is adopted, a total of four sets of the capacitive elements C1 to C4 are disposed on both positive and negative sides of the V axis and the W axis. Thus, upon exertion of a specific torque, difference detection can be performed by using two sets of capacitive elements with an increase in capacitance value and two sets of capacitive elements with a decrease in capacitance value to enhance the detection accuracy. In the case of the basic embodiment, four sets of the detection parts D1 to D4 are identical in size and structure to each other and four sets of the capacitive elements C1 to C4 are also identical in size and structure to each other. Therefore, the basic embodiment is a suitable sensor to perform the difference detection on the basis of capacitance values.

In general, in order to perform difference detection on the basis of capacitance values in a torque sensor having n number of a plurality of detection parts D, among n number of the detection parts D, some of them may be detection parts having the first attribute and the others may be detection parts having the second attribute.

Here, the attribute of the detection part D is determined on the basis of a displacement mode of the displacement part 53 (whether the part moves close to or moves away from the right side support body 20 upon exertion of torque in a particular direction). That is, a first attribute displacement part 53 which constitutes a first attribute detection part undergoes displacement in a direction moving away from the right side support body 20 upon exertion of torque at a first rotating direction (for example, moment +Mz) and undergoes displacement in a direction moving close to the right side support body 20 upon exertion of torque in a second rotating direction which is reverse to the first rotating direction (for example, moment −Mz). In contrast, a second attribute displacement part 53 which constitutes a second attribute detection part undergoes displacement in a direction moving close to the right side support body 20 upon exertion of torque in the first rotating direction (moment +Mz) and undergoes displacement in a direction moving away from the right side support body 20 upon exertion of torque in the second rotating direction (moment −Mz).

Next, the first attribute capacitive element is constituted of a first attribute displacement electrode fixed at the first attribute displacement part and a first attribute fixed electrode fixed at a position of the right side support body 20 which opposes the first attribute displacement electrode. The second attribute capacitive element is constituted of a second attribute displacement electrode fixed at the second attribute displacement part and a second attribute fixed electrode fixed at a position of the right side support body 20 which opposes the second attribute displacement electrode. Thereby, the detection circuit is able to output an electric signal corresponding to a difference between a capacitance value of the first attribute capacitive element and a capacitance value of the second attribute capacitive element as an electric signal which indicates exerted torque.

In the case of the example shown in the table of FIG. 22, the detection parts D1, D3 serve as the first attribute detection parts, while the detection parts D2, D4 serve as the second attribute detection parts. The first attribute capacitive elements C1, C3 are constituted respectively with first attribute displacement electrodes E501, E503 and first attribute fixed electrodes E201, E203. And, the second attribute capacitive elements C2, C4 are constituted respectively with second attribute displacement electrodes E502, E504 and second attribute fixed electrodes E202, E204. As shown in the drawing, upon exertion of torque +Mz, the first attribute capacitive elements C1, C3 are decreased in capacitance value, while the second attribute capacitive elements C2, C4 are increased in capacitance value. Therefore, on the basis of the arithmetic expression "Mz=−C1+C2−C3+C4," a difference between a sum of "C1+C3" of capacitance values C1, C3 of the first attribute capacitive elements C1, C3 and a sum of "C2+C4" of capacitance values C2, C4 of the second attribute capacitive elements C2, C4 is determined, thus making it possible to detect the direction and magnitude of exerted torque.

Further, as described in Section 5-2, difference detection on the basis of the arithmetic expression "Mz=−C1+C2−C3+C4" can be performed to remove interference with the other axis components. Therefore, where the torque sensor is used as a part of a joint of a robot arm, other axis components such as Fx, Fy, Fz, Mx, My can be removed to detect accurately only torque to be detected around the Z axis (moment Mz).

<<<Section 7. Modification Example of Torque Sensor According to the Present Invention>>>

In Section 4 to Section 6, a description has been given above of the torque sensor according to the basic embodiment of the present invention. Here, there will be described some modification examples of the basic embodiment.

<7-1. Modification Example to which Auxiliary Connection Members are Added>

As described above, the torque sensor according to the basic embodiment is provided with functions to remove interference with the other axis components. That is, where six axis components of Fx, Fy, Fz, Mx, My, Mz are applied to the left side support body 10 in a state that the right side support body 20 is fixed, an amount of fluctuation in capacitance value of each of four sets of the capacitive elements C1 to C4 will be as shown in the table of FIG. 26. Therefore, as described in Section 5-2, a value of Mz obtained by computation on the basis of the arithmetic expression of "Mz=−C1+C2−C3+C4" includes only a component of moment Mz and is able to remove interference with the other axis components.

This is because the torque sensor has axial symmetry and, with the results of the table of FIG. 26 taken into account, even where the other five axis components of Fx, Fy, Fz, Mx, My are exerted, the computation results of the basis of the above-described arithmetic expression are to be zero. In the table of FIG. 26, there are described reference symbols such as (+), +, ++, (−), −, −−, depending on the magnitude of absolute value of the amount of fluctuation. Where the basic structural part has axial symmetry, as shown in the table of FIG. 25, absolute values of numerical values of the same row in the table are equal to each other. The computation results of the other five axis components are also all to be zero.

As described above, theoretically, the torque sensor according to the basic embodiment is able to remove interference with the other axis components and detect accurately only moment Mz around the Z axis. However, in actuality, it is difficult to make completely equal the absolute values of numerical values of the same row in the table of FIG. 25, with some errors found. In other words, in actual products, it is impossible to obtain a detection value from which interference with the other five axis components is completely removed. As a matter of course, where interference with the other axis components is such an extent that can be disregarded as an error, there will be found no practical problems. The modification example which will be described here is a device inventively prepared for reducing further errors resulting from interference with the other axis components.

In the table of FIG. 26, the original component to be detected is moment Mz indicated by being enclosed by a thick lined frame. However, reference symbols of the fields of Mz are + and −, while reference symbols of the fields of Mx, My which are other axis components are ++ and −−. In terms of an absolute value, the other axis components Mx, My are greater in the amount of fluctuation than the original component of Mz. Specifically, in the case of the example shown in FIG. 25, an absolute value of an amount of fluctuation is "10" for Mz, while absolute values of amounts of fluctuation are respectively "100" and "60" for Mx and My.

As a matter of course, the results shown in FIG. 25 cover values obtained from the particular sample designed with specific dimensions and, therefore, values thereof do not have a specific significance. In a torque sensor which uses a basic structural part having the mode shown in FIG. 15, there is found such a general tendency that components Mx, My, are greater in an amount of fluctuation than a component Mz. This is because the basic structural part concerned is characterized by being more easily rotated around the X axis or the Y axis than around the Z axis. Therefore, it can be said that the other axis components Mx, My are components which will easily influence a detection value of the component Mz which is an original detection target.

Figure 29:
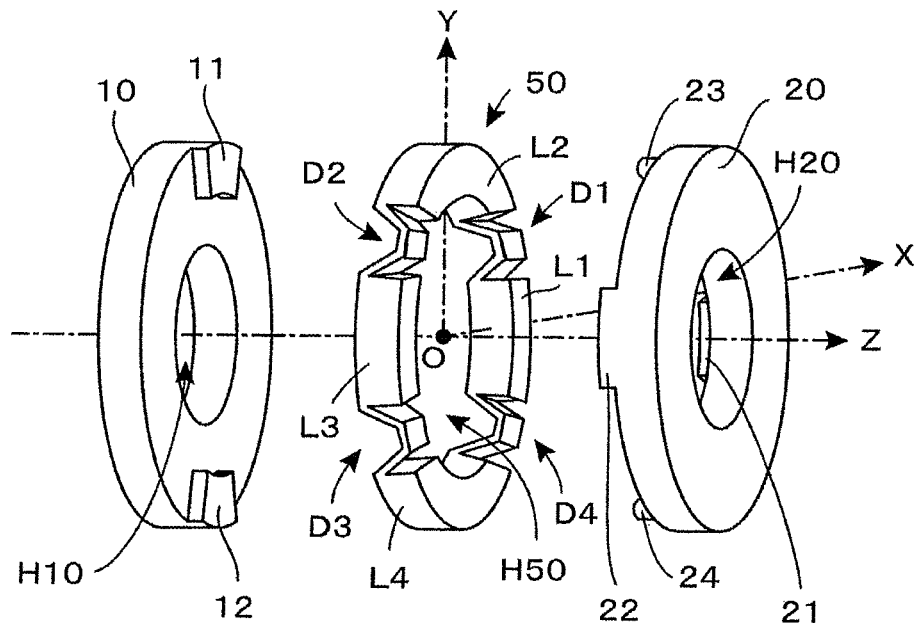
FIG. 29 is an exploded perspective view which shows a basic structural part of a torque sensor according to a modification example of the present invention to which an auxiliary connection member is added.
Figure 30:
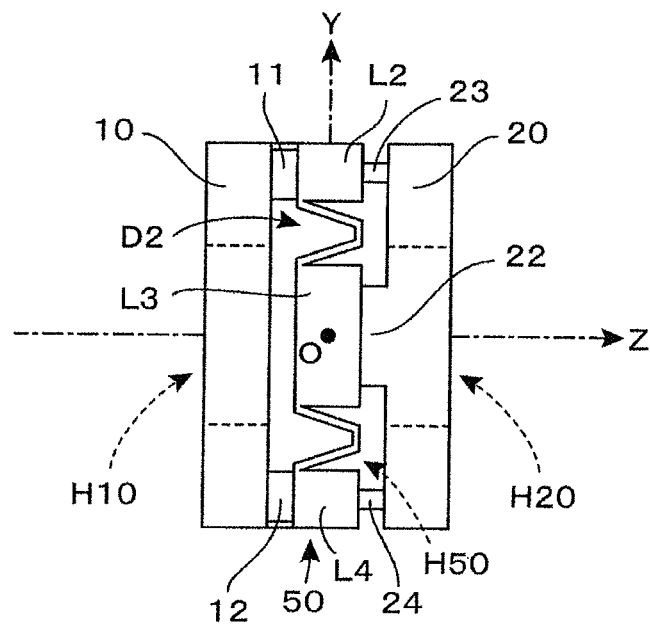
FIG. 30 is a side view of a basic structural part of the torque sensor which is obtained by joining the three constituents shown in FIG. 29 to each other.

FIG. 29 and FIG. 30 are respectively an exploded perspective view and a side view, each of which shows a basic structural part of a torque sensor according to the modification example in which an error resulting from interference with the other axis components is reduced further in an inventive manner, with the above problems taken into account. The basic structure part of this torque sensor is different from the basic structural part of the torque sensor according to the basic embodiment shown in FIG. 15 only in that auxiliary connection members 23, 24 are added. In FIG. 29, the auxiliary connection members 23, 24 are each shown as a member protruding to the left side from the left side surface of the right side support body 20. In actuality, as shown in the side view of FIG. 30, the auxiliary connection members 23, 24 may be provided in any mode as long as these are members which connect the right side surface of the annular deformation body 50 with the left side surface of the right side support body 20.

Figure 31:
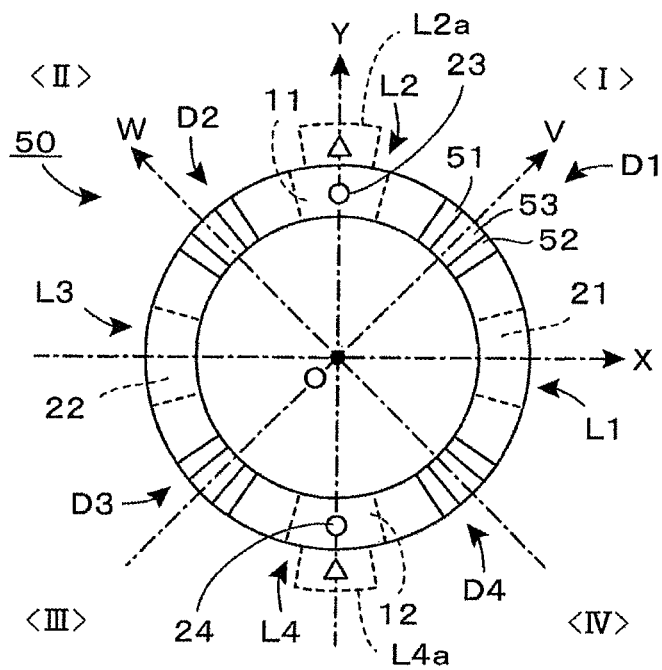
FIG. 31 is a front view which shows a state in which auxiliary connection members 23, 24 are joined to the annular deformation body 50 shown in FIG. 29, when viewed from the right side in FIG. 29.

FIG. 31 is a front view which shows a state in which the auxiliary connection members 23, 24 are joined to the annular deformation body 50 shown in FIG. 29, when viewed from the right side in FIG. 29. In the case of the example shown in the drawing, the auxiliary connection members 23, 24 are cylindrical members, and projection images thereof on the XY plane are positioned on the Y axis. As shown by the white dot in FIG. 18, left side connection points P11, P12 are defined on the Y axis, and the auxiliary connection members 23, 24 are connected to positions of the left side connection points P11, P12. In other words, on the XY plane, the auxiliary connection member 23 is disposed at a connection position of a first left side connection member 11 (indicated by the broken line in FIG. 31) and the auxiliary connection member 24 is disposed at a connection position of a second left side connection member 12 (indicated by the broken line in FIG. 31).

Figure 32:
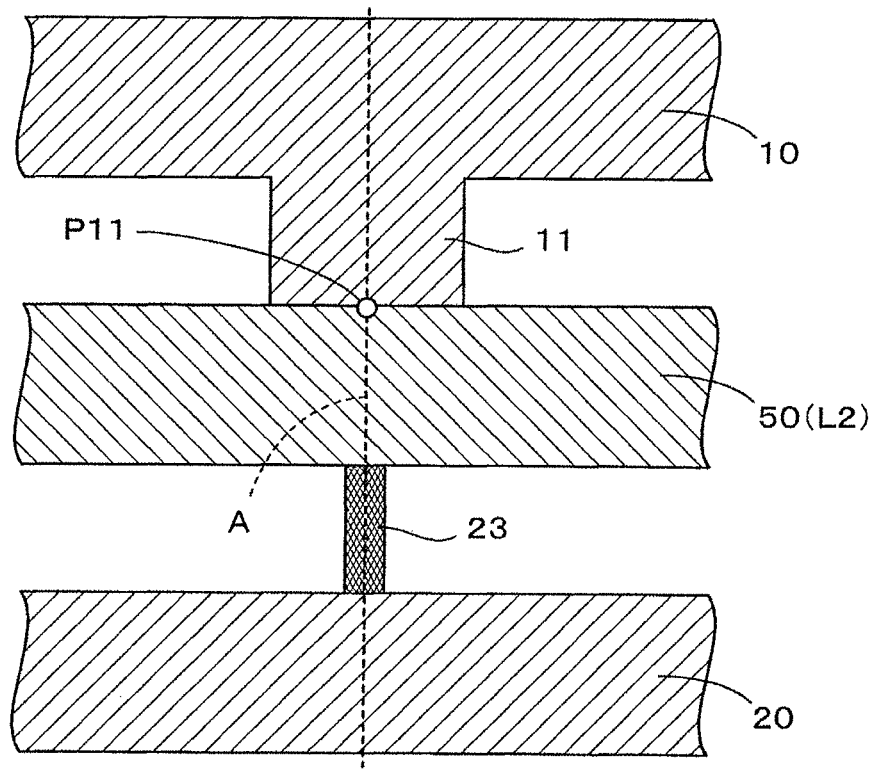
FIG. 32 is a partial sectional view which shows a structure in the vicinity of the auxiliary connection member 23 at the basic structural part shown in FIG. 29.

FIG. 32 is a partial sectional view which shows a structure in the vicinity of the auxiliary connection member 23 at the basic structural part shown in FIG. 29, and the white dot indicates the left side connection point P11. That is, FIG. 32 corresponds to a sectional view in which the basic structural part is cut along a plane which includes the left side connection point P11 and is parallel to the XZ plane (the vertical direction in the drawing is the direction of the Z axis). A connection reference line A indicated by the broken line in the drawing is a straight line which passes through the left side connection point P11 and is parallel to the Z axis. The auxiliary connection member 23 is a cylindrical member, with the connection reference line A given as the central axis. It functions as what-is-called "a supporting rod" for keeping constant a clearance between the annular deformation body 50 (coupling part L2) and the right side support body 20 at the position of the connection reference line A. The auxiliary connection member 24 also performs the same function.

As apparent from the side view of FIG. 30, the auxiliary connection members 23, 24, each of which functions as "a supporting rod," are added, by which even when moment Mx around the X axis is exerted on the left side support body 10 in a state that the right side support body 20 is fixed, the left side support body 10 and the annular deformation body 50 are suppressed for displacement. That is, there occurs no displacement as shown in FIG. 28, even upon exertion of moment Mx. Further, the auxiliary connection members 23, 24 are added to obtain an effect which suppresses displacement occurring upon exertion of moment My. This is because the auxiliary connection members 23, 24 function as resistance factors to rotational movement around the Y axis.

In the example shown here, there are used cylindrical members disposed on the connection reference line A, as the auxiliary connection members 23, 24. As a matter of course, the shape of the auxiliary connection members 23, 24 shall not be restricted to a cylindrical shape. Furthermore, the auxiliary connection members 23, 24 are not necessarily positioned on the connection reference line A and may be disposed at a position slightly away from the connection reference line A, as long as they are in the vicinity thereof. For instance, in the example shown in FIG. 31, the position of the auxiliary connection member 23 is allowed to move in the positive direction of the Y axis and the position of the auxiliary connection member 24 is allowed to move in the negative direction of the Y axis, by which both of them may be disposed in the vicinity of an external contour line of the annular deformation body 50. Alternatively, as indicated by the broken line in the drawing, a raised part L2a formed by expanding the coupling part L2 outward and a raised part L4a formed by expanding the coupling part L4 outward may be provided at an intersecting part with the Y axis of the annular deformation body 50, the auxiliary connection member 23 may be disposed at a position of the raised part L2a indicated by the triangle mark and the auxiliary connection member 24 may be disposed at a position of the raised part L4a indicated by the triangle mark. In this case, similar raised parts may also be provided at positions which oppose the raised parts L2a, L4a in the right side support body 20.

In other words, the auxiliary connection members 23, 24 are members which are provided between the right side surfaces of the coupling parts L2, L4 (including the raised parts formed by expansion thereof) of the annular deformation body 50 and an opposing surface of the right side support body 20 (including the raised part formed by expansion thereof), and when a connection reference line parallel to the rotation axis (Z axis) passes through the left side connection points P11, P12 is defined, any member may be used as the auxiliary connection member as long as they are disposed on the connection reference line A or the vicinity thereof. It is noted that a certain effect can be obtained even when only one of the auxiliary connection members 23, 24 is provided. However, in practice, it is preferable that both of them are provided.

An object of providing the auxiliary connection members 23, 24 is to suppress displacement resulting from exertion of moment Mx, My of the other axis components in comparison with displacement resulting from exertion of moment Mz of the original detection target, thereby further reducing errors derived from interference with the other axis components. With this object taken into account, as the auxiliary connection members 23, 24, such a member is preferably used that causes elastic deformation more easily upon exertion of force in a direction orthogonal to the connection reference line A than upon exertion of force in a direction along the connection reference line A.

Specifically, as shown in the example of FIG. 32, an elongated rod-like member made of a material having certain elasticity, for example, a metal or a resin, may be used as the auxiliary connection member 23 and disposed along the connection reference line A. Then, elastic deformation is less likely to occur when force is exerted in the vertical direction in the drawing along the connection reference line A on the left side support body 10 in a state that the right side support body 20 is fixed. However, elastic deformation is more likely to occur when force is exerted in the lateral direction in the drawing, that is, in a direction orthogonal to the connection reference line A.

In other words, the auxiliary connection member 23 made of an elongated rod-like member is less likely to cause deformation contracting or expanding in the vertical direction but more likely to cause deformation declining laterally as a whole. As a result, the annular deformation body 50 is sufficiently suppressed for displacement in the vertical direction in the drawing, thereby greatly restricting displacement on the basis of exertion of moment Mx. However, the auxiliary connection member 23 is declined, by which the annular deformation body 50 is not sufficiently suppressed for displacement in the lateral direction in the drawing, thus resulting in insufficient restriction of displacement on the basis of exertion of moment Mz. In actuality, the auxiliary connection members 23, 24 are provided, thus making it possible to suppress displacement on the basis of exertion of moment My or displacement on the basis of force Fz.

Figures 33, 34:
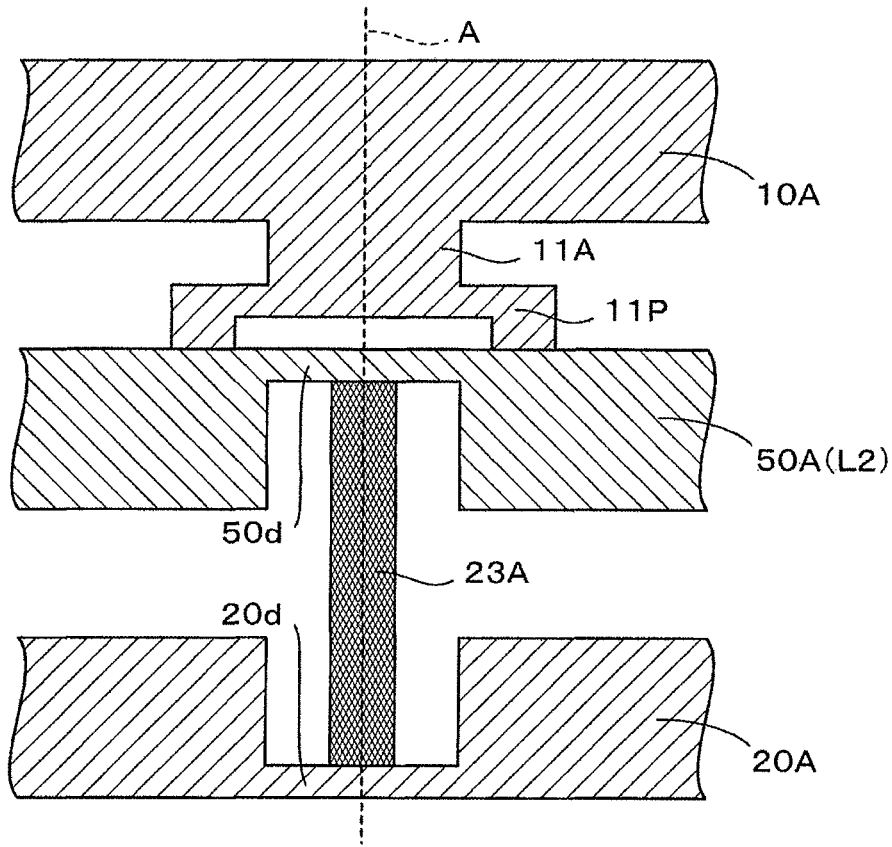
FIG. 33 is a partial sectional view which shows a modification example of the structure in the vicinity of the auxiliary connection member shown in FIG. 32.
FIG. 34 is a table which shows an amount of fluctuation (an extent of increase or decrease) in capacitance value of each of capacitive elements when force in the direction of each axis or moment around each axis is exerted on the left side support body 10 in the modification example to which the auxiliary connection member shown in FIG. 29 is added.

FIG. 33 is a partial sectional view which shows a modification example of a structure in the vicinity of the auxiliary connection member shown in FIG. 32. This modification example is modified in an inventive manner so that the auxiliary connection member 23 can be more easily inclined and a diaphragm is provided at a part which connects both ends of the auxiliary connection member. A basic structural part according to the modification example is slightly different in shape from the basic structural part of the basic embodiment described above. Thus, "A" is given to an end of a reference symbol which indicates each part in the drawing. That is, a left side support body 10A is connected to an annular deformation body 50A (coupling part L2) by a left side connection member which has a connection member main body 11A and a connection member base 11P. And, the annular deformation body 50A is connected to a right side support body 20A by an auxiliary connection member 23A.

Here, a connecting part of the annular deformation body 50A with the auxiliary connection member 23A is constituted of a diaphragm part 50d. And, a connecting part of the right side support body 20A with the auxiliary connection member 23A is constituted of a diaphragm part 20d. Therefore, when torque around the Z axis is exerted on the left side support body 10A in a state that the right side support body 20A is fixed, the diaphragm parts 50d, 20d are deformed by the exerted torque, by which the auxiliary connection member 23A is inclined to the connection reference line A. Therefore, despite the fact that the auxiliary connection member 23A is provided, degree of freedom of displacement on the basis of torque to be detected (moment Mz) is sufficiently secured.

Since the auxiliary connection member 23 shown in FIG. 32 is required to undergo deformation itself for inclination, it is preferably constituted of a rod-like member which is as narrow as possible. In contrast, since the auxiliary connection member 23A shown in FIG. 33 is inclined due to deformation of the diaphragm parts 50d, 20d, the auxiliary connection member 23A itself is not required to undergo deformation. Therefore, the auxiliary connection member 23A may be constituted by using a thick rigid member. In order to secure a sufficient inclination angle, the auxiliary connection member is preferably made as long as possible.

Further, in the case of the example shown in the drawing, the left side connection member is constituted of a connection member main body 11A and a connection member base 11P, and the connection member base 11P is kept away from the diaphragm part 50d but connected to a circumferential part thereof. Thus, the diaphragm part 50d will not be prevented from undergoing deformation. Accordingly, the auxiliary connection member 23A is secured so as to be inclined at a sufficient degree of freedom. In the case of the example shown in the drawing, such a constitution is adopted that the diaphragm part 50d is provided at the annular deformation body 50A and the diaphragm part 20d is provided at the right side support body 20A, thereby connecting both upper and lower ends of the auxiliary connection member 23A via the diaphragm parts. There may be adopted a constitution in which only the upper end or the lower end is connected by the diaphragm part.

FIG. 34 is a table which shows an amount of fluctuation (an extent of increase or decrease) in capacitance value of each of the capacitive elements when force in the direction of each axis or moment around each axis is exerted on the left side support body 10 of the modification example to which the auxiliary connection members shown in FIG. 29 are added. In comparison with the table shown in FIG. 26, it is found that any of the fields of Fz, the fields of Mx and the fields of My are (+) or (−). It is noted that specific classification criteria of this table between a numerical value range of an amount of fluctuation corresponding to the reference symbols of "(+)" and "(−)" and a numerical value range of an amount of fluctuation corresponding to the reference symbols of "+" and "−" are slightly different from the classification criteria of the table in FIG. 26 ("(+)," "(−)" for absolute values of less than 5 and "+," "−" for absolute values of 5 or more but less than 50). However, it remains unchanged that the reference symbols of "(+)" and "(−)" indicate much smaller absolute values than the reference symbols of "+," "−."

As apparent from comparison between the table of FIG. 26 and the table of FIG. 34, the auxiliary connection members are added, by which an absolute value of an amount of fluctuation is decreased upon exertion of force Fz and moment Mx, My. And, an absolute value of an amount of fluctuation upon exertion of the other axis components such as Fx, Fy, Fz, Mx and My is relatively decreased, in comparison with an absolute value of an amount of fluctuation upon exertion of moment Mz to be detected. Therefore, it is possible to reduce further errors resulting from interference with the other axis components.

<7-2. Modification Example which Uses a Total of Eight Sets of Detection Parts>

In Section 6, it has been described that in carrying out the present invention, n number (n≥2) of a plurality of detection points are preferably defined on the basic annular channel R and the detection part D is disposed at each of the detection points. In the basic embodiment, n is set to be equal to 4 and a total of four sets of the detection parts are used. In a modification example to be described here, n is set to be equal to eight and a total of eight sets of detection parts are used. Therefore, in the torque sensor according to the modification example, in place of the annular deformation body 50 of the basic structural part shown in FIG. 15, there is used an annular deformation body 60 which is provided with eight sets of detection parts D11 to D18.

It is noted that the left side support body 10 and the right side support body 20 are unchanged in structure. Therefore, where an XYZ three-dimensional coordinate system is defined, in the case of the torque sensor according to this modification example as well, the annular deformation body 60 is disposed on the XY plane which is a basic plane, with the origin O given as the center, the left side support body 10 is disposed at a negative domain of the Z axis and the right side support body 20 is disposed at a positive domain of the Z axis, thereby detecting torque around the Z axis.

Figure 35:
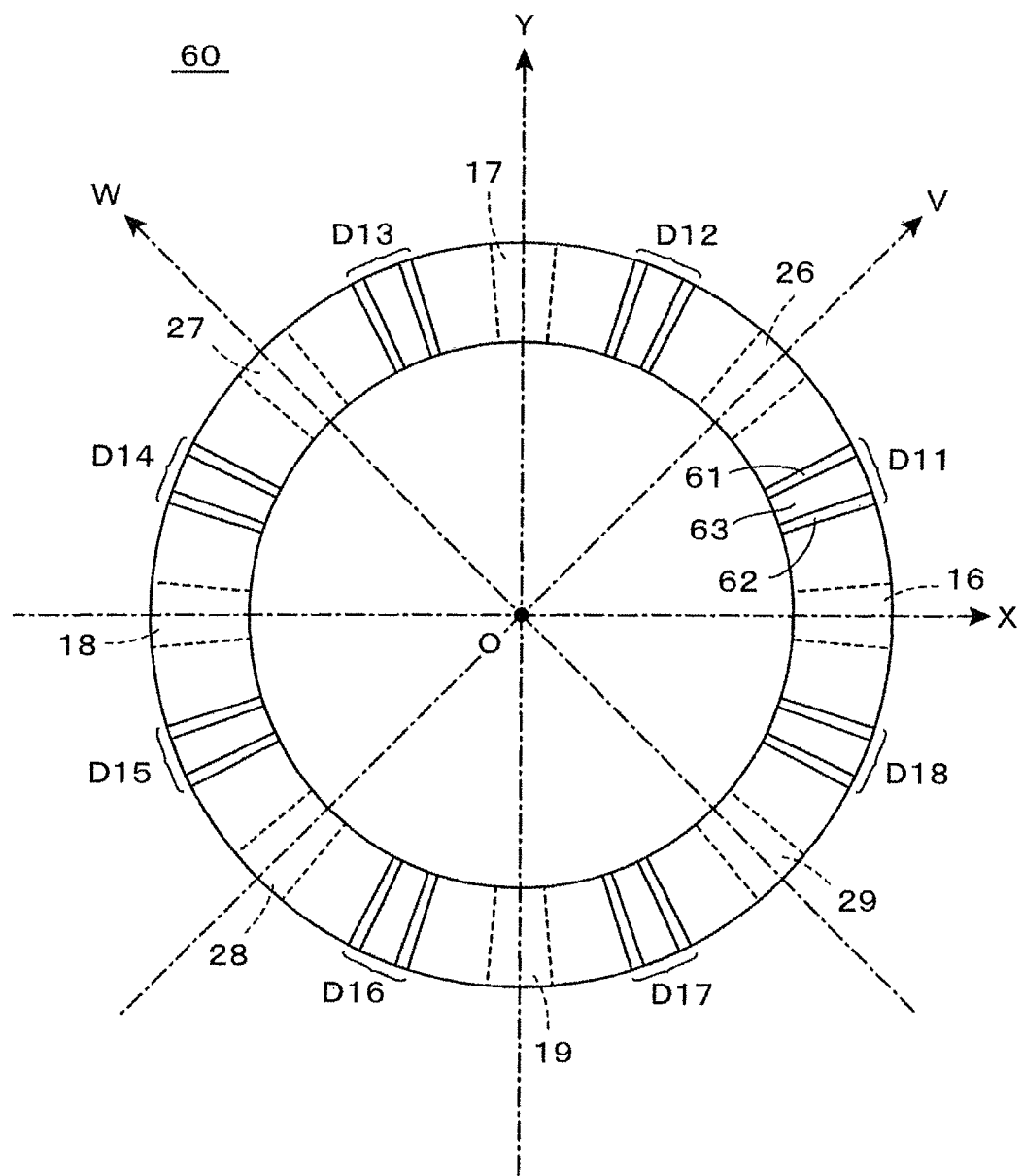
FIG. 35 is a front view (a drawing when viewed from the side of the right side support body 20) of an annular deformation body 60 of a torque sensor according to a modification example of the present invention in which eight sets of detection parts are used.

FIG. 35 is a front view which shows the annular deformation body 60 of the torque sensor according to the modification example (a view when viewed from the right side support body 20). Also here, the V axis is defined as a coordinate axis in which the X axis is rotated counterclockwise by 45 degrees on the XY plane, with the origin O given as the center, and the W axis is defined as a coordinate axis in which the Y axis is rotated counterclockwise by 45 degrees, with the origin O given as the center. As shown in the front view of FIG. 17, the annular deformation body 50 according to the basic embodiment is such that four sets of the detection parts D1 to D4 and four sets of the coupling parts L1 to L4 are alternately disposed. As shown in the front view of FIG. 35, the annular deformation body 60 according to the modification example is such that eight sets of detection parts D11 to D18 and eight sets of coupling parts L11 to L18 are alternately disposed.

Figure 36:
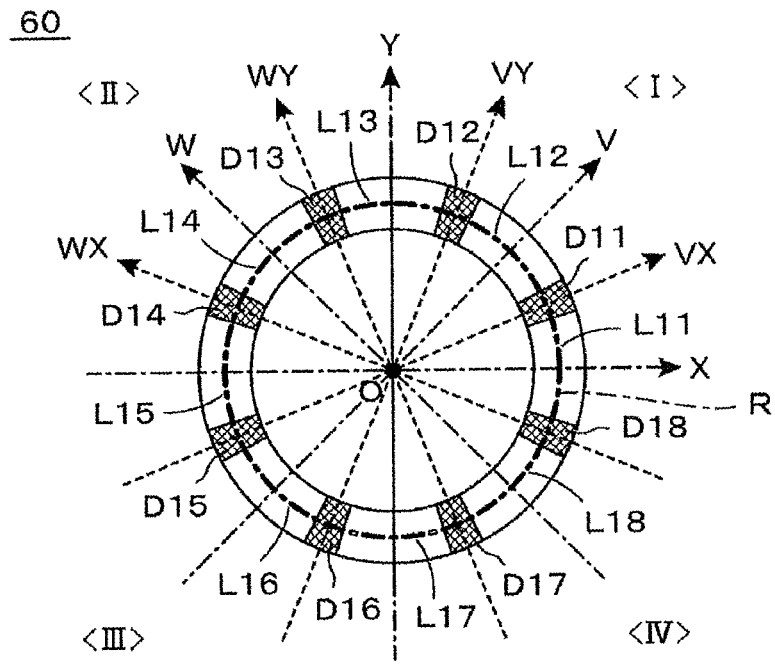
FIG. 36 is a plan view which shows a disposition of detection parts and coupling parts of the annular deformation body 60 shown in FIG. 35 (hatching is given for indicating a domain of each detection part and not for indicating a cross section).

FIG. 36 is a plan view which shows a disposition of the detection parts D11 to D18 and the coupling parts L11 to L18 which constitute the annular deformation body 60 shown in FIG. 35 (hatching is given for indicating a domain of the detection part and not for indicating a cross section). As shown in the drawing, the annular deformation body 60 is constituted by disposing the parts along the circular basic annular channel R indicated by the alternate long and short dashed line in the order of a first coupling part L11, a first detection part D11, a second coupling part L12, a second detection part D12, a third coupling part L13, a third detection part D13, a fourth coupling part L14, a fourth detection part D14, a fifth coupling part L15, a fifth detection part D15, a sixth coupling part L16, a sixth detection part D16, a seventh coupling part L17, a seventh detection part D17, an eighth coupling part L18 and an eighth detection part D18.

A basic structure of each of the detection parts D11 to D18 is similar to the basic structure of each of the detection parts D1 to D4 described above. For example, in FIG. 35, there is shown an example in which the first detection part D11 is constituted of a first deformation part 61, a second deformation part 62 and a displacement part 63. Here, the first deformation part 61, the second deformation part 62 and the displacement part 63 are constituents similar to the first deformation part 51, the second deformation part 52 and the displacement part 53 of the detection part D shown in FIG. 20. And, a displacement electrode is formed at the displacement part 63 via an insulating layer.

Further, in the case of the annular deformation body 50 shown in FIG. 15, two sites of the left side surface are connected to the left side support body 10 by the left side connection members 11, 12, and two sites of the right side surface are connected to the right side support body 20 by the right side connection members 21, 22. In the case of the annular deformation body 60 shown in FIG. 35, four sites of the left side surface are connected to the left side support body 10 by left side connection members 16, 17, 18, 19, and four sites of the right side surface are connected to the right side support body 20 by right side connection members 26, 27, 28, 29. Domains indicated by the broken line in FIG. 35 show projection images on the XY plane of domains to which four sets of the left side connection members 16, 17, 18, 19 are connected and also projection images on the XY plane of domains to which four sets of the right side connection members 26, 27, 28, 29 are connected.

Figure 37:
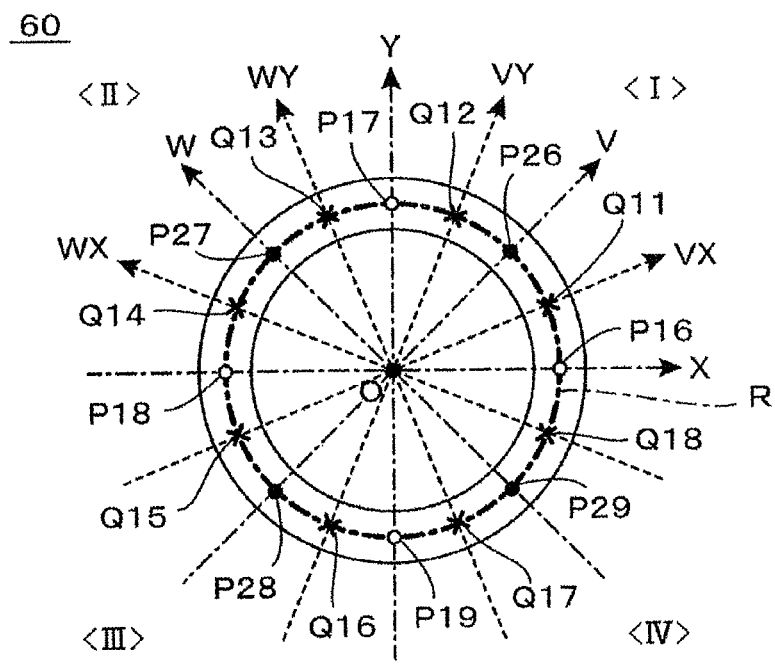
FIG. 37 is a projection view on the XY plane which indicates a disposition of individual detection points and individual connection points of the annular deformation body 60 shown in FIG. 35 (a drawing when viewed from the side of the right side support body 20: the annular deformation body 60 is indicated only by a contour thereof).

FIG. 37 is a projection view on the XY plane which shows a disposition of each of the detection points and each of the connection points of the annular deformation body 60 shown in FIG. 35 (a view when viewed from the right side support body 20: the annular deformation body 60 is shown only by indicating a contour thereof). Also here, left side connection points P16 to P19 are indicated by the white dot and right side connection points P26 to P29 are indicated by the black dot. As apparent from comparison between FIG. 36 and FIG. 37, a first left side connection point P16 is disposed at a first coupling part L11, a first right side connection point P26 is disposed at a second coupling part L12, a second left side connection point P17 is disposed at a third coupling part L13, a second right side connection point P27 is disposed at a fourth coupling part L14, a third left side connection point P18 is disposed at a fifth coupling part L15, a third right side connection point P28 is disposed at a sixth coupling part L16, a fourth left side connection point P19 is disposed at a seventh coupling part L17, and a fourth right side connection point P29 is disposed at an eighth coupling part L18.

In actuality, the first to the fourth left side connection points P16 to P19 are points which are defined on a side surface (the left side surface) of the annular deformation body 60 on a negative side of the Z axis, and the first to the fourth right side connection points P26 to P29 are points which are defined on a side surface (the right side surface) of the annular deformation body 60 on a positive side of the Z axis. Therefore, the individual connection points shown in FIG. 37 are points at which actual connection points are projected on the XY plane.

Consequently, where four straight lines X, V, Y, W passing through an intersection O with the rotation axis Z and intersecting at every 45-degree angle difference with each other are drawn on the basic plane XY, orthogonal projection images of the first left side connection point P16 and the third left side connection point P18 are disposed on a first straight line X, orthogonal projection images of the first right side connection point P26 and the third right side connection point P28 are disposed on a second straight line V, orthogonal projection images of the second left side connection point P17 and the fourth left side connection point P19 are disposed on a third straight line Y, and orthogonal projection images of the second right side connection point P27 and the fourth right side connection point P29 are disposed on a fourth straight line W.

Described in greater detail, where both side surfaces of the annular deformation body 60 are projected on the XY plane to obtain orthogonal projection images, a projection image of the first left side connection point P16 is disposed on the positive X axis, a projection image of the second left side connection point P17 is disposed on the positive Y axis, a projection image of the third left side connection point P18 is disposed on the negative X axis, a projection image of the fourth left side connection point P19 is disposed on the negative Y axis. And, a projection image of the first right side connection point P26 is disposed on the positive V axis, a projection image of the second right side connection point P27 is disposed on the positive W axis, a projection image of the third right side connection point P28 is disposed on the negative V axis, and a projection image of the fourth right side connection point P29 is disposed on the negative W axis.

Then, the first left side connection member 16 connects the first left side connection point P16 with the left side support body 10, the second left side connection member 17 connects the second left side connection point P17 with the left side support body 10, the third left side connection member 18 connects the third left side connection point P18 with the left side support body 10, and the fourth left side connection member 19 connects the fourth left side connection point P19 with the left side support body 10. Further, the first right side connection member 26 connects the first right side connection point P26 with the right side support body 20, the second right side connection member 27 connects the second right side connection point P27 with the right side support body 20, the third right side connection member 28 connects the third right side connection point P28 with the right side support body 20, and the fourth right side connection member 29 connects the fourth right side connection point P29 with the right side support body 20.

As described above, the annular deformation body 60 is connected to the left side support body 10 at four sites on the left side thereof and connected to the right side support body 20 at four sites on the right side thereof. Therefore, the annular deformation body 60 is quite firmly kept connected with the left side support body 10 and also quite firmly kept connected with the right side support body 20. As a result, rigidity of the torque sensor can be secured sufficiently where it is used at a joint of a robot arm, etc.

On the other hand, as shown in FIG. 37, eight detection points Q11 to Q18 are defined on the basic annular channel R. Specifically, where a VX axis is defined at an intermediate position between the V axis and the X axis, a VY axis is defined at an intermediate position between the V axis and the Y axis, a WY axis is defined at an intermediate position between the W axis and the Y axis, and a WX axis is defined at an intermediate position between the W axis and the X axis (the negative direction), a first detection point Q11 is disposed at a positive domain of the VX axis, a second detection point Q12 is disposed at a positive domain of the VY axis, a third detection point Q13 is disposed at a positive domain of the WY axis, a fourth detection point Q14 is disposed at a positive domain of the WX axis, a fifth detection point Q15 is disposed at a negative domain of the VX axis, a sixth detection point Q16 is disposed at a negative domain of the VY axis, a seventh detection point Q17 is disposed at a negative domain of the WY axis, and an eighth detection point Q18 is disposed at a negative domain of the WX axis.

Generally speaking, if an i-th detection point ($1 \leq i \leq 8$) is given as Qi and when a directional vector $V_{ec}(\theta)$ which gives counterclockwise an angle $\theta$ in relation to the positive direction of the X axis is defined on the XY plane, with the origin O given as a starting point, the detection point Qi is positioned at an intersection between a directional vector $V_{ec}(\pi/8 + (i-1) \cdot \pi/4)$ and a basic annular channel R. For example, the first detection point Q11 is to be positioned at an intersection between a directional vector $V_{ec}(\pi/8)$ which gives counterclockwise an angle of 22.5 degrees in relation to the positive direction of the X axis and the basic annular channel R.

Eight sets of detection parts D11 to D18 are disposed at the respective positions of the detection points Q11 to Q18. Therefore, as a result, as shown in the front view of FIG. 35, the detection parts D11 to D18 are disposed at intermediate positions between the X axis, the V axis, the Y axis and the W axis. When torque (moment Mz) is exerted on the left side support body 10 in a state that the right side support body 20 is fixed, clockwise or counterclockwise force is exerted on the left side connection members 16, 17, 18, 19 disposed on the X axis and the Y axis in a state that individual parts of the annular deformation body 60 are fixed by the right side connection members 26, 27, 28, 29 disposed on the V axis and the W axis in FIG. 35. Therefore, a compressive force f1 or an extension force f2 is exerted on each of the detection parts D11 to D18, depending on a position thereof. The capacitive elements C11 to C18 are constituted respectively with displacement electrodes provided at displacement parts of the detection parts D11 to D18 and fixed electrodes provided at opposing surfaces of the right side support body 20, and these capacitive elements are changed in electrode distance, thus resulting in an increase or a decrease in capacitance values C11 to C18.

FIG. 38 is a table on the modification example which uses eight sets of the detection parts D11 to D18 shown in FIG. 35. And, the table shows an amount of fluctuation (an extent of increase or decrease) in capacitance value of each of the capacitive elements when force in the direction of each axis or moment around each axis is exerted on the left side support body 10 in a state that the right side support body 20 is fixed. The fields of Mz are indicated by the enclosed thick lined frame, which indicates that a force component to be originally detected by the torque sensor is moment Mz (torque around the Z axis).

In the table of FIG. 38 as well, in order to indicate an approximate absolute value, three different reference symbols of "(+)," "+" and "++" are used for an increase in capacitance value, and three different reference symbols of "(−)," "−" and "−−" are used for a decrease in capacitance value. "++" indicates a greater amount of fluctuation than "+," and "(+)" indicates a smaller amount of fluctuation than "+." Similarly, "--" indicates a greater amount of fluctuation than "-" and "(-)" indicates a smaller amount of fluctuation than When moment +Mz is exerted on the left side support body 10, in FIG. 35, there is applied force which allows positions of the left side connection members 16, 17, 8, 19 to move counterclockwise in a state that positions of the right side connection members 26, 27, 28, 29 are fixed. Therefore, a compressive force f1 is exerted on the odd-numbered detection parts D11, D13, D15 and D17, and an extension force f2 is exerted on the even-numbered detection parts D12, D14, D16 and D18. Therefore, the odd-numbered capacitive elements C11, C13, C15, C17 are increased in capacitance value, while the even-numbered capacitive elements C12, C14, C16, C18 are decreased in capacitance value. The row of Mz in the table of FIG. 38 shows the above-described fluctuation.

With occurrence of the above described fluctuation taken into account, difference computation is performed on the basis of capacitance values of eight sets of the capacitive elements C11 to C18, thus making it possible to calculate moment Mz (torque to be detected). FIG. 39 is a table which shows variations of formulae to be used in performing the above difference computation. The arithmetic expression indicated in FIG. 39(a), "Mz=+C11−C12+C13−C14+C15−C16+C17−C18" is a formula for performing difference computation which uses capacitance values of all eight sets of the capacitive elements C11 to C18. This is in practice the most preferable arithmetic expression. On the other hand, the arithmetic expression shown in FIG. 39(b), "Mz=+C11−C12+C15−C16," the arithmetic expression shown in FIG. 39(c), Mz=+C13−C14+C17−C18," the arithmetic expression shown in FIG. 39(d), "Mz=−C12+C13−C16+C17" and the arithmetic expression shown in FIG. 39(e), "Mz=+C11−C14+C15−C18" are all formulae for performing difference computation using four sets of capacitance values selected from eight sets of the capacitance values C11 to C18. These are also able to calculate moment Mz (torque to be detected) by means of difference computation.

Theoretically, any of the arithmetic expressions shown in FIG. 39(a) to (e) is adopted to set off other axis components (Fx, Fy, Fz, Mx, My), thus making it possible to remove errors resulting from interference with the other axis components, as described in Section 5-2. However, as described in Section 7-1, in the table of FIG. 38 as well, an amount of fluctuation of the component Mx or My, "++," "--" is larger than an amount of fluctuation of component Mz, "+," "-." Therefore, the modification example to which the auxiliary connection members described in Section 7-1 are added is applied to a modification example which uses a total of eight sets of detection parts to be described here in Section 7-2, thereby providing such an effect that reduces further errors resulting from interference with the other axis components.

Specifically, the auxiliary connection member may be provided at positions or in the vicinities of the left side connection points P16 to P19 (not necessarily all of them) indicated by the white dot in FIG. 37. As a matter of course, the auxiliary connection member is, as described in Section 7-1, a member which connects between the right side surface of the annular deformation body 60 and the opposing surface of the right side support body 20 and is able to play a role of "a supporting rod." As with the example indicated by the broken line and the triangle mark in FIG. 31, in the example shown in FIG. 37 as well, a part of the annular deformation body 60 (specifically, a part at which the X axis intersects with the Y axis) is expanded outward to provide a raised part, and the auxiliary connection member may be disposed at a position of the raised part in place of the position indicated by the white dot.

Figures 40, 41:
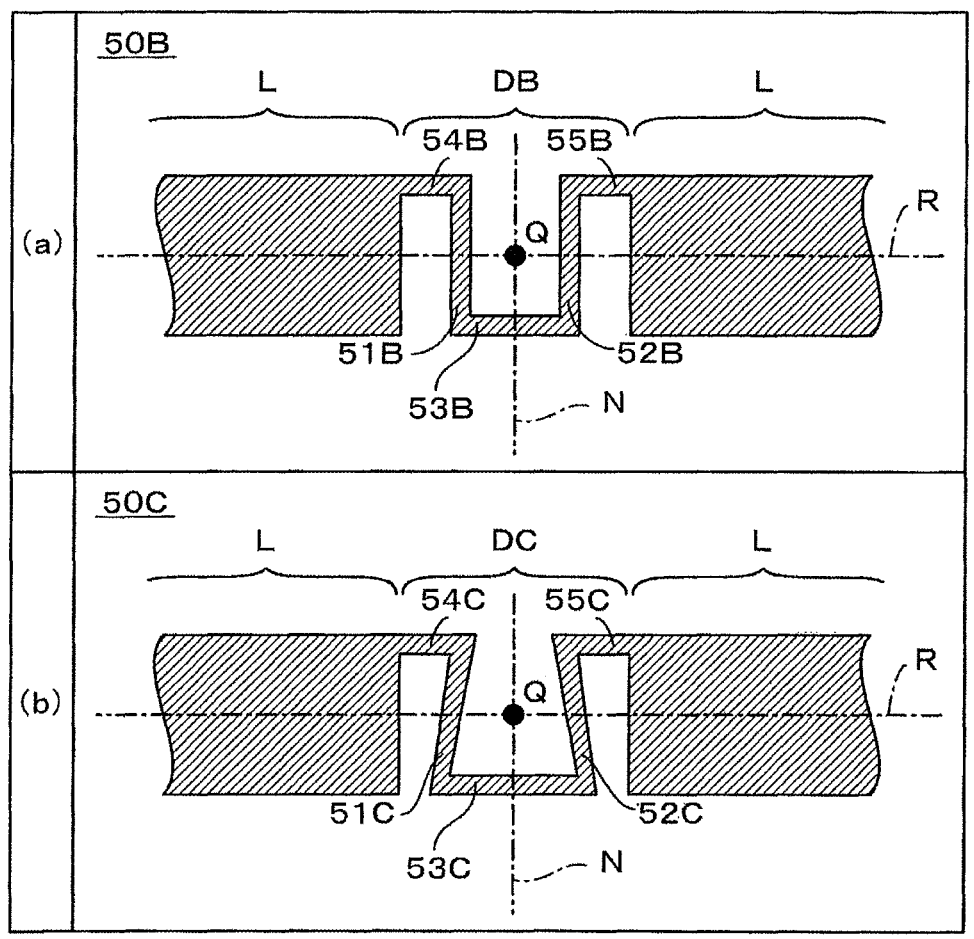
FIG. 40 is a table which shows an amount of fluctuation (an extent of increase or decrease) in capacitance value of each of capacitive elements when force in the direction of each axis or moment around each axis is exerted on the left side support body 10 in a torque sensor in which an auxiliary connection member is additionally added to the modification example which uses the eight sets of detection parts shown in FIG. 35.
FIG. 41 is a partial sectional view which shows variations of a structure of the detection part in the present invention.

FIG. 40 is a table which shows an amount of fluctuation (an extent of increase or decrease) in capacitance value of each of the capacitive elements when force in the direction of each axis or moment around each axis is exerted on the left side support body 10 of the torque sensor in which the auxiliary connection member is also added to the modification example which uses eight sets of the detection parts shown in FIG. 35. In comparison with the table of FIG. 38, any of the fields of Fz, the fields of Mx and the fields of My are (+) or (−), showing reduction in errors resulting from interference with the other axis components.

<7-3. Modification Example on Structure of Detection Part>

As a structure of the detection part D which is provided at the annular deformation body 50 or 60 of the present invention, FIG. 19(a) shows the structure which has the first plate-shaped piece 51, the second plate-shaped piece 52 and the displacement part 53. In the case of the example shown in this drawing, the first plate-shaped piece 51 and the second plate-shaped piece 52 are inclined to the normal line N and an inclination direction of the first plate-shaped piece 51 is also reverse to that of the second plate-shaped piece 52. As shown in FIG. 19(b), when the above-described constitution is adopted, the displacement part 53 moves downward in the drawing upon exertion of a compressive force f1 and the displacement part 53 moves upward in the drawing upon exertion of an extension force f2. Therefore, it is possible to detect the direction and magnitude of exerted torque by referring to an increase or a decrease in capacitance value of the capacitive element C.

However, the structure of the detection part D usable in the present invention shall not be restricted to the structure shown in FIG. 19(a). FIG. 41 is a partial sectional view which shows a variation of the structure of the detection part D.

The detection part DB shown in FIG. 41(a) is a detection part which is provided at a part of an annular deformation body 50B and has a first plate-shaped piece 51B, a second plate-shaped piece 52B, a displacement part 53B, a first bridge part 54B and a second bridge part 55B. As shown in the drawing, any of the displacement part 53B, the first bridge part 54B and the second bridge part 55B is a plate-shaped constituent which is disposed so as to be parallel to the XY plane (the plane including a basic annular channel R). The first plate-shaped piece 51B and the second plate-shaped piece 52B are each a plate-shaped constituent which is disposed so as to be orthogonal to the XY plane (so as to be parallel to the normal line N).

In the case of the detection part D shown in FIG. 19(a), the first plate-shaped piece 51 and the second plate-shaped piece 52 are inclined so as to be reverse in direction to each other. However, in the case of the detection part DB shown in FIG. 41(a), the first plate-shaped piece 51B and the second plate-shaped piece 52B are kept parallel to each other. Therefore, in the detection part DB, even upon exertion of a compressive force f1 or even upon exertion of an extension force f2, the first plate-shaped piece 51B and the second plate-shaped piece 52B are inclined to the normal line N, and in the both cases, the displacement part 53B moves upward in the drawing. Thus, it is impossible to detect the direction of exerted torque on the basis of an increase or a decrease in capacitance value of the capacitive element C but it is possible to detect the magnitude of exerted torque by the detection part DB in an application where the direction of exerted torque has been determined.

The detection part DC shown in FIG. 41(b) is a detection part provided at a part of an annular deformation body 50C and has a first plate-shaped piece 51C, a second plate-shaped piece 52C, a displacement part 53C, a first bridge part 54C and a second bridge part 55C. As shown in the drawing, any of the displacement part 53C, the first bridge part 54C and the second bridge part 55C is a plate-shaped constituent disposed so as to be parallel to the XY plane (the plane including the basic annular channel R). And, the first plate-shaped piece 51C and the second plate-shaped piece 52C are each a plate-shaped constituent disposed in an inclined manner with respect to the normal line N so as to be opposite each other. However, the detection part DC is different in an inclination mode from the detection part D shown in FIG. 19(a). A distance between the plate-shaped pieces 51C and the 52C is increased to a greater extent as the displacement part 53C moves downward in the drawing.

In the detection part DC, upon exertion of a compressive force f1, the displacement part 53C moves upward in the drawing, and upon exertion of an extension force f2, the displacement part 53C moves downward in the drawing, undergoing displacement reverse in direction to that of the detection part D shown in FIG. 19(a). However, the detection part DC is able to detect the direction and magnitude of exerted torque on the basis of an increase or a decrease in capacitance value of the capacitive element C.

As a matter of course, various structures including the above can be adopted as the detection part D. In short, any structure may be adopted as the detection part which can be used in the present invention, as long as it is a structure in which the displacement part causes displacement to the right side support body 20 when a compressive force f1 or an extension force f2 is exerted in a direction along the basic annular channel R.

<7-4. Modification Example which Uses Rectangular Annular Deformation Body>

The annular deformation body 50 shown in FIG. 17 and the annular deformation body 60 shown in FIG. 35 are each a doughnut-shaped structural body in which an inner circumferential contour and an outer circumferential contour are both circular. However, the annular deformation body used in the present invention is not necessarily circular but may be formed into any given structure in the shape of an ellipse, a rectangle or a triangle. In short, any shaped annular deformation body may be used as long as it is a structural body along the looped basic annular channel R.

Figure 42:
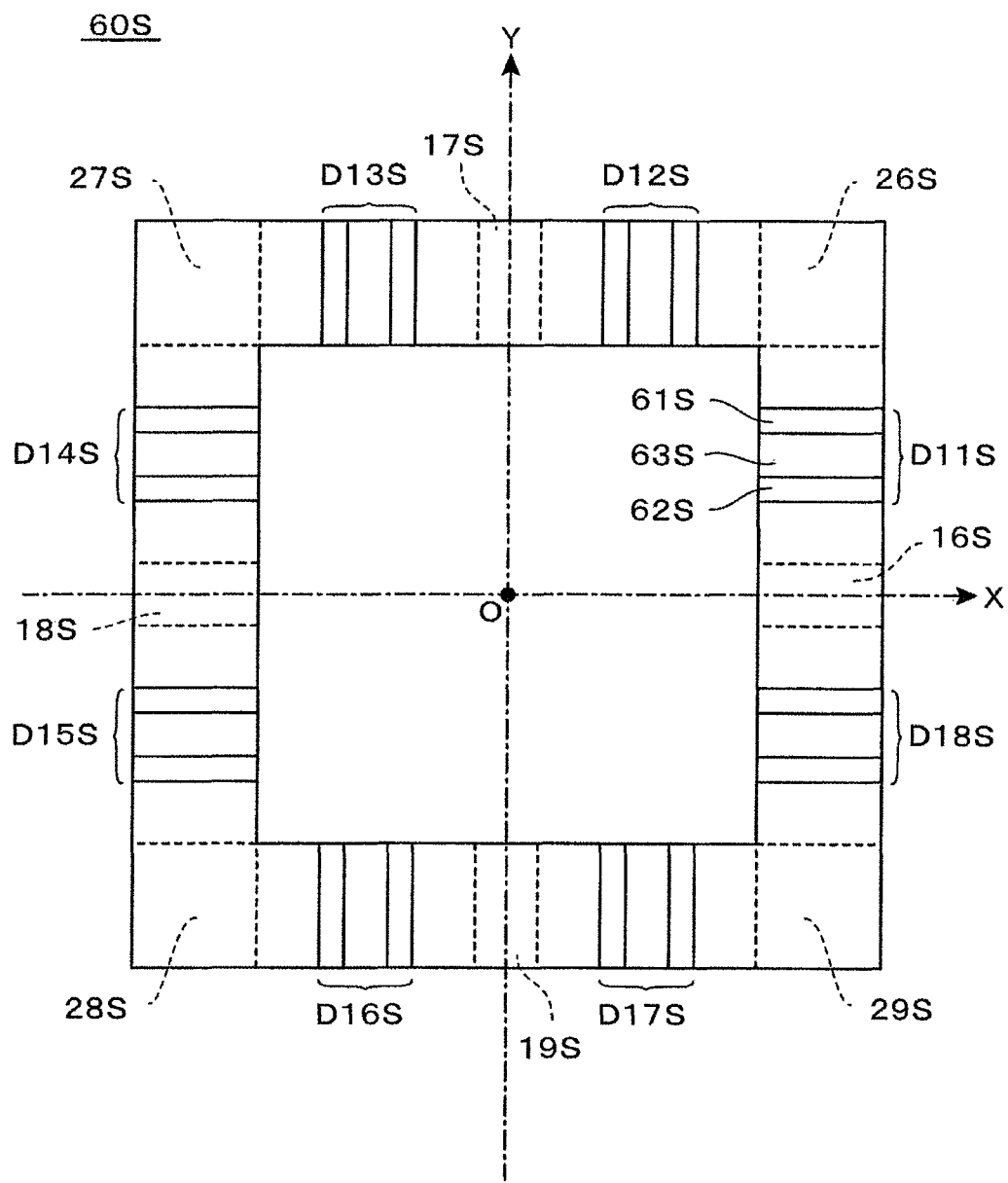
FIG. 42 is a front view of a square-shaped annular deformation body 60S which can be used in the present invention (a drawing when viewed from the side of the right side support body 20).

FIG. 42 is a front view which shows a square-shaped annular deformation body 60S which can be used in the present invention (when viewed from the side of the right side support body 20). The annular deformation body 60S is a structural body in which inner and outer circumferential contours are both square and provided with an upper-side bridge part and a lower-side bridge part parallel to the X axis and a left-side bridge part and a right-side bridge part parallel to the Y axis. Two sets of detection parts D12S, D13S are disposed at the upper-side bridge part, two sets of detection parts D14S, D15S are disposed at the left-side bridge part, two sets of detection parts D16S, D17S are disposed at the lower-side bridge part, and two sets of detection parts D18S, D11S are disposed at the right-side bridge part.

Figure 43:
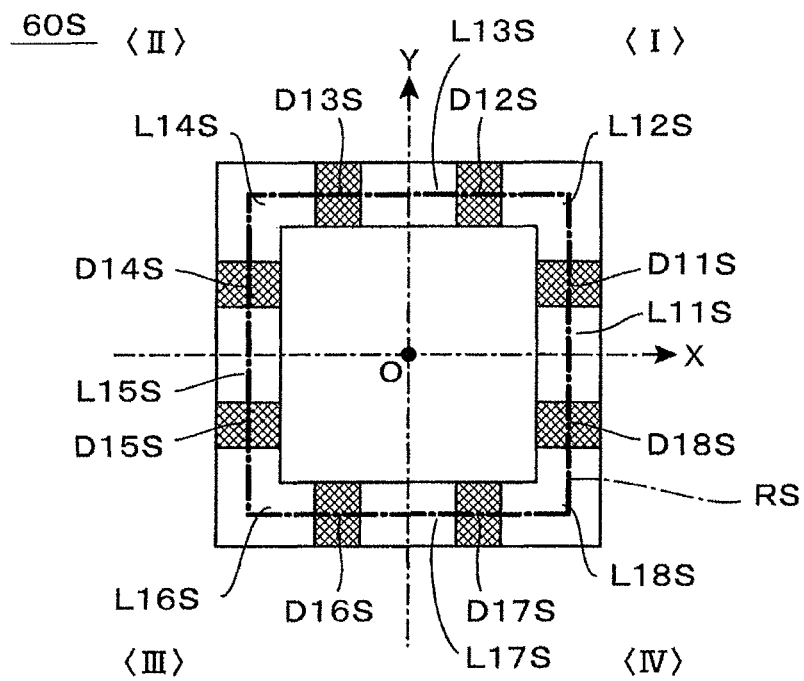
FIG. 43 is a plan view which shows a disposition of detection parts and coupling parts of the square-shaped annular deformation body 60S shown in FIG. 42 (hatching is given for indicating a domain of each detection part and not for indicating a cross section).

FIG. 43 is a plan view which shows a disposition of the detection parts and coupling parts of the square-shaped annular deformation body 60S shown in FIG. 42 (hatching is given to indicate a domain of a detection part and not to indicate a cross section). As shown in the drawing, the annular deformation body 60S is constituted by disposing individual parts in the order of a first coupling part L11S, a first detection part D11S, a second coupling part L12S, a second detection part D12S, a third coupling part L13S, a third detection part D13S, a fourth coupling part L14S, a fourth detection part D14S, a fifth coupling part L15S, a fifth detection part D15S, a sixth coupling part L16S, a sixth detection part D16S, a seventh coupling part L17S, a seventh detection part D17S, an eighth coupling part L18S, and an eighth detection part D18S along a square basic annular channel RS indicated by the alternate long and short dashed line.

Each of the detection parts D11S to D18S is similar in basic structure to each of the detection parts D1 to D4 described above. For example, in FIG. 42, there is shown an example in which the first detection part D11S is constituted of a first deformation part 61S, a second deformation part 62S and a displacement part 63S. Here, the first deformation part 61S, the second deformation part 62S and the displacement part 63S are constituents respectively similar to the first deformation part 51, the second deformation part 52 and the displacement part 53 of the detection part D shown in FIG. 20. A displacement electrode is formed at the displacement part 63S via an insulating layer.

Further, in the case of the annular deformation body 60S shown in FIG. 42, four sites of the left side surface thereof are connected to the left side support body 10 by using left side connection members 16S, 17S, 18S, 19S. And, four sites of the right side surface thereof are connected to the right side support body 20 by using right side connection members 26S, 27S, 28S, 29S. The domains indicated by the broken line in FIG. 42 show projection images on the XY plane of domains to which four sets of the left side connection members 16S, 17S, 18S, 19S are connected and projection images on the XY plane of domains to which four sets of the right side connection members 26S, 27S, 28S, 29S are connected.

Figure 44:
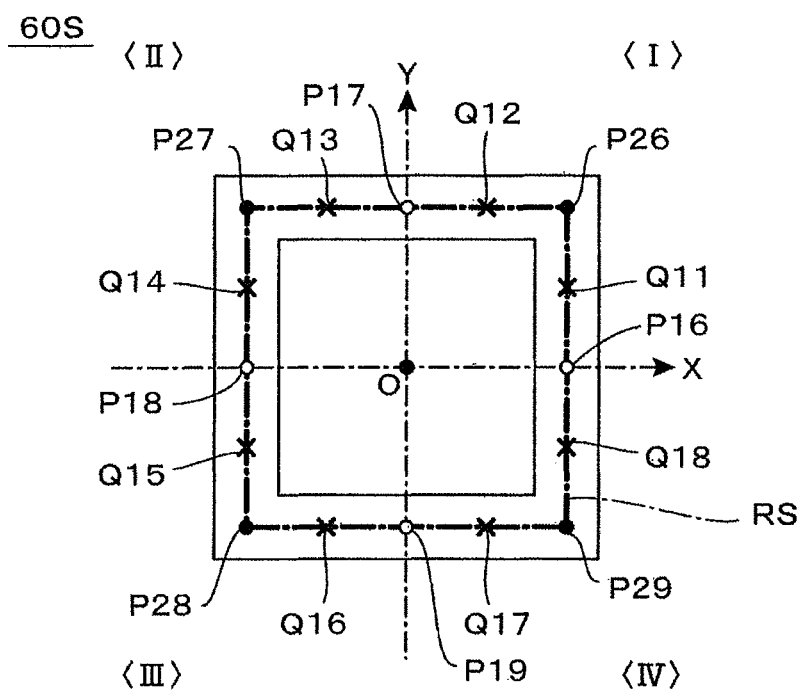
FIG. 44 is a projection view on the XY plane which shows a disposition of individual detection points and individual connection points of the square-shaped annular deformation body 60S shown in FIG. 43 (a drawing when viewed from the side of the right side support body 20: the annular deformation body 60S is indicated only by a contour thereof).

FIG. 44 is a projection view on the XY plane which shows a disposition of the individual detection points and the individual connection points on the square-shaped annular deformation body 60S shown in FIG. 43 (when viewed from the side of the right side support body 20: the annular deformation body 60S is shown only by the contour). Also here, left side connection points P16 to P19 are indicated by the white dot, and right side connection points P26 to P29 are indicated by the black dot. As apparent from comparison between FIG. 43 and FIG. 44, the first left side connection point P16 is disposed at a first coupling part L11S, the first right side connection point P26 is disposed at a second coupling part L12S, the second left side connection point P17 is disposed at a third coupling part L13S, the second right side connection point P27 is disposed at a fourth coupling part L14S, the third left side connection point P18 is disposed at a fifth coupling part L15S, the third right side connection point P28 is disposed at a sixth coupling part L16S, the fourth left side connection point P19 is disposed at a seventh coupling part L17S, and the fourth right side connection point P29 is disposed at an eighth coupling part L18S.

On the other hand, as shown in FIG. 44, eight detection points Q11 to Q18 are defined on the basic annular channel RS. Each of the detection points Q11 to Q18 is defined at an intermediate position between each of the left side connection points indicated by the white dot and each of the right side connection points adjacent thereto indicated by the black dot. Eight sets of the detection parts D11S to D18S are disposed respectively at the detection points Q11 to Q18 and, as a result, these are disposed at the respective positions shown in the front view of FIG. 42. Although a detailed description is omitted here, predetermined computation is performed on the basis of capacitance values of eight sets of capacitive elements which are constituted by the eight detection parts D11S to D18S provided on the square-shaped annular deformation body 60S described above, by which it is possible to detect torque exerted around the Z axis (moment Mz) in a state that errors resulting from interference with the other axis components are removed.

As a matter of course, the auxiliary connection member described in Section 7-1 are each provided at a position indicated by the white dot shown in FIG. 44. Thereby, as described by referring to the table of FIG. 40, it is possible to more effectively remove errors resulting from interference with the other axis components on the basis of exertion of moment Mx or My.

<7-5. Modification Example on the Number of Detection Parts>

In Section 4 to Section 6, a description has been given above of the basic embodiment which uses four sets of the detection parts D1 to D4. In Section 7-2, a description has been given of the modification example which uses eight sets of the detection parts D11 to D18. Further, in any of these examples, a description has been given of the fact that difference detection can be performed to provide detection results from which errors resulting from interference with the other axis components are removed. However, it is inevitable that the greater the number of detection parts, the higher the production cost. Therefore, where priority is given to reduction in production cost, some of the detection parts in the examples described above can be omitted to reduce the number of detection parts.

As already described, difference detection can be performed to realize stable torque detection in which common-mode noise and zero-point drift are suppressed, contributing to setting off influences of expansion of various parts due to temperatures to obtain a highly accurate detection value. In order to perform the above-described difference detection, there may be used two sets of capacitive elements, one with an increasing capacitance value and the other with a decreasing capacitance value.

Specifically, in the case of the basic embodiment described in Section 4 to Section 6, of four sets of the capacitive elements C1 to C4 shown in the table of FIG. 26, there are selected two sets of capacitive elements which are different in reference symbol in the fields of reference symbols in the row of Mz, by which the thus selected two sets of the capacitive elements can be only used to make difference detection. For example, only the capacitive elements C1, C2 may be used to detect torque Mz on the basis of an arithmetic expression which is Mz=C2−C1. Further, in the case of the modification example described in Section 7-2, about eight sets of the capacitive elements C11 to C18 shown in the table of FIG. 38, two sets of capacitive elements which are different in reference symbol in the fields of reference symbols in the row of Mx are selected, thus making it possible to perform difference detection by using only the thus selected two sets of the capacitive elements.

Therefore, in carrying out the present invention, the detection parts provided on the annular deformation body are not necessarily used in four or eight sets but at least two sets of them could perform difference detection. Of course, only two sets of the detection parts are not able to obtain detection results from which errors resulting from interference with the other axis components are removed. For example, according to the table of FIG. 26, only the capacitive elements C1 and C2 can be used to obtain a detection value of torque Mz on the basis of the arithmetic expression of Mz=C2−C1. With reference to the fields of reference symbols in the row of Fx and the row of My in the table, it can be understood that the computation result of "C2−C1" includes the components of Fx and My.

Therefore, in practice, in the case of such a sensor that is to be used in an environment free of interference with the other axis components (for example, a sensor that is to be used by being housed in a cylindrical tube, with the Z axis given as the central axis), the production cost thereof can be reduced by reducing the number of detection parts to two sets.

As a matter of course, it is possible to reduce the number of detection parts to one set. Theoretically, one set of a detection part could detect the direction and magnitude of torque on the basis of an increase or a decrease in capacitance value of one set of a capacitive element. However, only one set of the detection part is not able to perform difference detection, by which errors, etc., may occur due to a change in environmental temperatures, inevitably resulting in reduction in detection accuracy. Therefore, where high detection accuracy is not in practice required but reduction in production cost is given the highest priority, there may be provided a torque sensor which has only one set of a detection part.

<7-6. Modification Example on Left and Right Support Bodies>

In the examples described above, as shown in the example of FIG. 15, for example, when viewed in the reference observation direction in which the rotation axis Z is given as a horizontal line extending laterally, the left side support body 10 is disposed so as to be adjacent to the left side of the annular deformation body 50 and the right side support body 20 is disposed so as to be adjacent to the right side of the annular deformation body 50. In other words, one pair of the support bodies 10, 20 are disposed on both left and right sides of the annular deformation body 50. However, where one pair of the support bodies 10, 20 have functions to transmit torque to be detected to the annular deformation body 50 for causing deformation and these are disposed so as to detect the torque as a change in capacitance value of a capacitive element, these are not necessarily disposed in such a manner as to hold the annular deformation body 50 between both of them.

As described above, the pair of support bodies are not necessarily disposed on the left side or on the right side of the annular deformation body 50. Thus, in the following description, one of the support bodies is referred to as an exertion support body, while the other of the support bodies is referred to as a fixing support body. The exertion support body corresponds to the left side support body 10 described above, while the fixing support body corresponds to the right side support body 20 described above. The fixing support body is a support body which is made in a fixed state or made in a state that a load is applied upon detection of torque. In the case of the examples described above, this is a support body in which a fixed electrode is formed which constitutes a capacitive element C. On the other hand, the exertion support body has functions to apply torque to the annular deformation body 50 where the fixing support body is in a fixed state or in a state that a load is applied thereto.

Of course, in the examples described above, for the sake of convenience, a description has been given of a case where there is detected torque exerted on the left side support body 10 (the exertion support body) in a state that the right side support body 20 (the fixing support body) is fixed. In contrast, if there is detected torque exerted on the right side support body 20 in a state that the left side support body 10 is fixed, a motion principle thereof is the same according to the law of action and reaction. Therefore, the above-described terms of the exertion support body and the fixing support body are only that, for the sake of convenience, on the assumption that torque exerted on the other is detected in a state that one of the bodies is fixed, one of the bodies is referred to as the fixing support body and the other is referred to as the exertion support body. If these are exchanged, no problem is posed according to the principle of detection.

Figure 45:
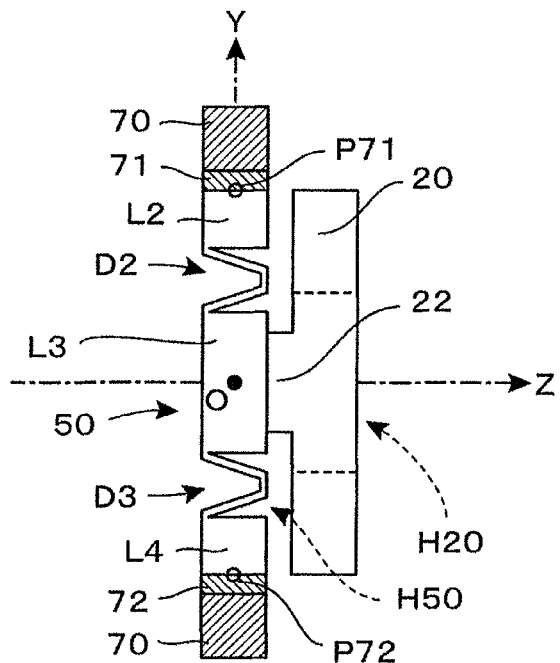
FIG. 45 is a side view of a basic structural part of a modification example which supports the annular deformation body 50 by an exertion support body 70 from the outside (the part of the exertion support body 70 indicates the cross section).

FIG. 45 is a side view which shows a basic structural part of a modification example in which an exertion support body 70 is disposed outside an annular deformation body 50. For the sake of convenience of illustration, the exertion support body 70 and exertion connection members 71, 72 are shown as their cross sections, and other constituents are shown as their side surfaces. As for detection parts, there are shown only outer circumferential surfaces of detection parts D2, D3 which are positioned forward. This modification example is obtained by replacing the left side support body 10 and the left side connection members 11, 12 of the example shown in FIG. 16 by the exertion support body 70 and the exertion connection members 71, 72. Other constituents are identical to those of the example shown in FIG. 16.

Figure 46:
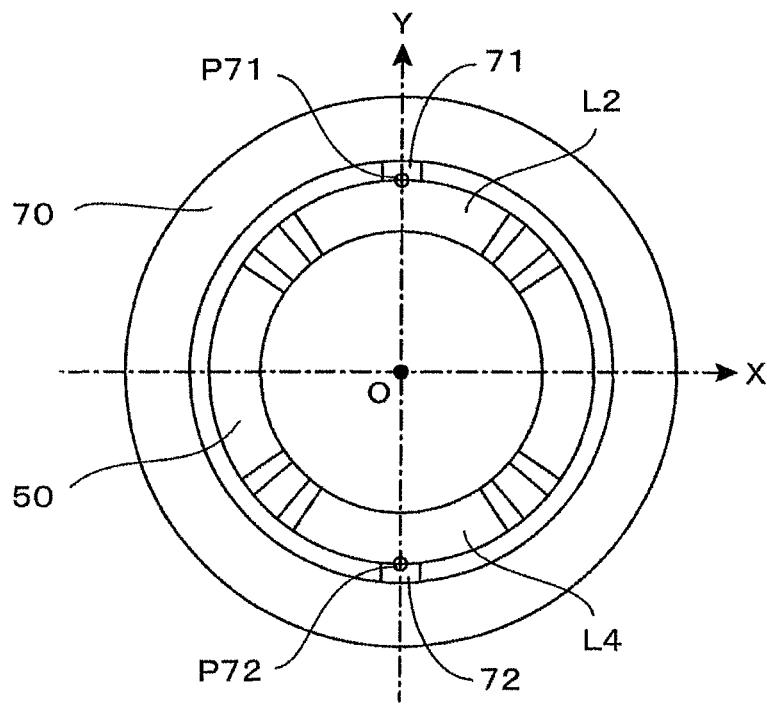
FIG. 46 is a front view of the annular deformation body 50 and the exertion support body 70 shown in FIG. 45, when viewed from the right side in FIG. 45.

FIG. 46 is a front view in which a right side support body 20 is removed from the basic structural part shown in FIG. 45 and only the annular deformation body 50 and the exertion support body 70 are viewed from the right side in FIG. 45. The exertion support body 70 is a circular annular structural body which is disposed so as to surround the annular deformation body 50 from the outside thereof. As shown in FIG. 46, the annular deformation body 50 and the exertion support body 70 are both disposed in a concentric manner, with the Z axis given as the central axis. A first exertion connection member 71 is disposed at a positive domain of the Y axis to connect an inner circumferential surface of the exertion support body 70 with an outer circumferential surface of the annular deformation body 50 (the outer circumferential surface of the coupling part L2). Similarly, a second exertion connection member 72 is disposed at a negative domain of the Y axis to connect an inner circumferential surface of the exertion support body 70 with an outer circumferential surface of the annular deformation body 50 (the outer circumferential surface of the coupling part L4).

Therefore, in the case of this modification example, a first exertion connection point P71 is defined at a position at which the outer circumferential surface of the annular deformation body 50 intersects with a positive domain of the Y axis, and a second exertion connection point P72 is defined at a position at which the outer circumferential surface of the annular deformation body 50 intersects with a negative domain of the Y axis. The first exertion connection member 71 has functions to connect the first exertion connection point P71 with the inner circumferential surface of the exertion support body 70. And, the second exertion connection member 72 has functions to connect the second exertion connection point P72 with the inner circumferential surface of the exertion support body 70.

As a matter of course, positions of the exertion connection points P71, P72 shall not be restricted to those on the Y axis shown in the drawing. These can be defined at any given position as long as, with regard to the basic plane (XY plane), orthogonal projection images of the exertion connection points P71, P72 and orthogonal projection images of the fixing connection points P21, P22 (the right side connection points P21, P22 shown in FIG. 18) are formed at mutually different positions. In the case of the modification example shown in the drawing, the first exertion connection point P71 can be defined at any given position on the surface of the coupling part L2 (not necessarily on the outer circumferential surface). It will be sufficient that the first exertion connection member 71 connects the first exertion connection point P71 with the exertion support body 70. Similarly, the second exertion connection point P72 can be defined at any given position on the surface of the coupling part L4 (not necessarily on the outer circumferential surface). It will be sufficient that the second exertion connection member 72 connects the second exertion connection point P72 with the exertion support body 70.

Since it is necessary to fix the fixed electrode E20 which constitutes the capacitive element C, the right side support body 20 is required to be disposed at a position adjacent to the right side of the annular deformation body 50. Therefore, in the modification example shown in FIG. 45, the right side support body 20 and the fixing connection members 21, 22 are identical in constitution to the right side support body 20 and the right side connection members 21, 22 shown in the example of FIG. 16.

Figure 47:
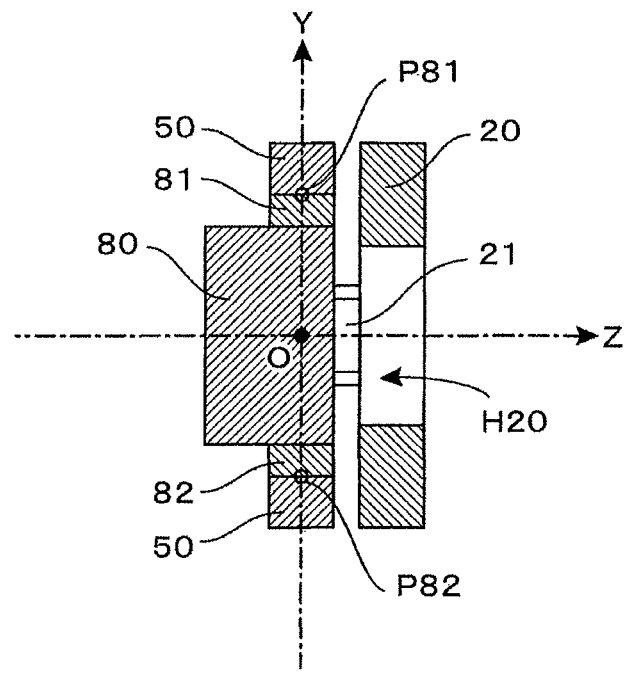
FIG. 47 is a side sectional view in which the basic structural part of the modification example which supports the annular deformation body 50 from the inside by an exertion support body 80 is cut along the YZ plane.

FIG. 47 is a side sectional view which shows a basic structural part of a modification example in which an exertion support body 80 is disposed inside an annular deformation body 50 (indicating a cross section cut along the YZ plane). This modification example is obtained by replacing the exertion support body 70 and the exertion connection members 71, 72 (each of which is disposed outside the annular deformation body 50) of the modification example shown in FIG. 45 by an exertion support body 80 and exertion connection members 81, 82 (each of which is disposed inside the annular deformation body 50). And, other constituents are identical to those of the modification example shown in FIG. 45.

Figure 48:
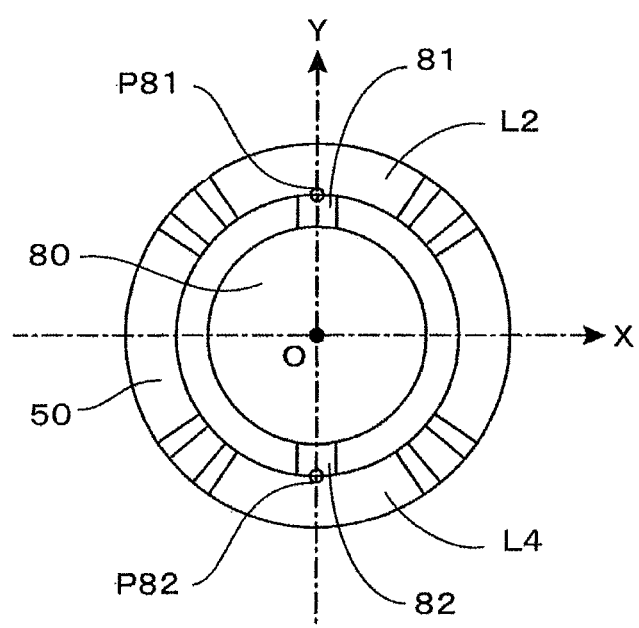
FIG. 48 is a front view of the annular deformation body 50 and the exertion support body 80 shown in FIG. 47, when viewed from the right side in FIG. 47.

FIG. 48 is a front view in which a right side support body 20 is removed from the basic structural part 20 shown in FIG. 47 and only the annular deformation body 50 and the exertion support body 80 are viewed from the right side in FIG. 47. The exertion support body 80 is a cylindrical structural body which is disposed inside the annular deformation body 50, and as shown in FIG. 48, the annular deformation body 50 and the exertion support body 80 are each disposed in a concentric manner, with the Z axis given as the central axis. There may be used, as the exertion support body 80, a cylindrical structural body which forms a through-opening part H80 in the interior thereof, in place of a cylindrical structural body, if necessary.

A first exertion connection member 81 is disposed at a positive domain of the Y axis to connect an outer circumferential surface of the exertion support body 80 with an inner circumferential surface (the inner circumferential surface of the coupling part L2) of the annular deformation body 50. Similarly, a second exertion connection member 82 is disposed at a negative domain of the Y axis to connect the outer circumferential surface of the exertion support body 80 with the inner circumferential surface (the inner circumferential surface of the coupling part L4) of the annular deformation body 50.

Therefore, in the case of this modification example, a first exertion connection point P81 is defined at a position at which the inner circumferential surface of the annular deformation body 50 intersects with a positive domain of the Y axis, and a second exertion connection point P82 is defined at a position at which the inner circumferential surface of the annular deformation body 50 intersects with a negative domain of the Y axis. The first exertion connection member 81 has functions to connect the first exertion connection point P81 with the outer circumferential surface of the exertion support body 80. And, the second exertion connection member 82 has functions to connect the second exertion connection point P82 with the outer circumferential surface of the exertion support body 80.

In this modification example as well, positions of the exertion connection points P81, P82 are not restricted to the positions on the Y axis as shown in the drawing. These can be defined in any given position as long as, with regard to the basic plane (XY plane), orthogonal projection images of the exertion connection points P81, P82 and orthogonal projection images of fixing connection points P21, P22 (the right side connection points P21, P22 shown in FIG. 18) are formed at mutually different positions. In the case of the modification example shown in the drawing, the first exertion connection point P81 can be defined at any given position on the surface of the coupling part L2 (not necessarily on the inner circumferential surface). It will be sufficient that the first exertion connection member 81 connects the first exertion connection point P81 with the exertion support body 80. Similarly, the second exertion connection point P82 can be defined at any given position on the surface of the coupling part L4 (not necessarily on the inner circumferential surface). It will be sufficient that the second exertion connection member 82 connects the second exertion connection point P82 with the exertion support body 80.

In this modification example as well, since it is necessary to fix the fixed electrode E20 which constitutes the capacitive element C, the right side support body 20 is required to be disposed at a position adjacent to the right side of the annular deformation body 50. Therefore, in the modification example shown in FIG. 47, the right side support body 20 and fixing connection members 21, 22 are identical in constitution to the right side support body 20 and the right side connection members 21, 22 of the example shown in FIG. 16.

Figure 49:
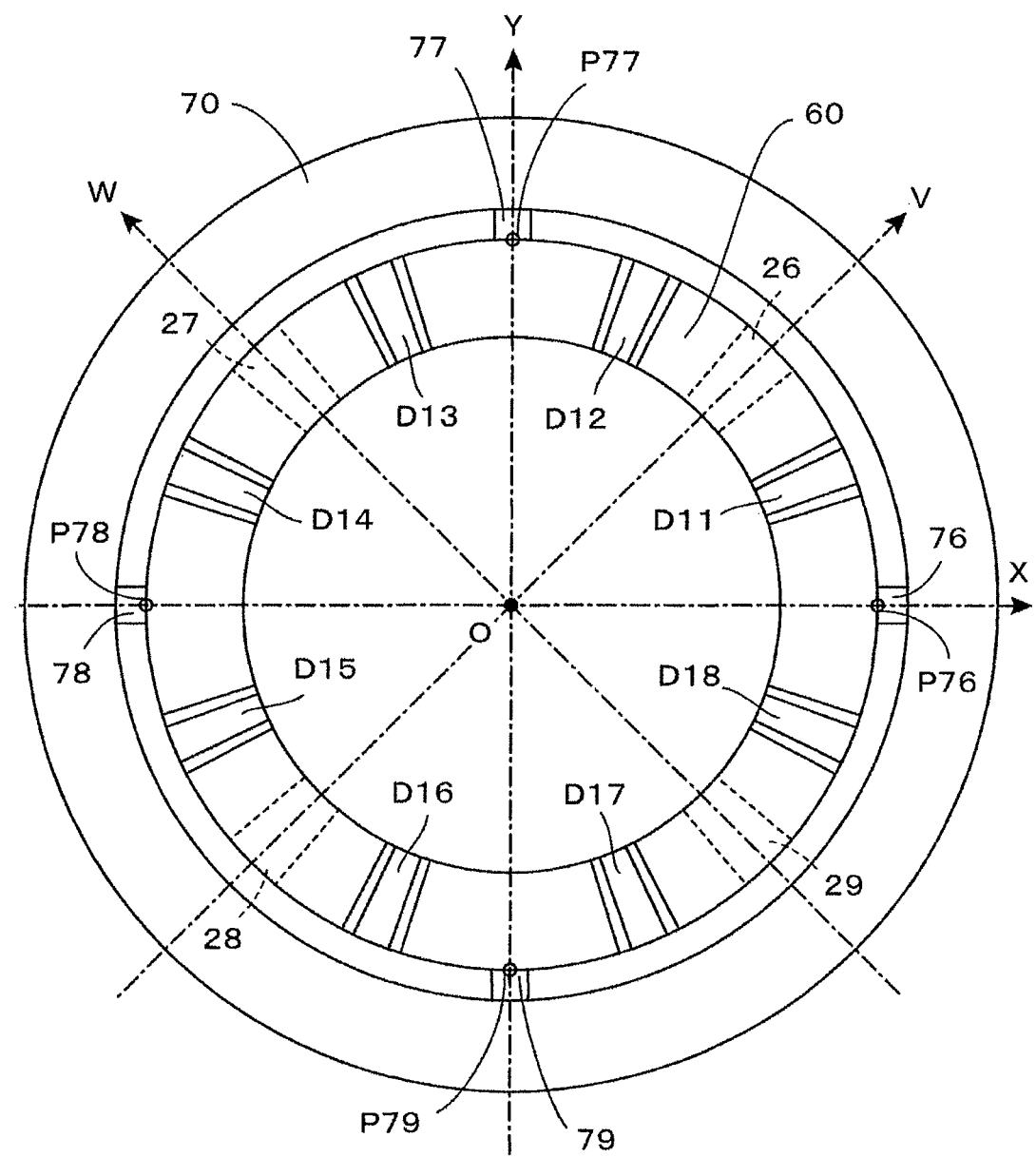
FIG. 49 is a front view which shows a state that the annular deformation body 60 shown in FIG. 35 is supported from the outside by the exertion support body 70, when viewed from the right side.

As a matter of course, the modification examples shown in FIG. 45 to FIG. 48 can be used in combination with the modification examples described in Section 7-1 to Section 7-5. For example, FIG. 49 is a drawing which shows an example in which the modification example described in Section 7-2 is combined with the modification example shown in FIG. 45 and FIG. 46, thereby showing a state that the annular deformation body 60 shown in FIG. 35 is supported from outside by the exertion support body 70 (a front view when viewed in the right direction). As described already, the annular deformation body 60 is provided with a total of eight sets of the detection parts D11 to D18 and fixed to the right side support body 20 (the fixing support body) by four sets of the right side connection members 26 to 29 (fixing connection members) (in the drawing, each position is indicated by the broken line).

On the other hand, the exertion support body 70 is a circular annular structural body disposed so as to surround the annular deformation body 60 from the outside thereof. As shown in FIG. 49, the annular deformation body 60 and the exertion support body 70 are each disposed in a concentric manner, with the Z axis given as the central axis. These are connected together by four sets of exertion connection members 76 to 79. Here, the first exertion connection member 76 is disposed at a positive domain of the X axis, the second exertion connection member 77 is disposed at a positive domain of the Y axis, the third exertion connection member 78 is disposed at a negative domain of the X axis, and the fourth exertion connection member 79 is disposed at a negative domain of the Y axis. Any of them connects the inner circumferential surface of the exertion support body 70 with the outer circumferential surface of the annular deformation body 60.

Therefore, in the case of the modification example shown in FIG. 49, a first exertion connection point P76 is defined at a position at which the outer circumferential surface of the annular deformation body 60 intersects with the positive domain of the X axis, a second exertion connection point P77 is defined at a position at which the outer circumferential surface of the annular deformation body 60 intersects with the positive domain of the Y axis, a third exertion connection point P78 is defined at a position at which the outer circumferential surface of the annular deformation body 60 intersects with the negative domain of the X axis, and a fourth exertion connection point P79 is defined at a position at which the outer circumferential surface of the annular deformation body 60 intersects with the negative domain of the Y axis.

Figure 50:
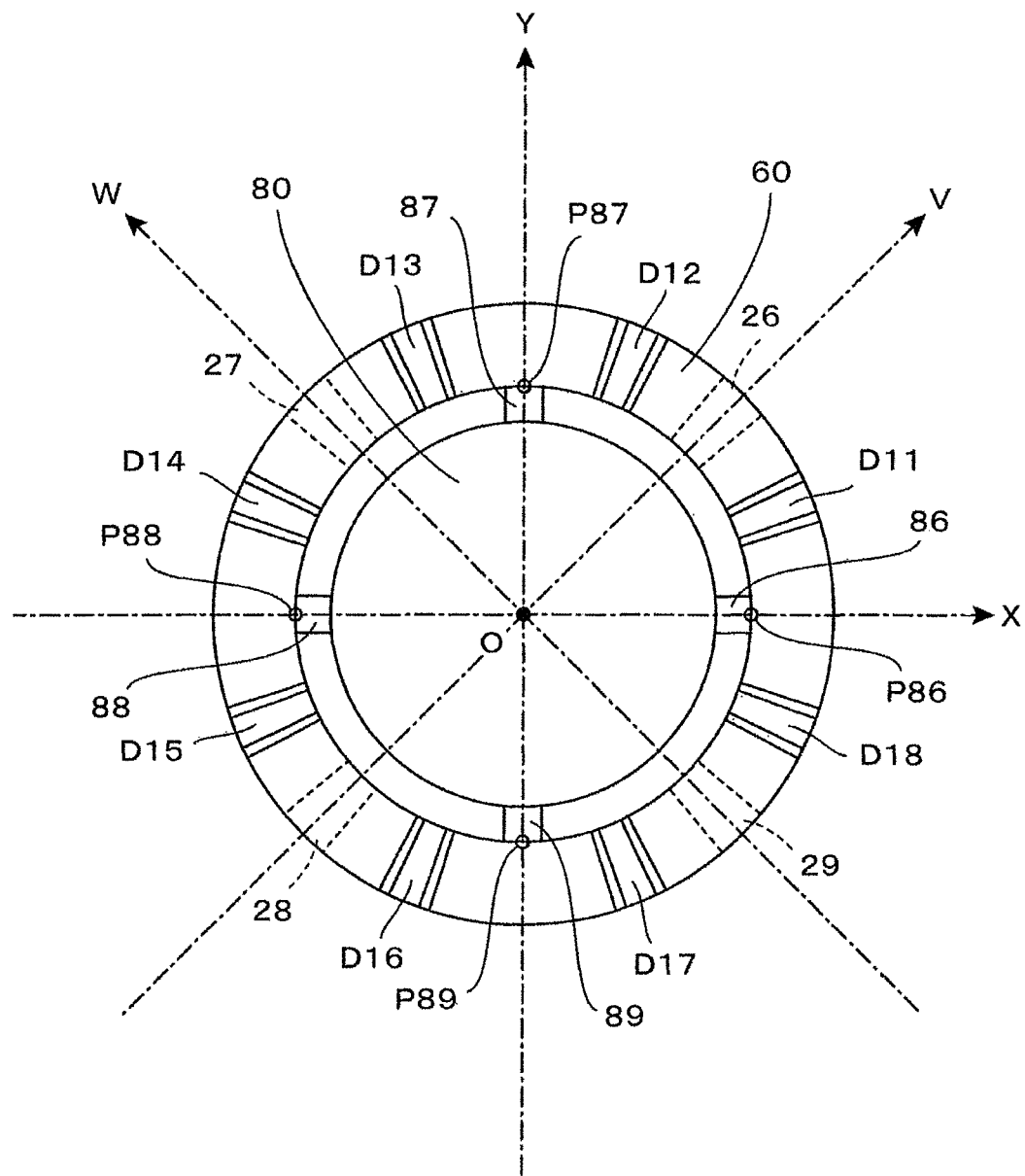
FIG. 50 is a front view which shows a state that the annular deformation body 60 shown in FIG. 35 is supported from the inside by the exertion support body 80, when viewed from the right side.

In contrast, FIG. 50 is a drawing which shows an example in which the modification example described in Section 7-2 is combined with the modification examples shown in FIG. 47 and FIG. 48, showing a state that the annular deformation body 60 shown in FIG. 35 is supported from inside by the exertion support body 80 (the front view when viewed in the right direction). In the case of the modification example as well, an annular deformation body 60 is provided with a total of eight detection parts D11 to D18 and fixed to a right side support body 20 (a fixing support body) by four sets of right side connection members 26 to 29 (fixing connection members) (in the drawing, each position is indicated by the broken line).

On the other hand, an exertion support body 80 is a cylindrical structural body disposed inside the annular deformation body 60 (as a matter of course, a circular structural body will do). As shown in FIG. 50, the annular deformation body 60 and the exertion support body 80 are both disposed in a concentric manner, with the Z axis given as the central axis, and these are connected together by four sets of exertion connection members 86 to 89. Here, a first exertion connection member 86 is disposed at a positive domain of the X axis, a second exertion connection member 87 is disposed at a positive domain of the Y axis, a third exertion connection member 88 is disposed at a negative domain of the X axis, and a fourth exertion connection member 89 is disposed at a negative domain of the Y axis. And, any of them connects the outer circumferential surface of the exertion support body 80 with the inner circumferential surface of the annular deformation body 60.

Therefore, in the case of the modification example shown in FIG. 50, a first exertion connection point P86 is defined at a position at which the inner circumferential surface of the annular deformation body 60 intersects with the positive domain of the X axis, a second exertion connection point P87 is defined at a position at which the inner circumferential surface of the annular deformation body 60 intersects with the positive domain of the Y axis, a third exertion connection point P88 is defined at a position at which the inner circumferential surface of the annular deformation body 60 intersects with the negative domain of the X axis, and a fourth exertion connection point P89 is defined at a position at which the inner circumferential surface of the annular deformation body 60 intersects with the negative domain of the Y axis.

In other words, in the torque sensor which adopts the basic structural part according to the modification examples shown in FIG. 45 to FIG. 50, it will be sufficient that the exertion support body is disposed at a position adjacent to the outside or the inside of the annular deformation body, the fixing support body is disposed at a position adjacent to the right side of the annular deformation body, exertion connection points provided at a predetermined site of the annular deformation body are connected with the exertion support body by exertion connection members, and fixing connection points provided at a predetermined site of the annular deformation body are connected with the fixing support body by fixing connection members.

As shown in FIG. 15, in the basic structural part of the torque sensor according to the basic embodiment described in Section 4 and Section 5, the left side connection members 11, 12 play a role of connecting the left side connection points P11, P12 defined on the left side surface of the annular deformation body 50 with the left side support body 10. The right side connection members 21, 22 play a role of connecting the right side connection points P21, P22 defined on the right side surface of the annular deformation body 50 with the right side support body 20. However, the left side connection points P11, P12 are not necessarily defined on the left side surface of the annular deformation body 50 but may be defined on an outer circumferential surface or an inner circumferential surface of the annular deformation body 50. Similarly, the right side connection points P21, P22 are not necessarily defined on the right side surface of the annular deformation body 50 but may be defined on an outer circumferential surface or an inner circumferential surface of the annular deformation body 50.

However, as with the basic embodiment described in Section 4 and Section 5, where there is adopted such a constitution that the left side support body 10 and the right side support body 20 are provided on both left and right sides of the annular deformation body 50, the left side connection points P11, P12 are defined on the left side surface of the annular deformation body 50, and the right side connection points P21, P22 are defined on the right side surface of the annular deformation body 50, by which the left side connection members 11, 12 and the right side connection members 21, 22 are made simple in structure (these may be constituted simply with block-like members which connect between the left and right side constituents). Therefore, in practice, it is preferable that the left side connection points P11, P12 are defined on the left side surface of the annular deformation body 50 and the right side connection points P21, P22 are defined on the right side surface of the annular deformation body 50.

<7-7. Another Variation of Detection Part>

A description has been given above of the embodiment which uses the detection part D having a unique structure shown in FIG. 19(*a*). Furthermore, in FIG. 41(*a*), (*b*), there are shown detection parts DB, DC, as a variation thereof. As a matter of course, various structural parts can be adopted as a detection part. As a detection part of the present invention, in short, any structural part can be adopted as long as it is structured so as to cause displacement or deflection upon exertion of a compressive force f1 or an extension force f2 in a direction along the basic annular channel R. Here, a description will be given of still another variation of a structure and a disposition of the detection part D.

In the case of the example shown in FIG. 19(*a*), the detection part D which is disposed at a position of the detection point Q is constituted of the first plate-shaped piece 51 and the second plate-shaped piece 52 which will cause elastic deformation and the third plate-shaped piece 53, both ends of which are supported by the plate-shaped pieces 51, 52. The third plate-shaped piece 53 functions as a displacement part. Here, when the normal line N orthogonal to the XY plane is provided at a position of the detection point Q, the first plate-shaped piece 51 and the second plate-shaped piece 52 are inclined to the normal line N, and also the first plate-shaped piece 51 is reversed to the second plate-shaped piece 52 in an inclination direction. Further, in a state that no torque is exerted, an opposing surface of the third plate-shaped piece 53 (the displacement part) is kept parallel to an opposing surface of the right side support body 20.

Here, when noted is a planar shape of the detection part described in each of the examples shown in FIG. 17, FIG. 31, FIG. 35, FIG. 46, FIG. 48, FIG. 49 and FIG. 50, any of projection images of the first plate-shaped pieces 51, 61, the second plate-shaped pieces 52, 62 and the third plate-shaped pieces 53, 63 on the XY plane is formed in a fan shape similar to a trapezoid. Contour lines on left and right sides of the projection image are those along the radius toward the origin O. For example, any of the planar shapes of the plate-shaped pieces 51, 52, 53 which constitute the detection part D1 shown in FIG. 17 is formed in a fan shape similar to a trapezoid. This is because the annular deformation body 50 is formed in a circular annular shape, the detection parts D1 to D4 are each designed so as to be in agreement with the circular annular shape.

In contrast, in the example shown in FIG. 42, for example, any of the planar shapes of the plate-shaped pieces 61S, 62S, 63S which constitute the detection part D11S is rectangular. This is because the annular deformation body 60S is formed in a square annular shape, the detection parts D11S to D18S are each designed so as to be in agreement with the square annular shape.

In the examples described above, the planar shape of each of the plate-shaped pieces which constitute the detection part is designed to be a fan-shaped or rectangular in agreement with the shape of the annular deformation body. However, the planar shape of each of the plate-shaped pieces is not necessarily formed so as to be different depending on a case, as described in the above example. For example, as shown in FIG. 17, even where the circular annular-shaped deformation body 50 is adopted, each of the plate-shaped pieces 51, 52, 53 may be designed so as to be rectangular in planar shape. In the example shown in FIG. 17, each of the plate-shaped pieces 51, 52, 53 is formed rectangular in planar shape, as with each of the plate-shaped pieces 61S, 62S, 63S shown in the example of FIG. 42. Thereby, where a three-dimensional structure of the detection part D is formed by cutting processing or wire-cut processing, a simple step of driving processing tools in the same direction can be adopted, and this is preferable in mass-producing sensors. Further, in the embodiments described above, there is used the detection part D having a structure in which the displacement parts 53, 63 undergo displacement in the direction of the Z axis. However, the displacement parts 53, 63 do not necessarily undergo displacement in the direction of the Z axis.

Figure 51:
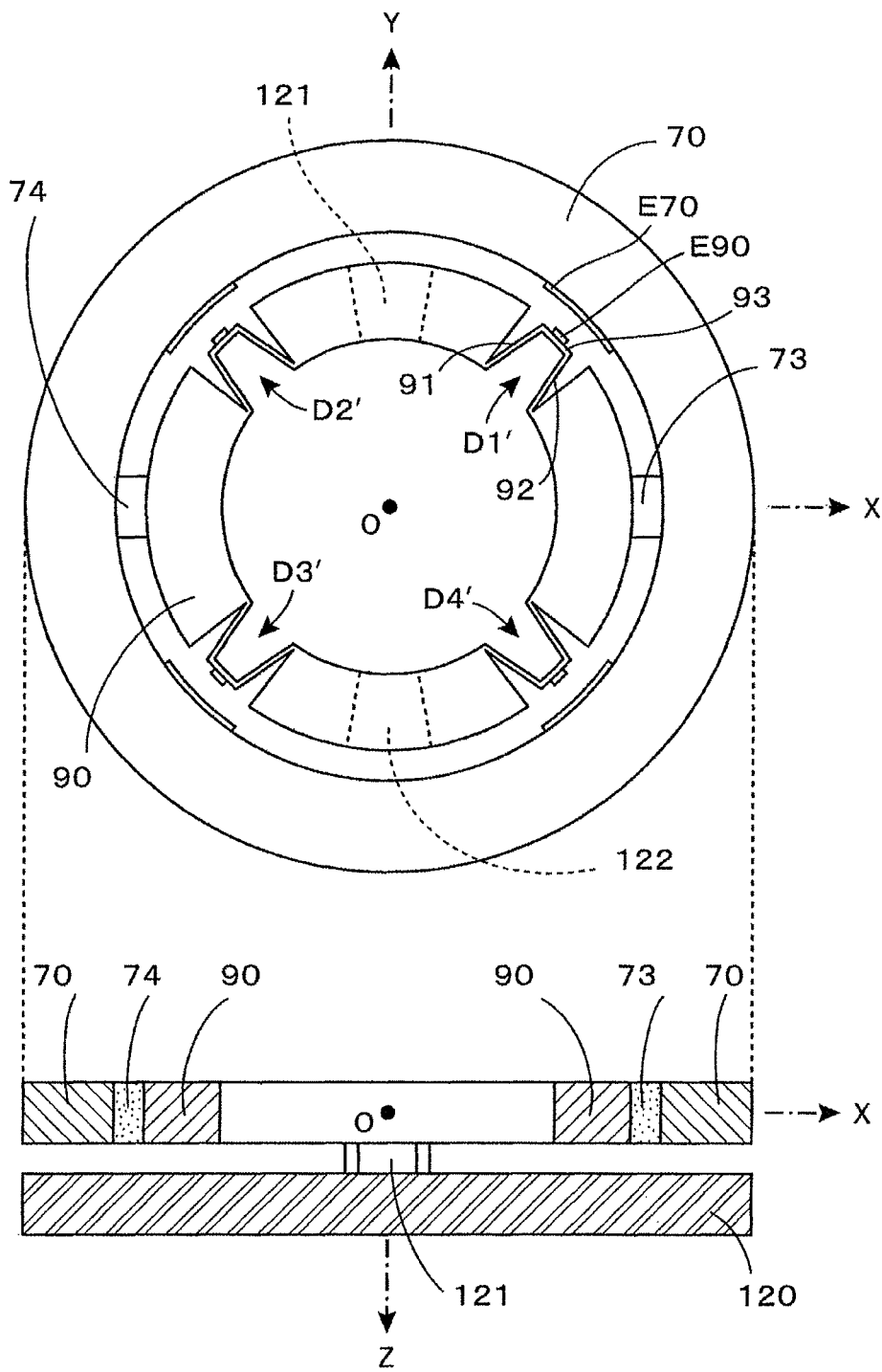
FIG. 51 covers a plan view (a view at the upper part) which shows an annular deformation body 90 having detection parts D1' to D4' disposed so that a displacement part 93 faces outside and the exertion support body 70 disposed outside thereof, and a side sectional view (a view at the lower part) in which a basic structural part constituted by adding a fixing support body 120 thereto is cut along the XZ plane.

FIG. 51 is a plan view (a view at the upper part) which shows an annular deformation body 90 having a detection part, the direction of which is changed, in place of the annular deformation body 50 of the embodiment shown in FIG. 15 and an exertion support body 70 which is disposed outside thereof. FIG. 51 is also a side sectional view (a view at the lower part) in which a basic structural part which is constituted by adding a fixing support body 120 to them is cut along the XZ plane. Four sets of the detection parts D1 to D4 provided on the annular deformation body 50 shown in FIG. 15 are replaced in the annular deformation body 90 shown in FIG. 51 by four sets of detection parts D1' to D4'. Here, a basic structure of each of the four sets of detection parts D1' to D4' is similar to a structure of the detection part D shown in FIG. 19(a) but different in direction on the annular deformation body.

As apparent from the detection part D1' in FIG. 51, the detection part D1' is constituted of a first plate-shaped piece 91 and a second plate-shaped piece 92 which cause elastic deformation and a third plate-shaped piece 93, the both ends of which are supported by the plate-shaped pieces 91, 92. The third plate-shaped piece 93 functions as a displacement part. Here, the plate-shaped pieces 91, 92, 93 respectively correspond to the plate-shaped pieces 51, 52, 53 shown in FIG. 19(a) and are disposed so as to be different in direction in relation to the annular deformation body.

That is, in four sets of the detection parts D1 to D4 provided on the annular deformation body 50 shown in FIG. 15, the displacement part 53 is positioned on the right side of the annular deformation body 50, and the right surface of the displacement part 53 opposes the left surface of the right side support body 20 (the right side support body). In contrast, in four sets of the detection parts D1' to D4' provided on the annular deformation body 90 shown in FIG. 51, the displacement part 93 is positioned outside the annular deformation body 90, and an outer surface of the displacement part 93 opposes an inner circumferential surface of the exertion support body 70.

In other words, four sets of the detection parts D1' to D4' shown in FIG. 51 are structured in such a manner that four sets of the detection parts D1 to D4 shown in FIG. 15 are rotated by 90 degrees, with the basic annular channel R given as the rotation axis. Therefore, when a compressive force f1 is exerted along the basic annular channel R, the displacement part 93 undergoes displacement outward (refer to FIG. 19(b)), and when an extension force f2 is exerted along the basic annular channel R, the displacement part 93 undergoes displacement inward (refer to FIG. 19(c)).

As described above, in four sets of the detection parts D1 to D4 provided on the annular deformation body 50 shown in FIG. 15, the displacement part 53 undergoes displacement in the direction of the Z axis. On the other hand, in four sets of the detection parts D1' to D4' provided on the annular deformation body 90 shown in FIG. 51, the displacement part 93 undergoes displacement in the radial direction of a circle drawn on the XY plane, with the origin O given as the center. Therefore, as shown in FIG. 51, a displacement electrode E90 is formed on an outer surface of the displacement part 93 and a fixed electrode E70 is formed on an inner circumferential surface of the exertion support body 70 opposing thereto, thus making it possible to constitute a capacitive element C with a pair of electrodes E90, E70. Next, a capacitance value of the capacitive element C can be used as a parameter which indicates displacement of the displacement part 93 in the radial direction.

In the case of the modification example shown in FIG. 51, fixing connection members 121, 122 are disposed at positions along the Y axis and connected to the fixing support body 120. Exertion connection members 73, 74 are disposed at positions along the X axis and connected to the exertion support body 70. This is different in connection mode from the example shown in FIG. 15. That is, in the case of the example shown in FIG. 15, the fixing connection members 21, 22 are disposed at positions along the X axis and connected to the right side support body 20. And, the exertion connection members 11, 12 are disposed at positions along the Y axis and connected to the exertion support body 10.

Therefore, four sets of capacitive elements C1' to C4' formed by four sets of the detection parts D1' to D4' shown in FIG. 51 are reverse in behavior to four sets of the capacitive elements C1 to C4 formed by four sets of the detection parts D1 to D4 shown in FIG. 15. That is, the behavior of the capacitive elements C1' to C4' of the modification example shown in FIG. 51 is such that a relationship of the f1 and the f2 in the fields of stress shown in FIG. 22 is reversed and reference symbols in the fields of an amount of fluctuation are reversed. Therefore, an arithmetic expression for calculating torque Mz is expressed by Mz=+C1−C2+C3−C4. However, as described above, this is due to a slight change in connection mode and not an essential difference.

Further, in the example shown in FIG. 15, there is provided the annular right side support body 20 having the through-opening part H20 at the center, whereas in the modification example shown in FIG. 51(b), there is provided a disk-shaped fixing support body 120 free of an opening part. This is not an essential difference either. As described above, in the example shown in FIG. 15, the through-opening part is provided on all of the three constituents 10, 20, 50. Therefore, any given axis can be inserted through along the Z axis when such a necessity is raised. However, when such a necessity is not raised, as shown in the example of FIG. 51(b), use of the disk-shaped fixing support body 120 will be sufficient.

The modification example shown in FIG. 51 has the following two important points. A first point is that where a capacitive element is used as a detection element, the capacitive element is not necessarily required to change in electrode interval in the direction of the Z axis. The example shown in FIG. 51 is such that the capacitive element changes in electrode interval in the radial direction. As a matter of course, there may be used such a capacitive element, the electrode interval of which will change in any direction other than the above direction.

Next, a second point is that where a capacitive element is used as a detection element, it is necessary to provide the displacement electrode E90 at a detection part (that is, the annular deformation body). However, the fixed electrode E70 which opposes the displacement electrode E90 is not necessarily provided at the fixing support body 120 and may be provided at the exertion support body 70. In the individual embodiments described up to Section 7-6, any of the fixed electrodes is provided on the fixing support body. In the case of the modification example shown in FIG. 51, however, the fixed electrode E70 is provided not on the fixing support body 120 but on an inner circumferential surface of the circular annular-shaped exertion support body 70. Here, the exertion support body 70 undergoes displacement by exertion of torque, thus resulting in displacement of the fixed electrode E70. However, the displacement by exertion of torque occurs along the inner circumferential surface of the exertion support body 70. Therefore, there is no influence on the distance between the electrode of each of the capacitive elements C1' to C4' and there is no trouble in torque detection.

<7-8. Modification Example which Uses Strain Gauge>

Figure 52:
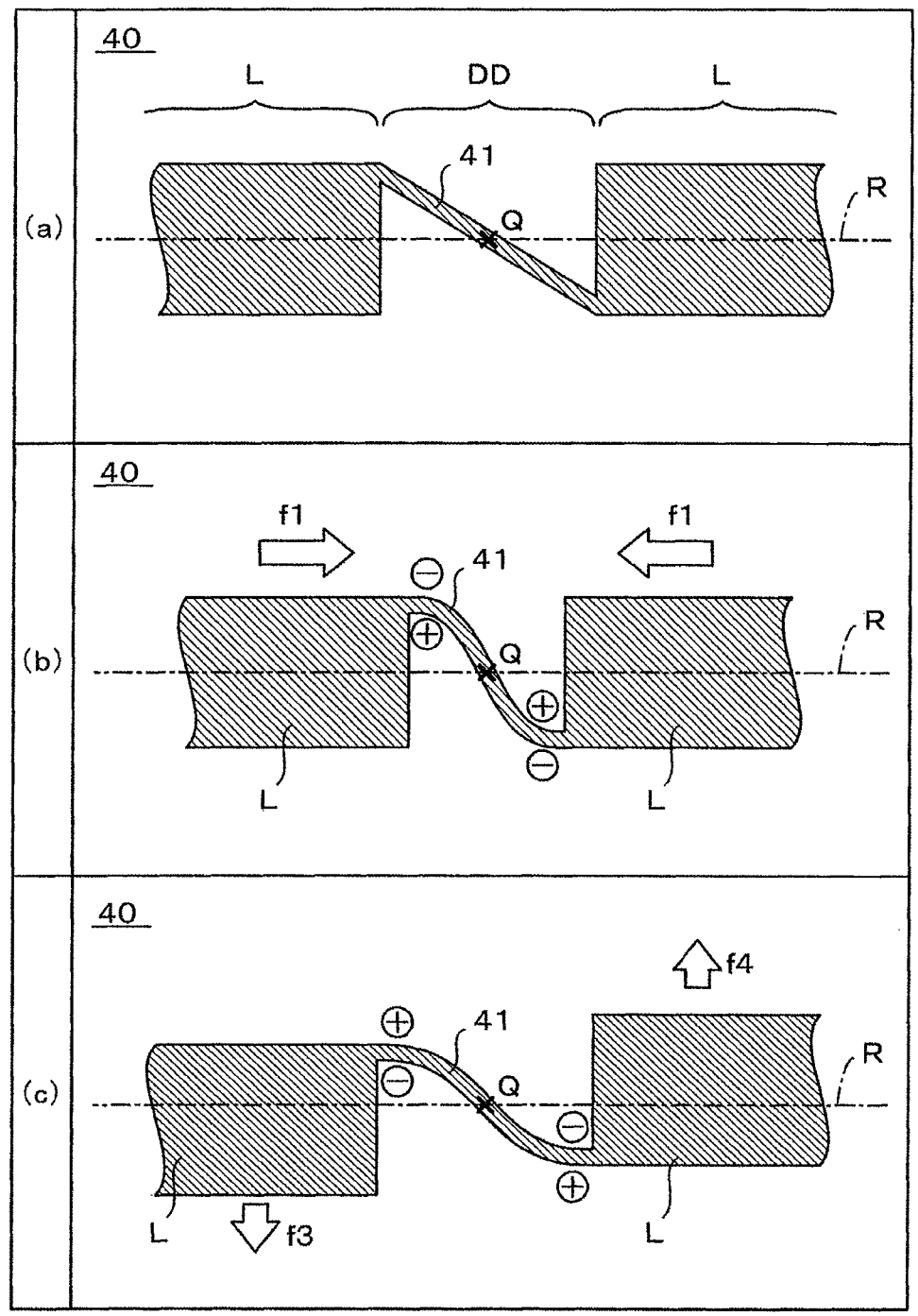
FIG. 52 covers partial sectional views, each of which shows a mode of elastic deformation of a plate-shaped deformation part 41 which constitutes a detection part DD simpler in structure.

Still another mode of the detection part will be shown here and also a description will be given of a modification example in which a strain gauge is used as a detection element. A detection part DD shown in FIG. 52(a) is a detection part which is provided at a part of an annular deformation body 40. The detection part has a very simple structure composed of a single plate-shaped deformation part 41. In actuality, the above-described detection part DD is disposed at a plurality of sites on an annular deformation body 40. In other words, the annular deformation body 40 is a ring-shaped structural body in which a plurality of plate-shaped deformation parts and a plurality of coupling parts L are alternately disposed.

The plate-shaped deformation part 41 is a constituent which causes elastic deformation by exertion of torque to be detected, and a plate surface thereof is disposed so as to be inclined to the XY plane (a plane including the basic annular channel R). As with the individual embodiments described above, where a capacitive element is used as a detection element, it is not preferable to adopt a simple structure such as the detection part DD. However, where a strain gauge is used as a detection element, a simple structure such as the detection part DD is sufficiently useful.

In the above-described embodiments, a capacitive element is used as a detection element for detecting elastic deformation occurring at the detection part. In carrying out the present invention, however, the detection element is not necessarily limited to a capacitive element. In a modification example given below, a strain gauge which is fixed at a position of the detection part causing elastic deformation is used as a detection element, and a circuit which outputs an electric signal indicating exerted torque on the basis of fluctuation in electrical resistance of the strain gauge is used as a detection circuit.

FIGS. 52(b) and (c) are each a partial sectional view which shows an elastic deformation mode of the plate-shaped deformation part 41 which constitutes the detection part DD shown in FIG. 52(a). FIG. 52(a) shows a state that no external force is exerted on the detection part DD. Upon exertion of an external force on the detection part DD, deflection shown in FIGS. 52(b) and (c) will occur at the plate-shaped deformation part 41.

First, consideration is given to a case where the compressive force f1 shown in FIG. 52(b) is exerted at a position of a detection point Q of the annular deformation body 40. In this case, the plate-shaped deformation part 41 undergoes deflection, and stress indicated by "−" or "+" in the drawing occurs at individual parts of the surface thereof. Here, "+" indicates compression stress (that is, stress contracting along the basic annular channel R), and "−" indicating extension stress (that is, stress expanding laterally in the drawing along the basic annular channel R). As shown in the drawing, stress occurring on the surface of the plate-shaped deformation part 41 concentrates in the vicinity of an end of the plate-shaped deformation part 41 which is connected with a coupling part L. On the other hand, where an extension force f2 is exerted on a position of the detection point Q, there is obtained stress distribution indicated by reference symbols opposite to those in FIG. 52(b).

In contrast, FIG. 52(c) shows stress distribution occurring where force in the longitudinal direction is exerted on an adjacent pair of coupling parts L. Specifically, the example shown in the drawing is to show the stress distribution obtained when a force f3 which is downward in the drawing is exerted on the coupling part L on the left side, and a force f4 which is upward in the drawing is exerted on the coupling part L on the right side. In this case as well, the stress occurring on the surface of the plate-shaped deformation part 41 concentrates in the vicinity of an end of the plate-shaped deformation part 41 which is connected with the coupling part L. However, the sensor according to the present invention is a torque sensor which detects moment exerted around the Z axis. Therefore, a force component to be detected is the compressive force f1 shown in FIG. 52(b) or the extension force f2 which is reversed thereto, and it is not necessary to detect the force f3 or the force f4 shown in FIG. 52(c).

With consideration given to the above-described stress developing phenomenon, in order to detect elastic deformation occurring at the detection part DD by using strain gauges by means of the detection part DD composed of the plate-shaped deformation part 41 shown in the drawing, it is found that effective detection can be made by disposing individual strain gauges on both surfaces of the plate-shaped deformation part 41 in the vicinity of an end thereof which is connected with a coupling part L.

Figure 53A:
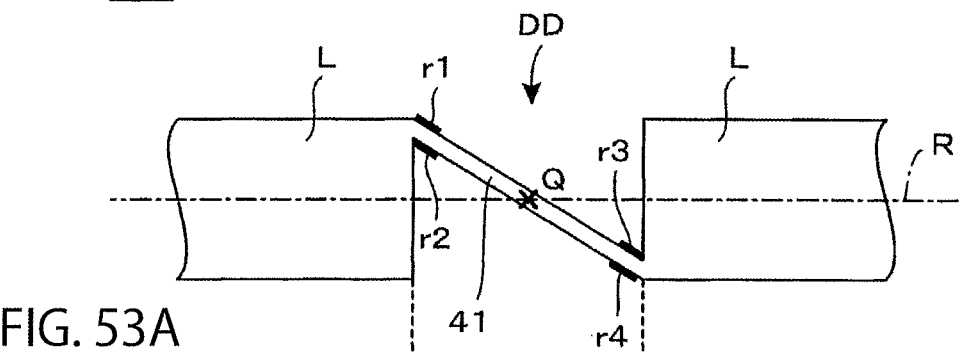
FIG. 53A covers a side view and FIG. 53B covers a plan view, each of which shows an example in which a strain gauge is used as a detection element for detecting elastic deformation occurring at the detection part DD shown in FIG. 52(a).
Figure 53B:
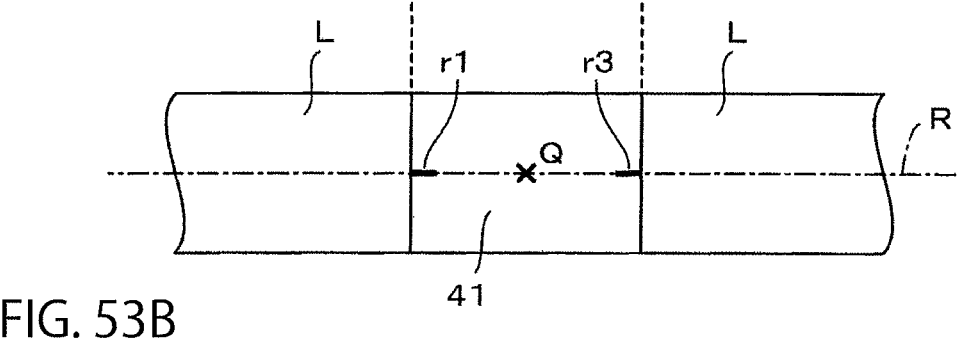

FIG. 53 covers a side view (FIG. (a)) and a top view (FIG. (b)) in which the strain gauge is used on the basis of the above consideration as a detection element for detecting elastic deformation occurring at the detection part DD shown in FIG. 52(a). Where the annular deformation body 40 is circular, the basic annular channel R is to constitute a circle. However, in FIG. 53(b), for the sake of convenience of description, the basic annular channel R is partially indicated by the straight line.

As shown in the drawing, in the plate-shaped deformation part 41 which constitutes the detection part DD, a first strain gauge r1 is attached on a front face of the deformation part 41 in the vicinity of a first connection end thereof with a coupling part L on the left side, and a second strain gauge r2 is attached on a rear face thereof. Similarly, a third strain gauge r3 is attached on a front face of the deformation part 41 in the vicinity of a second connection end thereof with a coupling part L on the right side, and a fourth strain gauge r4 is attached on a rear face thereof.

Figure 54:
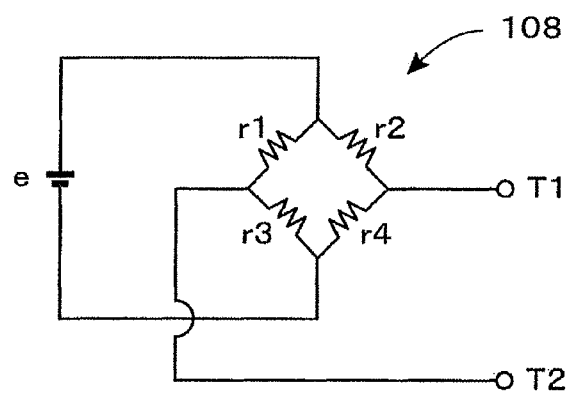
FIG. 54 is a circuit diagram which shows a bridge circuit for outputting an electric signal on the basis of detection results of four sets of strain gauges shown in FIG. 53.

FIG. 54 is a circuit diagram which shows a bridge circuit 108 for outputting electric signals on the basis of detection results of four sets of the strain gauges r1 to r4 shown in FIG. 53. Specifically, the bridge circuit 108 is a circuit in which the first strain gauge r1 and the fourth strain gauge r4 are given as a first opposite side, while the second strain gauge r2 and the third strain gauge r3 are given as a second opposite side. The bridge circuit is actuated by application of a predetermined voltage from a bridge voltage source e. A detection circuit for detecting a bridge voltage generated between both output terminals T1, T2 is provided on the bridge circuit 108, by which the bridge voltage can be used as a parameter which indicates an extent of deformation shown in FIG. 52(b) or an extent of deformation which is reverse thereto.

Therefore, for example, four sets of the detection parts D1 to D4 of the annular deformation body 50 shown in the example of FIG. 15 are replaced by the detection parts DD shown in FIG. 52(a) to constitute the annular deformation body 40, and in the annular deformation body 40, four sets of the strain gauges r1 to r4 shown in FIG. 53 are disposed at each of the detection parts DD to constitute the bridge circuits 108 shown in FIG. 54. Thereby, bridge voltages of the individual bridge circuits 108 can be used as parameters for indicating stress in the table of FIG. 22. Therefore, four sets of the bridge voltages are computed according to the arithmetic expression shown in FIG. 22, thus making it possible to obtain a detection value of exerted torque as an electric signal.

<7-9. Essential Constituents of the Torque Sensor According to the Present Invention>

Consequently, with consideration given to the basic embodiment and various modification examples described above, the torque sensor according to the present invention is essentially a torque sensor which includes the following individual constituents and detects torque around a predetermined rotation axis (Z axis).

(1) An annular deformation body which extends along the basic annular channel when a basic annular channel is defined so as to surround a circumference of a rotation axis on a basic plane (the XY plane) orthogonal to the rotation axis, (2) An exertion support body which exerts torque on the annular deformation body, (3) A fixing support body which fixes the annular deformation body, (4) An exertion connection member which connects an exertion connection point provided at a predetermined site of the annular deformation body with the exertion support body, (5) A fixing connection member which connects a fixing connection point provided at a predetermined site of the annular deformation body with the fixing support body, (6) A detection element for detecting elastic deformation occurring at the annular deformation body, and (7) A detection circuit which outputs, on the basis of detection results of the detection element, an electric signal indicating torque around the rotation axis exerted on one of the exertion support body and of the fixing support body in a state that a load is applied to the other.

Here, the annular deformation body is provided with a detection part which is positioned at a detection point defined on the basic annular channel and a coupling part which is connected to both ends of the detection part. An exertion connection point and a fixing connection point are disposed at the coupling part and an orthogonal projection image of the exertion connection point on the basic plane and an orthogonal projection image of the fixing connection point on the basic plane are formed at mutually different positions. Further, the detection part is provided with an elastic deformation structure part which undergoes elastic deformation on the basis of exerted force upon exertion of force between the exertion connection point and the fixing connection point. The detection element detects elastic deformation occurring at the elastic deformation structure part. On the other hand, the coupling part may have some flexibility but the coupling part preferably undergoes deformation to the minimum extent possible in causing effective deformation to the detection part by exerted torque. Therefore, in practice, it is preferable that the elastic deformation structure part of the detection part is given as an elastic deformation body which causes elastic deformation significantly detectable by the detection element and the coupling part is given as a rigid body in which no significant deformation is detectable by detection sensitivity of the detection element.

Where a capacitive element is used as a detection element, it is preferable to adopt the following unique structure as a detection part. That is, the detection part is provided with a first deformation part which causes elastic deformation by exertion of torque to be detected, a second deformation part which causes elastic deformation by exertion of torque to be detected, and a displacement part which causes displacement by elastic deformation of the first deformation part and the second deformation part. And, an external end of the first deformation part is connected to a coupling part adjacent thereto, while an internal end of the first deformation part is connected to the displacement part, and an external end of the second deformation part is connected to a coupling part adjacent thereto, while an internal end of the second deformation part is connected to the displacement part.

Further, the capacitive element which constitutes the detection element may be constituted of a displacement electrode fixed at a predetermined site of the detection part and a fixed electrode fixed at a position of the exertion support body or the fixing support body which opposes displacement electrode. Here, it will be sufficient that the displacement electrode is disposed at a position which causes displacement to the fixed electrode on the basis of elastic deformation occurring at the detection part, and the detection circuit outputs an electric signal indicating exerted torque on the basis of fluctuation in capacitance value of the capacitive element.

It is preferable that when viewed from a reference observation direction at which the rotation axis gives a horizontal line extending laterally, the exertion support body is disposed at a position adjacent to the left side of the annular deformation body, at a position adjacent to the outside of the annular deformation body or at a position adjacent to the inside of the annular deformation body. It is preferable that when viewed from the reference observation direction, the fixing support body is disposed at a position adjacent to the right side of the annular deformation body. In this case, the capacitive element can be constituted of a displacement electrode which is fixed at a predetermined site on the right side surface of the annular deformation body and a fixed electrode which is fixed at a position of the fixing support body which opposes the displacement electrode. Further, the displacement electrode may be fixed at a position of the displacement part which opposes the fixing support body.

INDUSTRIAL APPLICABILITY

The torque sensor according to the present invention can be used for measuring torque in various types of industrial machines by taking advantage of being small in size, high in rigidity and capable of realizing high production efficiency. In particular, in an industrial machine in which a robot arm is used to perform automatic assembly, the sensor is optimally used in an application where it is incorporated into a joint part of the arm, thereby monitoring and controlling force occurring at the leading end of the arm.

What is claimed is:

1. A torque sensor which detects torque around a predetermined rotation axis, the torque sensor comprising:
   an annular deformation body disposed so as to surround a circumference of the rotation axis, the annular deformation body undergoing elastic deformation by exertion of torque;
   an exertion support body provided on one side in a direction along the rotation axis, the exertion support body exerting the torque to the annular deformation body;
   a fixing support body provided on an other side in a direction along the rotation axis, the fixing support body fixing the annular deformation body; and
   a detection circuit which outputs electric signals indicating torque around the rotation axis; wherein
   the annular deformation body has four coupling parts, and four detection parts positioned between two coupling parts which are adjacent in the circumferential direction of the annular deformation body, the four detection parts undergoing elastic deformation by exertion of torque,
   the four detection parts each are formed in a convex shape on one side in a direction along the rotation axis and are formed in a concave shape on the other side in a direction along the rotation axis, the detection circuit outputs the electric signals on the basis of elastic deformation undergone to the four detection parts of the annular deformation body.

2. The torque sensor according to claim 1, further comprising:
a first side connection member which connects the annular deformation body with the exertion support body; and
a second side connection member which connects the annular deformation body with the fixing support body.

3. The torque sensor according to claim 2, wherein
two coupling parts of the annular deformation body are connected with the exertion support body via two first side connection members, and
the other two coupling parts of the annular deformation body are connected with the fixing support body via two second side connection members.

4. The torque sensor according to claim 3, wherein
the first connection member and the second connection member are disposed alternately in the circumferential direction of the annular deformation body.

5. The torque sensor according to claim 2, wherein
the first connection member and the second connection member are formed at mutually different positions when viewed in a direction along the rotation axis.

6. The torque sensor according to claim 1, wherein
the detection parts each are formed in a convex shape on the side of the fixing support body and are formed in a convex shape on the side of the exertion support body.

7. The torque sensor according to claim 1, further comprising:
a capacitive element having a displacement electrode provided to the detection part, the displacement electrode opposing the fixing support body, and a fixed electrode provided to the fixing support body, the fixed electrode opposing the displacement electrode, wherein
the detection circuit outputs the electric signals on basis of a fluctuation in capacitance value of the capacitive element.

\* \* \* \* \*